(12) United States Patent
Eubanks

(10) Patent No.: US 11,146,845 B2
(45) Date of Patent: Oct. 12, 2021

(54) SYSTEMS AND METHODS FOR UNIFIED PRESENTATION OF SYNCHRONIZED ON-DEMAND, LIVE, SOCIAL OR MARKET CONTENT

(71) Applicant: Silicon Beach Media II, LLC, Los Angeles, CA (US)

(72) Inventor: Jonathan Eubanks, Los Angeles, CA (US)

(73) Assignee: Relola Inc., Mountain View, CA (US)

( * ) Notice: Subject to any disclaimer, the term of this patent is extended or adjusted under 35 U.S.C. 154(b) by 0 days.

(21) Appl. No.: 15/832,607

(22) Filed: Dec. 5, 2017

(65) Prior Publication Data
US 2019/0174169 A1    Jun. 6, 2019

(51) Int. Cl.
| | |
|---|---|
| H04N 21/43 | (2011.01) |
| H04L 29/06 | (2006.01) |
| H04N 21/242 | (2011.01) |
| H04N 21/4722 | (2011.01) |
| H04N 21/4788 | (2011.01) |

(52) U.S. Cl.
CPC ..... *H04N 21/4307* (2013.01); *H04L 65/1069* (2013.01); *H04L 65/4007* (2013.01); *H04L 65/4015* (2013.01); *H04N 21/242* (2013.01)

(58) Field of Classification Search
CPC combination set(s) only.
See application file for complete search history.

(56) References Cited

U.S. PATENT DOCUMENTS

| | | |
|---|---|---|
| 5,610,774 A | 3/1997 | Hayashi |
| 6,044,383 A | 3/2000 | Suzuki |
| 6,112,186 A | 8/2000 | Bergh |
| 6,385,596 B1 | 5/2002 | Wiser |

(Continued)

FOREIGN PATENT DOCUMENTS

| | | |
|---|---|---|
| WO | 2016064766 | 4/2016 |
| WO | 2017147232 | 8/2017 |

OTHER PUBLICATIONS

International Application No. PCT/US2017/064769, International Search Report and Written Opinion dated Feb. 1, 2018.

(Continued)

*Primary Examiner* — Alexander Gee
(74) *Attorney, Agent, or Firm* — Ahmann Kloke LLP

(57) ABSTRACT

Described herein include systems, methods, and non-transitory computer readable media related to display of user-specific navigation screen upon start of a media content display system. A system comprises a playback engine and an interactive programming guide engine. The playback engine is configured to present media content through a display device. The interactive programming guide engine is configured to generate a user profile based on user interaction with the media content presented by the playback engine, transmit the user profile to an external system, and responsive to the transmitted user profile, receive data of user-specific content options that are generated based on the user profile. The interactive programming guide engine is further configured to generate a user-specific navigation screen based on the data of the received user-specific content options, and cause the user-specific navigation screen to be displayed on the display device upon start of the system.

20 Claims, 34 Drawing Sheets

(56) References Cited

U.S. PATENT DOCUMENTS

| | | | |
|---|---|---|---|
| 6,442,758 B1* | 8/2002 | Jang | H04N 7/142 |
| | | | 348/E7.079 |
| 7,088,910 B2 | 8/2006 | Potrebic | |
| 7,117,518 B1 | 10/2006 | Takahashi | |
| 7,343,616 B1 | 3/2008 | Takahashi | |
| 7,430,360 B2 | 9/2008 | Abecassis | |
| 7,496,845 B2 | 2/2009 | Deutscher | |
| 7,962,935 B2 | 6/2011 | Kurosaki | |
| 8,244,593 B2 | 8/2012 | Klinger | |
| 8,699,861 B2 | 4/2014 | Potrebic | |
| 8,756,110 B2 | 6/2014 | Traina | |
| 9,473,584 B2 | 10/2016 | Sullivan | |
| 9,883,249 B2 | 1/2018 | Taylor | |
| 2001/0048437 A1 | 12/2001 | Sato | |
| 2002/0042920 A1 | 4/2002 | Thomas | |
| 2002/0056087 A1 | 5/2002 | Berezowski | |
| 2002/0082910 A1* | 6/2002 | Kontogouris | H04N 21/812 |
| | | | 705/14.19 |
| 2002/0124252 A1 | 9/2002 | Schaefer | |
| 2003/0033157 A1 | 2/2003 | Dempski | |
| 2003/0035011 A1 | 2/2003 | Lee | |
| 2003/0093806 A1 | 5/2003 | Dureau | |
| 2003/0145319 A1 | 7/2003 | Sato | |
| 2004/0107439 A1 | 6/2004 | Hassell | |
| 2005/0149964 A1 | 7/2005 | Thomas | |
| 2005/0289637 A1 | 12/2005 | Burke | |
| 2006/0045470 A1 | 3/2006 | Poslinski | |
| 2006/0136965 A1 | 6/2006 | Ellis | |
| 2006/0236352 A1* | 10/2006 | Scott, III | H04N 5/76 |
| | | | 725/89 |
| 2006/0287915 A1 | 12/2006 | Boulet | |
| 2007/0055986 A1 | 3/2007 | Gilley | |
| 2007/0124756 A1 | 5/2007 | Covell | |
| 2007/0136753 A1 | 6/2007 | Bovenschulte | |
| 2007/0157281 A1* | 7/2007 | Ellis | H04N 7/17309 |
| | | | 725/134 |
| 2007/0180466 A1 | 8/2007 | Ando | |
| 2007/0212017 A1 | 9/2007 | Ben-Romdhane | |
| 2007/0271580 A1 | 11/2007 | Tischer | |
| 2007/0294740 A1 | 12/2007 | Drake | |
| 2008/0092168 A1 | 4/2008 | Logan | |
| 2008/0155627 A1 | 6/2008 | O'Connor | |
| 2008/0184297 A1 | 7/2008 | Ellis | |
| 2008/0209021 A1* | 8/2008 | Shamma | H04L 65/4015 |
| | | | 709/223 |
| 2008/0235587 A1 | 9/2008 | Heie | |
| 2008/0235733 A1 | 9/2008 | Heie et al. | |
| 2008/0247541 A1 | 10/2008 | Cholas | |
| 2009/0147786 A1 | 6/2009 | Li | |
| 2009/0222520 A1* | 9/2009 | Sloo | H04N 21/4825 |
| | | | 709/205 |
| 2009/0276805 A1 | 11/2009 | Andrews, II | |
| 2009/0304350 A1 | 12/2009 | Beyabani | |
| 2010/0017474 A1* | 1/2010 | Kandekar | H04N 7/17318 |
| | | | 709/205 |
| 2010/0031162 A1 | 2/2010 | Wiser | |
| 2010/0077433 A1 | 3/2010 | Beyabani | |
| 2010/0083304 A1 | 4/2010 | Pan | |
| 2010/0122293 A1 | 5/2010 | Craner | |
| 2010/0131385 A1 | 5/2010 | Harrang | |
| 2010/0247065 A1 | 9/2010 | Cooper | |
| 2010/0274566 A1 | 10/2010 | Carlson | |
| 2011/0162002 A1 | 6/2011 | Jones | |
| 2011/0269548 A1* | 11/2011 | Barclay | G07F 17/3225 |
| | | | 463/42 |
| 2011/0307931 A1 | 12/2011 | Shuster | |
| 2012/0023534 A1 | 1/2012 | Dasilva | |
| 2012/0079548 A1 | 3/2012 | Whitten | |
| 2012/0124620 A1 | 5/2012 | Nishizawa | |
| 2012/0131110 A1* | 5/2012 | Buyukkoc | H04N 21/258 |
| | | | 709/206 |
| 2012/0210356 A1 | 8/2012 | Kiok | |
| 2012/0243850 A1 | 9/2012 | Basra | |
| 2012/0257112 A1 | 10/2012 | Fritsch | |
| 2012/0266069 A1 | 10/2012 | Moshiri | |
| 2012/0291060 A1* | 11/2012 | Relyea | H04N 21/4312 |
| | | | 725/25 |
| 2012/0323704 A1 | 12/2012 | Steelberg | |
| 2013/0007805 A1 | 1/2013 | Athias | |
| 2013/0036434 A1 | 2/2013 | Shkedi | |
| 2013/0050274 A1 | 2/2013 | Yamada | |
| 2013/0125167 A1 | 5/2013 | Sharif-Ahmadi | |
| 2013/0152128 A1* | 6/2013 | Tanna | H04N 21/4126 |
| | | | 725/39 |
| 2013/0159117 A1 | 6/2013 | Sanginiti | |
| 2013/0282821 A1* | 10/2013 | Muriello | H04L 67/10 |
| | | | 709/204 |
| 2013/0304575 A1 | 11/2013 | Fetyko | |
| 2013/0326561 A1 | 12/2013 | Pandey | |
| 2013/0339109 A1 | 12/2013 | Steelberg | |
| 2014/0006977 A1 | 1/2014 | Adams | |
| 2014/0032371 A1 | 1/2014 | Traina | |
| 2014/0171179 A1 | 6/2014 | Ball | |
| 2014/0173644 A1 | 6/2014 | Ball | |
| 2014/0173648 A1 | 6/2014 | Ball | |
| 2014/0181120 A1 | 6/2014 | Sullivan | |
| 2014/0181196 A1 | 6/2014 | Sullivan | |
| 2014/0280603 A1 | 9/2014 | Rideout | |
| 2014/0282650 A1* | 9/2014 | Viles | H04N 21/812 |
| | | | 725/13 |
| 2014/0375752 A1 | 12/2014 | Shoemake | |
| 2015/0127438 A1 | 5/2015 | Wedderburn et al. | |
| 2015/0170101 A1 | 6/2015 | Fair | |
| 2015/0188928 A1 | 7/2015 | Shapiro | |
| 2015/0215665 A1 | 7/2015 | Casagrande | |
| 2015/0237389 A1 | 8/2015 | Grouf | |
| 2015/0244807 A1 | 8/2015 | Shoemake | |
| 2016/0012551 A1 | 1/2016 | Eckerd | |
| 2016/0034974 A1 | 2/2016 | Neb | |
| 2016/0182965 A1 | 6/2016 | Peterson | |
| 2016/0295163 A1* | 10/2016 | Shiro | H04N 7/147 |
| 2017/0048286 A1* | 2/2017 | Ichihashi | H04N 7/15 |
| 2017/0094349 A1 | 3/2017 | Maughan | |
| 2017/0171626 A1* | 6/2017 | Eatedali | H04N 21/4825 |
| 2018/0268395 A1 | 9/2018 | Donk | |
| 2019/0147471 A1 | 5/2019 | McKelvey, Jr. | |
| 2019/0173814 A1 | 6/2019 | McNeill | |

OTHER PUBLICATIONS

International Application No. PCT/US2018/012263, International Search Report and Written Opinion dated Mar. 26, 2018.

Bright Planning, "Marketing with Celebrities: How to Calculate Your Endorsement Offer," May 15, 2015 [retrieved from https://www.brightplanning.com/marketing-with-celebrities-how-to-calculate-your-endorsement-offer on May 27, 2020].

Zoovu, "Impact of Celebrity Endorsement on Consumer Buying Behavior," Oct. 4, 2016 [retrieved from https://zoovu.com/blog/impact-of-celebrity-endorsement-on-consumer-buying-behavior on May 27, 2020].

Anonymous, "Kirusa Wins the West Africa Com Aware for Outstanding Enterprise Solution 2017," PRWeb Newswire, Sep. 20, 2017.

Anonymous, "Microsoft Updates MSN Personal Portal; Microsoft Makes it Easier for People to Access Its Customizable Portal on MSN and has Made Improvements to the Beta Service," InternetWeek, Sep. 2, 2005.

Bruno, Antony, "The Blueprint 3: What MySpace's Badly Needed Redesign Means for Artists, Labels and Fans," Billboard 122.44, vol. 8, No. 1, Nov. 6, 2010.

* cited by examiner

SYSTEMS AND METHODS FOR UNIFIED PRESENTATION OF SYNCHRONIZED ON-DEMAND, LIVE, SOCIAL OR MARKET CONTENT

TECHNICAL FIELD

This disclosure pertains to systems for presenting content. More specifically, this disclosure pertains to unified presentation of on-demand, live, social or market content.

BACKGROUND

Under conventional approaches, multiple devices are required to perform different electronic activities. For example, a TV may be required to present live sporting events, a computer or mobile device (e.g., smartphone) may be required to communicate with friends or stream media content, and/or the like. Additionally, multiple devices are typically needed in order to perform different electronic activities simultaneously (e.g., presenting a live sporting event and communicating with friends), and the multiple devices typically are not natively compatible.

SUMMARY

Described herein include systems, methods, and non-transitory computer readable media related to display of user-specific navigation screen upon start of a media content display system. A system comprises a playback engine and an interactive programming guide engine. The playback engine is configured to present media content through a display device. The interactive programming guide engine is configured to generate a user profile based on user interaction with the media content presented by the playback engine, transmit the user profile to an external system, and responsive to the transmitted user profile, receive data of user-specific content options that are generated based on the user profile. The interactive programming guide engine is further configured to generate a user-specific navigation screen based on the data of the received user-specific content options, and cause the user-specific navigation screen to be displayed on the display device upon start of the system.

In some embodiments, the interactive programming guide engine is further configured to receive user-specific advertisement content, responsive to the transmitted user profile, generate a user-specific advertisement screen based on the received user-specific advertisement content, and cause the user-specific advertisement screen to be displayed along with the user-specific navigation screen.

In some embodiments, the interactive programming guide engine causes the user-specific navigation screen to be displayed on the display device in response to user login. In some embodiments, the interactive programming guide engine causes the user-specific navigation screen to be displayed on the display device before a non-user-specific navigation screen is displayed on the display device.

In some embodiments, the user-specific navigation screen includes a plurality of selectable panels each of which corresponds to a media content that is capable of being presented by the playback engine. In some embodiments, the interactive programming guide engine is further configured to cause the user-specific navigation screen displayed on the display device to transition to a media screen associated with media content corresponding to one of the selectable panels that is selected. In some embodiments, the interactive programming guide engine causes the user-specific navigation screen displayed on the display device to transition to the media screen without a non-user-specific navigation screen being displayed on the display device therebetween. In some embodiments, the plurality of selectable panels include a first panel representing a first media content and a second panel representing a second media content that has involved less user interaction than the first media content, wherein the first panel is larger than the second panel. In some embodiments, the plurality of selectable panels include a first panel representing a first media content and a second panel representing a second media content that has involved less user interaction than the first media content, wherein the first panel is located at a position closer to a center of the user-specific navigation screen than the second panel is.

In some embodiments, the interactive programming guide engine transmits the user profile to the external system periodically, and receives the data of user-specific content options periodically.

Described herein include systems, methods, and non-transitory computer readable media configured related to display of a graphical user interface (GUI) associated with media content that is displayed. A system comprises a GUI engine. The GUI engine may be configured to identify content parameters of media content that is currently presented, and identify one or more functions that are available specifically for the media content based on the identified content parameters. The engine may be further configured to generate, based on the one more identified functions, GUI data for display of a GUI that selectively includes one or more selectable objects for selecting the one or more identified functions, respectively. The engine may be receive an input to start a GUI function, and in response to the input, cause a display device coupled to the system to display the GUI based on the generated GUI data.

In some embodiments, the GUI engine may be further configured to receive an input to select one of the one or more selectable objects in the GUI displayed on the display device, and in response to the input, select one of the one or more selectable objects, and cause the display device to display a screen associated with an available function corresponding to the selected one of the one or more selectable objects. In some embodiments, the screen associated with the available function corresponding to the selected one of the one or more selectable objects is displayed together with the GUI.

In some embodiments, the engine may be further configured to repeatedly carry out identification of the content parameters, identification of the one or more functions that are available, and generation of the GUI data, until the input to start the GUI function is received.

In some embodiments, the engine may be further configured to carry out identification of the content parameters, identification of the one or more functions that are available, and generation of the GUI data, in response to the input to start the GUI function.

In some embodiments, the content parameters include one or more of a channel that is currently selected, a program that is currently presented on the channel, and content that is currently presented in the program. In some embodiments, the GUI displayed by the display device does not include one or more objects corresponding to one or more functions that are unavailable for the media content. In some embodiments, the GUI displayed by the display device is overlaid on display content that has been displayed by the display device before displaying the GUI.

In some embodiments, the GUI displayed by the display device also includes one or more selectable objects corresponding to one or more functions that are available regardless of the media content. In some embodiments, in the GUI displayed by the display device, the one or more selectable objects for selecting the one or more identified functions are displayed with emphasis with respect to the one or more selectable objects corresponding to one or more functions that are available regardless of the media content.

Described herein include systems, methods, and non-transitory computer readable media configured related to display of media content and advertisement content separately. A system comprises an advertisement separation engine. The advertisement separation engine is configured to receive an input to start an advertisement separation function, when media content including interruption by advertisement is presented in a screen, and in response to the input, obtain the media content with less or no interruption of advertisement and advertisement content that is generated separately from the media content. The advertisement separation engine is further configured to switch the screen including the media content including interruption of advertisement to a new screen including a first sub-screen in which the obtained media content with less or no interruption by advertisement is displayed and a second sub-screen in which the obtained advertisement content is displayed.

In some embodiments, the advertisement separation engine is further configured to obtain, in response to the input, non-advertisement content that is generated separately from the media content and associated with the media content. The advertisement content is displayed in the second sub-screen in a first time period and the non-advertisement content is displayed in the second sub-screen in a second time period. In some embodiments, the non-advertisement content includes metadata of the media content that is displayed in the first sub-screen.

In some embodiments, the advertisement separation engine is further configured to obtain non-advertisement content that is generated separately from the media content and associated with the media content, when the advertisement content is displayed in the second sub-screen, and upon obtaining the non-advertisement content, switch the advertisement content displayed in the second sub-screen to the non-advertisement content.

In some embodiments, the advertisement content is associated with the media content. In some embodiments, the advertisement content is associated with a user profile. In some embodiments, the advertisement content is a sequence of a plurality of still images that contain different advertisement objects. In some embodiments, the advertisement content includes one or more still images and does not include video images. In some embodiments, the media content is live media content. In some embodiments, an aspect ratio of the first sub-screen is equal to an aspect ratio of the screen including the media content including interruption of advertisement.

Described herein include systems, methods, and non-transitory computer readable media configured related to synchronized presentation of media content. A system comprises a playback engine, a communication engine, and a synchronized presentation engine. The playback engine is configured to present content on a display device. The communication engine is configured to communicate externally. The synchronized presentation engine is configured to set up a group of users as participants of a synchronized presentation session. The synchronized presentation engine is further configured cause the playback engine to present first media content on the display device upon start of the synchronized presentation session. The synchronized presentation engine is further configured cause the communication engine to transmit a signal to external systems associated with one or more of the participants upon start of the synchronized presentation session, such that the external systems associated with the one or more of the participants present second media content synchronized with the first media content.

In some embodiments, the synchronized presentation engine is further configured to receive a user input to select the first media content as selected media content to be presented during the synchronized presentation session. The synchronized presentation engine is further configured to determine whether or not a user of the system is authorized to access the selected media content, wherein upon determining that the user of the system is authorized to access the selected media content, the synchronized presentation engine causes the playback engine to present first media content on the display device. In some embodiments, the synchronized presentation engine is further configured to generate, upon determining that the user of the system is authorized to access the selected media content, a prompt for the user to perform transaction to acquire access to the selected media content.

In some embodiments, the synchronized presentation engine is further configured to determine whether or not one or more of the participants associated with the external systems are authorized to access the selected media content, wherein upon determining that the one or more of the participants associated with the external systems are authorized to access the selected media content, the synchronized presentation engine causes the communication engine to transmit the signal to the external systems. In some embodiments, the synchronized presentation engine is further configured to cause, upon determining that the one or more of the participants associated with the external systems are not authorized to access the selected media content, a prompt to be generated on one or more of the external systems, such that the one or more of the participants associated with said one or more of the external systems are prompted to perform transaction to acquire access to the selected media content.

In some embodiments, the system further comprises a social interface engine configured to establish a friend connection with one or more users, wherein the synchronized presentation engine determines the group of users based on the one or more users having the friend connection. In some embodiments, the social interface engine is further configured to cause a graphical user interface (GUI) for instant message among the participant be displayed on the display device during the synchronized presentation session.

In some embodiments, the synchronized presentation engine is further configured to limit control of playback during the synchronized presentation session by the external systems.

In some embodiments, the first media content and the second media content include the same content in a first time period during the synchronized presentation session and different content in a second time period during the synchronized presentation session. In some embodiments, the first media content includes first content overlaid on synchronized content, and the second media content includes second content overlaid on the synchronized content.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

Embodiments of the current system are capable of providing users with a unified experience allowing users to perform a variety of different electronic activities within a unified platform. For example, the unified platform may comprise an agnostic operating system that may be incorporated within a set-top device, mobile device, computer, and/or the like.

In some embodiments, a system is provided that allows users to easily navigate through graphical user interfaces (or, "screens") to perform different electronic activities presented on a TV or other output system. Electronic activities (or, "activities") may include streaming live and/or on-demand media items (or, "content"), connecting and communicating with friends, purchasing products, receiving targeted advertisements, and/or performing other actions described elsewhere herein. In various embodiments, users may be able to perform any number of electronic activities within a single display screen (e.g., a TV screen) through a split presentation mode. For example, the system may provide separate windows within a single display screen (e.g., a TV screen) for performing different activities (e.g., streaming a live sporting event in a first window, and streaming an on-demand movie in a second window). The system may provide any number of such windows. These and other features are described further below.

Figure 1:
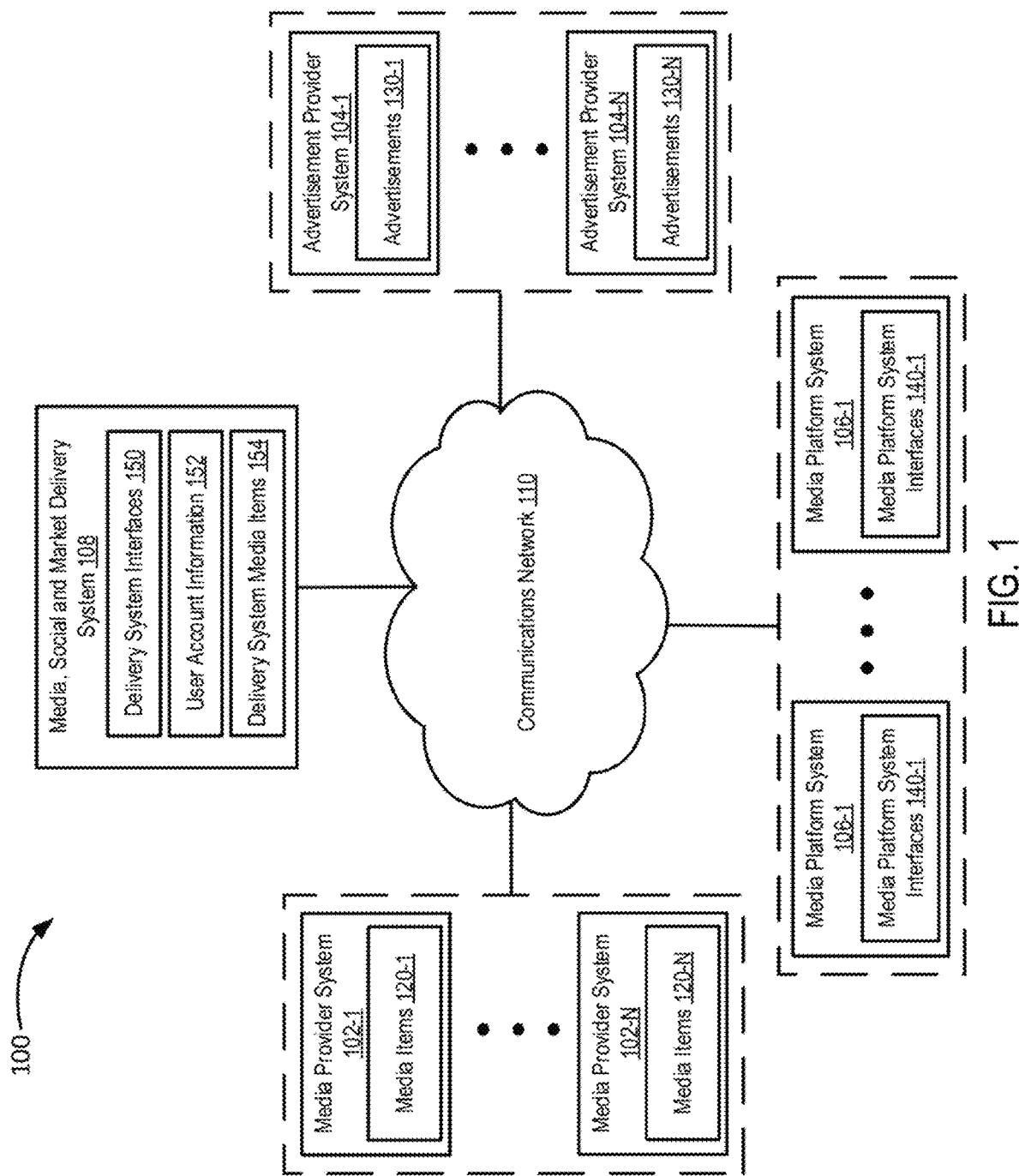
FIG. 1 illustrates a diagram of an example system for providing unified presentation of on-demand, live, social or market content according to some embodiments.

FIG. 1 illustrates a diagram 100 of an example system for providing unified presentation of on-demand, live, social or market content according to some embodiments. In the example of FIG. 1, the system includes media provider systems 102-1 to 102-N (individually, the media provider system 104, collectively, the media provider systems 104), advertisement provider systems 104-1 to 104-N (individually, the advertisement provider system 104, collectively, the advertisement provider systems 104), media platform systems 106-1 to 106-N (individually, the media platform system 106, collectively, the media platform systems 106), media, social and market delivery system 108, and a communication network 110.

The media provider systems 102 may function to store and provide media items 120. As used herein, "media items" may be referred to simply as media, content, and/or content items. Media items 120 may include live, on-demand, stream-enabled, and/or broadcast media items For example, media items 120 may include movies, videos, music, games, pictures, images, text, social media feeds, audiovisual items, and/or other types of media items. In some embodiments, functionality of the media provider systems 102 are performed by one or more servers, workstations, desktop computers, laptop computers, mobile devices, or the like. In some embodiments, the media provider systems 102 comprise cloud-based systems. For example, the media provider systems 102 may comprise a Netflix, HBO NOW, and/or other remote systems.

The advertisement provider systems 104 may function to store and provide advertisements 130. For example, the advertisements 130 may include images, pictures, video, banners, logos, text, and/or the like. Advertisements may be presented during playback of media items 120, during user registration, login, and/or the like, as described elsewhere herein. In some embodiments, functionality of the advertisement provider systems 104 are performed by one or more servers, workstations, desktop computers, laptop computers, mobile devices, and/or the like. In some embodiments, the advertisement provider systems 104 comprise cloud-based systems.

The media platform systems 106 may function to provide a platform for presenting (e.g., streaming and/or otherwise playing back) media, allowing users to connect and communicate with friends, purchase products, and/or the like. As used herein, the term "media" may refer to media items 120, delivery system media items 154 (discussed elsewhere herein), and/or advertisements 130. In some embodiments, the media platform systems 106 may be incorporated within set-top devices, mobile devices, and/or other computing devices.

In some embodiments, the media platform systems 106 may include media platform system interfaces 140 to facilitate streaming and/or presenting media, and/or otherwise communicating with one or more remote systems (e.g., the media provider systems 102, the advertisement provider systems 104, the media, social and market delivery system 108, and/or the like). The interfaces described herein may include application programming interfaces (APIs), software development kits (SDKs), source code, machine code, and/or server stubs.

Figure 4:
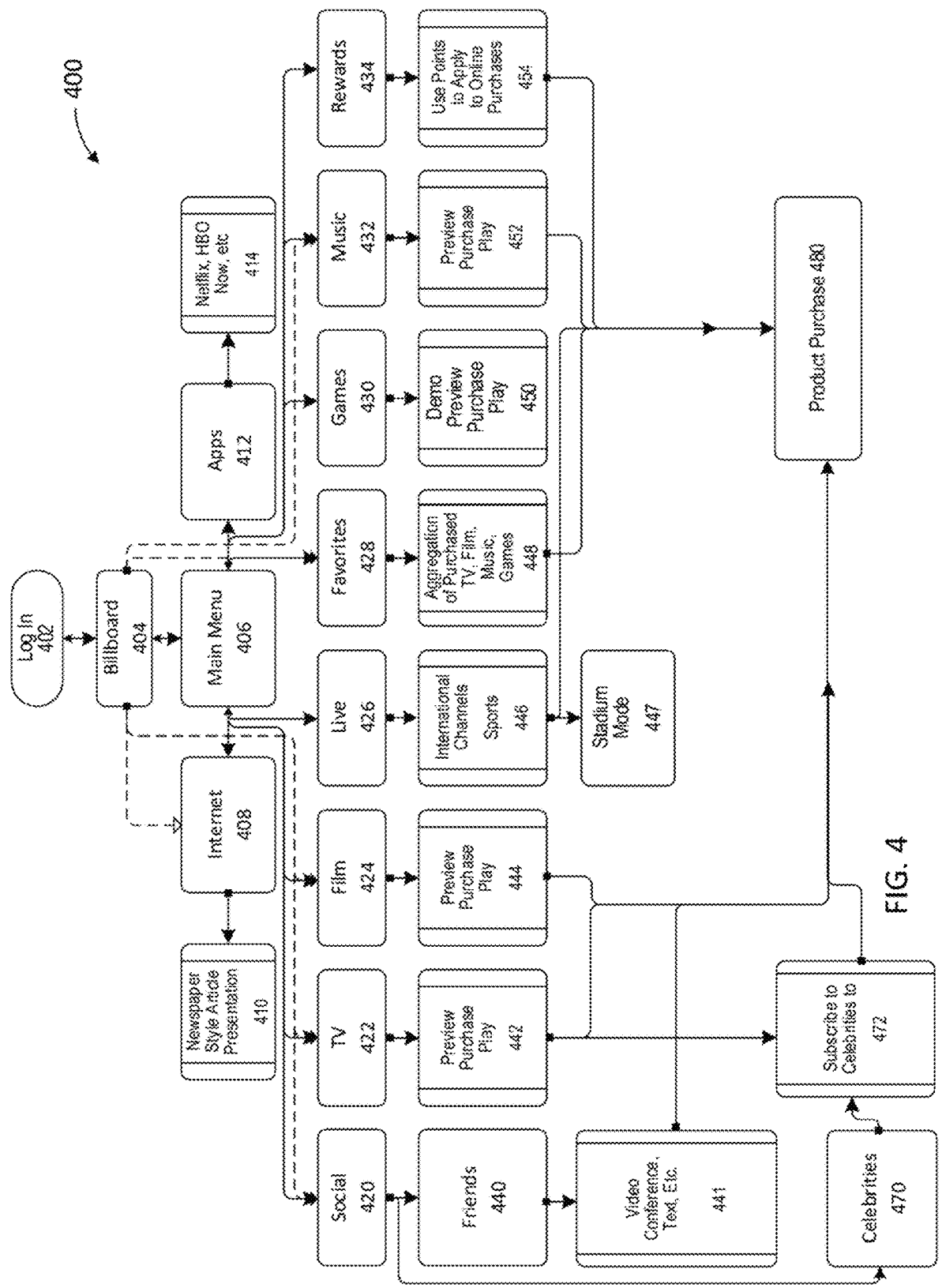
FIG. 4 illustrates a flowchart of an example graphical user interface navigational flow of a media platform system according to some embodiments.

In some embodiments, a media platform system 106 generates and/or otherwise provides an interactive programming guide capable of presenting graphical user interfaces through which a user may navigate to various screens to perform electronic activities. The individual graphical user interfaces may be context-based. For example, the interactive programming guide may generate graphical user interfaces based on user account information 152 and/or currently available features (e.g., features requiring a network may be presented only if an active network connection is detected), as discussed elsewhere herein. An example flow capable of being generated and/or navigated by the interactive programming guide is shown in FIG. 4.

In some embodiments, a media platform system 106 generates a billboard graphical user interface (or, simply, "billboard" or "billboard screen"). The media platform system 106 may dynamically generate the billboard screen in response to a user logging in to a media platform system 106 (e.g., by entering username/password credential that a verified by the media, social and market delivery system 108). Since it is dynamically generated, different users, or the same user logging in at different times, may be presented with a different billboard screen. In some embodiments, the billboard screen is capable of providing a user with media options that are associated with the user and enables the user to more efficiently proceed to screens and/or media items that the user is interested in. In one embodiment, the billboard screen is displayed before a main menu screen is displayed.

In some embodiments, a media platform system 106 functions to generate context-specific graphical user interface navigation tools. For example, the media platform system 106 may generate a smart bar for display on a suitable output subsystem of the media platform system 106 (e.g., a TV). In one example, the smart bar may be a content-specific graphical user interface that dynamically changes display media therein based on media presented to a user. The smart bar is formed in an applicable direction depending on various criteria. For example, the smart bar extends horizontally or vertically depending on an aspect ratio of a display device for displaying media content. In another example, the smart bar extends horizontally or vertically depending on user setting. In still another example, the smart bar is formed in a fixed direction. Further, the smart bar is positioned at an applicable position depending on various criteria. For example, the smart bar is positioned at a bottom edge or a top edge of the entire screen depending on media content to be displayed on the main screen. In another example, the smart bar is positioned at a user-specified position. In still another example, the smart bar is positioned at a fixed position. Moreover, the smart bar is in an applicable size depending on various criteria. For example, the smart bar is in an applicable size depending on various criteria. For example, the smart bar is in a full screen size (e.g., extending the entire screen) or in a smaller screen size (than the full screen size) depending on media content displayed on the main screen. In another example, the smart bar is in a user-specified size. In still another example, the smart bar is in a fixed size.

In some embodiments, a media platform system 106 functions to present on-demand and/or live media items 120 (e.g., a basketball game). The media platform system 106 may also provide a "stadium mode" that enables a user to watch media items 120 without advertisement interruption in a main screen, and provides an advertisement item 130 in a different portion of the screen (e.g., a portion dedicated to a banner advertisement 130). In one embodiment, the stadium mode can be activated by selecting a selectable object corresponding to the stadium mode in a smart bar. In some embodiments, the portion of the presented media item 120 that would typically be associated with a commercial break, or other advertisement break, can be associated with other media (e.g., a live feed of an arena during a basketball game, sideline interviews, and/or the like) while in stadium mode.

In some embodiments, the media platform system 106 functions to provide split presentation capabilities. Generally, split presentation allows the user to view multiple activities within a single display screen (e.g., TV screen). For example, one or more activities may be presented in different portions (e.g., windows) of the same display screen. It will be appreciated that any of the functionalities described herein (e.g., streaming, stadium mode, smart bar, and/or the like) may be performed simultaneously and/or in parallel using split presentation. In one example, a first window may display a movie, while a second window may display a sports program. Any number of such windows may be provided. In some embodiments, each portion of the split presentation may be executed by a different thread and/or set of threads. This may allow, for example, faster and/or more efficient execution of split presentation.

In some embodiments, a media platform system 106 functions to overlay media. For example, a user may select a first media stream (e.g., a video of a basketball game) and overlay and/or combine one or more additional media streams with the first media stream (e.g., music, third-party audio commentary, and/or the like). This may allow, for example, the user to achieve a more customized experience. For example, the user may view a live basketball and listen to audio commentary provided by a third-party instead of the audio commentary provided with the first video stream.

The media, social and market delivery system 108 may function to facilitate provision of media to media platform systems 106. In some embodiments, functionality of the media, social and market delivery system 108 is performed by one or more servers, workstations, desktop computers, laptop computers, mobile devices, and/or the like. In some embodiments, the media, social and market delivery system 108 comprises a cloud-based system. In some embodiments, the media, social and market delivery system 108 utilizes one or more delivery system interfaces 150 to facilitate communication between media provider systems 102, advertisement provider systems 104, and/or media platform systems 106.

In some embodiments, the media, social and market delivery system 108 stores user account information 152. The user account information 152 may be associated with users of the media platform systems 106. For example, the user account information 152 may include account name, account credentials (e.g., username/password), account subscriptions (e.g., HBO subscription), purchased media (e.g., movies) viewing history, linked social media accounts, and/or the like. The user account information 152 may be used to authenticate users logging in to media platform systems 106, determine targets advertisements 130 to display, specific billboard configurations, and/or the like.

In some embodiments, the media, social and market delivery system 108 functions to store and/or provide delivery system media items 154. The delivery system media items 154 may comprise the same type of media items 120 and/or may comprise other types of media. For example, the delivery system media items 154 may comprise media to be inserted and/or otherwise presented at particular times during stadium mode (e.g., when a commercial break would typically be presented).

The communications network 110 may represent one or more computer networks (e.g., LAN, WAN, or the like) or other transmission mediums. The communication network 110 may provide communication between systems 102-108 and/or components (e.g., engines, datastores) thereof. In some embodiments, the communication network 110 includes one or more computing devices, routers, cables, buses, and/or other network topologies (e.g., mesh, and the like). In some embodiments, the communication network 110 may be wired and/or wireless. In various embodiments, the communication network 110 may include the Internet, one or more wide area networks (WANs) or local area networks (LANs), one or more networks that may be public, private, IP-based, non-IP based, and so forth.

Figure 2:
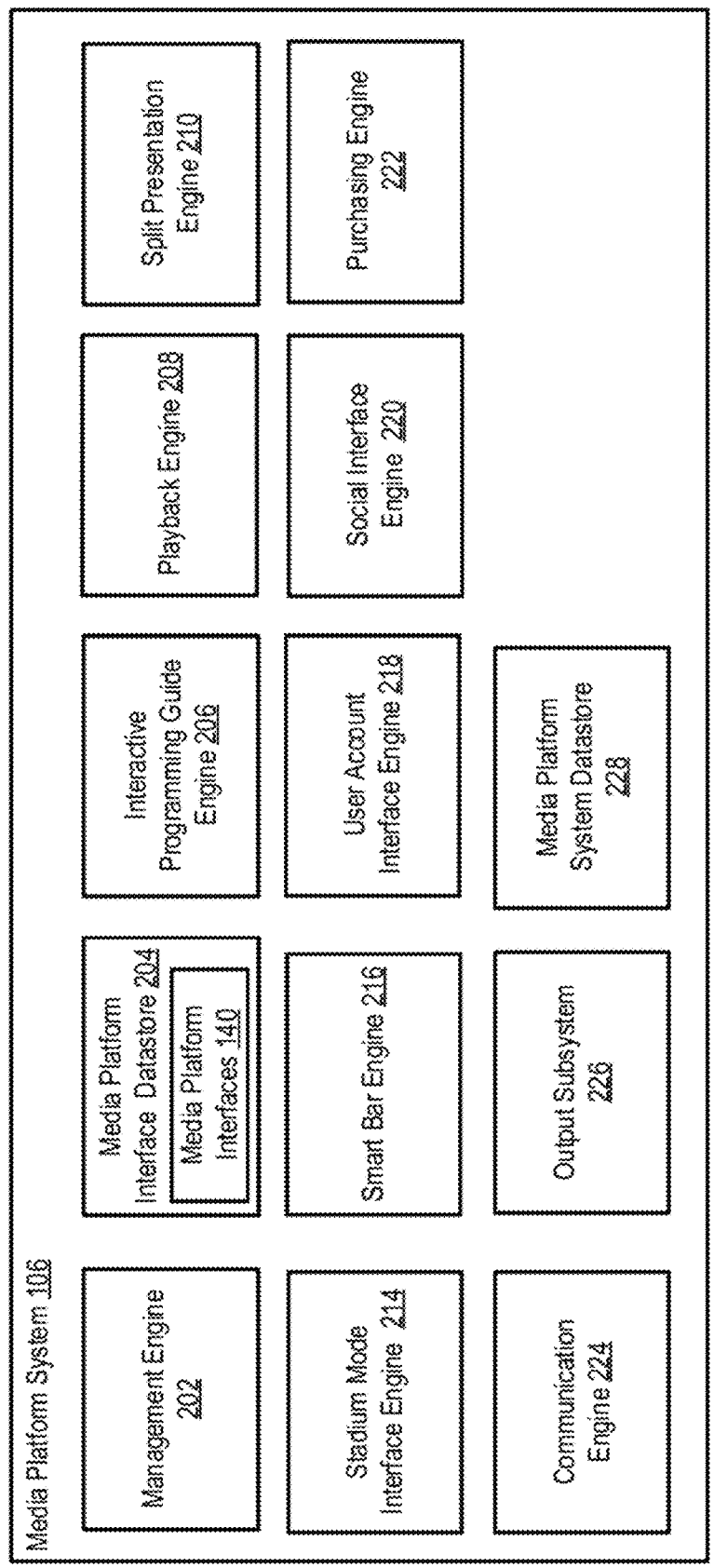
FIG. 2 illustrates a diagram of an example of an media platform system according to some embodiments.

FIG. 2 illustrates a diagram 200 of an example of an media platform system 106 according to some embodiments. In the example of FIG. 2, the media platform system 106 includes a management engine 202, media platform interface datastore 204, an interactive programming guide engine 206, a playback engine 208, a split presentation engine 210, a stadium mode interface engine 214, a smart bar engine 216, a user account interface engine 218, a social interface engine 220, a purchasing engine 222, a communication engine 224, an output subsystem 226, and a media platform system datastore 228.

The management engine 202 may function to manage (e.g., create, read, update, delete, or otherwise access) information. For example, the management engine 202 may function to manage media platform interfaces 140 stored in the media platform interface datastore 204, and/or other information stored temporarily (e.g., cached) and/or persistently by the media platform system 106 (e.g., by the media platform system datastore 228). The management engine 202 may perform any of these operations manually (e.g., by a user interacting with a GUI) and/or automatically (e.g., triggered by one or more of the engines 206-224, discussed herein). In some embodiments, the management engine 202 comprises a library of executable instructions, which are executable by one or more processors for performing any of the aforementioned management operations. Like the other engines described herein, some or all of the functionality of the management engine 202 may be implemented and/or included within one or more other engines and/or systems.

The interactive programming guide engine 206 may function to generate an interactive programming guide. The interactive programming guide engine 206 may function to generate graphical user interfaces and navigation flow for the features and/or graphical user interfaces described herein. For example, the interactive programming guide engine 206 may provide login graphical user interfaces, a billboard screen, a main menu screen, channel guide listings, television listings, movie listings, live media listings, favorites listings, games listings, music listings, friends listings, and/or the like. The interactive programming guide engine 206 may generate graphical user interfaces based on user account information 152, media provider information, and/or the like. An example navigational flow facilitated by the interactive programming guide engine 206 is shown in FIG. 4.

In some embodiments, the interactive programming guide engine 206 function to generate a billboard graphical user interface (or, simply, "billboard" or "billboard screen"). The media platform system 106 may dynamically generate the billboard screen in response to a user logging in to media platform system 106 (e.g., by entering username/password credentials that are verified by the media, social and market delivery system 108). Since it is dynamically generated, different users, or the same user logging in at different times, may be presented with a different billboard screen. In some embodiments, the billboard screen is capable of providing a user with media options that are associated with the user and enables the user to more efficiently proceed to media items and/or screens that the user is interested in. In one embodiment, the billboard screen is displayed before a main menu screen is displayed.

The playback engine 208 may function to playback media. The playback engine 208 may playback on-demand and/or live media. For example, the playback engine 208 may playback movies, music, live sporting events, and/or the like, for presentation through the output subsystem 226. The output subsystem 226 may comprise a TV display or other presentation device (e.g., computer screen, mobile device screen). Although the output subsystem 226 is shown as part of the media platform system 106, it will be appreciated that in some embodiments, the output subsystem 226 may not be included in the media platform system 106 (e.g., the media platform system 106 may connect to an output system or subsystem). The playback engine 208 may stream content in real-time, and/or decompress compressed media.

In some embodiments, the playback engine 208 may execute one or more media streams simultaneously and/or in parallel (e.g., layered streams).

The split presentation engine 210 may function to provide split presentation capabilities. Generally, split presentation allows the user to view multiple activities within a single display screen (e.g., TV screen). For example, one or more activities may be presented in different portions (e.g., windows) of the same display screen. It will be appreciated that any of the functionalities described herein (e.g., streaming, stadium mode, smart bar, and/or the like) may be performed simultaneously and/or in parallel using split presentation. In one example, a first window may display a movie, while a second window may display a sports program. Any number of such windows may be provided. In some embodiments, each portion of the split presentation may be executed a different thread and/or set of threads. This may allow, for example, faster and/or more efficient execution of split presentation.

The stadium mode interface engine 214 may function to provide a "stadium mode" that enables a user to be presented with media without advertisement interruption in a main screen, and provides an advertisement item in a different portion of the screen (e.g., a portion dedicated to a banner advertisement). In one embodiment, the stadium mode can be activated by selecting a selectable object corresponding to the stadium mode in a smart bar. In some embodiments, the portion of the presented media item that would typically be associated with a commercial break, or other advertisement break, can be associated with other media (e.g., a live feed of an arena during a basketball game, sideline interviews, and/or the like) while in stadium mode.

The smart bar engine 216 may function to generate context-specific graphical user interface navigation tools. For example, the media platform system 106 may generate a smart bar for display on a suitable output subsystem of the media platform system 106 (e.g., a TV). In one example, the smart bar may be a content-specific graphical user interface that dynamically changes display media therein based on media presented to a user. The smart bar may formed in an applicable direction depending on various criteria. For example, the smart bar may extend horizontally and/or vertically depending on an aspect ratio of a display device for displaying media content. In another example, the smart bar extends horizontally or vertically depending on user setting. In still another example, the smart bar is formed in a fixed direction. Further, the smart bar is positioned at an applicable position depending on various criteria. For example, the smart bar is positioned at a bottom edge or a top edge of the entire screen depending on media content to be displayed on the main screen. In another example, the smart bar is positioned at a user-specified position. In still another example, the smart bar is positioned at a fixed position. Moreover, the smart bar is in an applicable size depending on various criteria. For example, the smart bar is in an applicable size depending on various criteria. For example, the smart bar is in a full screen size (e.g., extending the entire screen) or in a smaller screen size (than the full screen size) depending on media content displayed on the main screen. In another example, the smart bar is in a user-specified size. In still another example, the smart bar is in a fixed size.

The user account interface engine 218 may function to receive and/or provide user account information. For example, the user account interface engine 218 may present graphical user interface(s) prompting a user to input user account information during registration, login, account updating, and/or the like. The user account information may be provided to a remote system (e.g., media, social and market delivery system 108) over a communication network (e.g., communication network 110).

The social interface engine 220 may function to receive and/or provide social media information. For example, the social interface engine 220 may cooperate with a remote server system (e.g., media, social and market delivery system 108) to present social media feeds and communications, communications with friends, and/or the like.

In some embodiments, the social interface engine 220 is configured to generate a friend request based on user interaction with the media platform system 106 and cause the communication engine 224 to transmit the generated friend request to one or more media platform systems 106. In some embodiments, the social interface engine 220 is configured to receive friend request(s) transmitted from one or more other media platform systems 106 through the communication engine 224 and generate a notification of the friend request to a user on a graphical user interface displayed on the output subsystem 226. In some embodiments, the social interface engine 220 is configured to generate an acceptance message upon user acceptance of the friend request on a graphical user interface displayed on the output subsystem 226 and cause the communication engine 224 to transmit to the acceptance message to the one or more other media platform systems 106 from which the friend request has been transmitted. Upon acceptance of a friend request, a user who sent the friend request and a user who accepted the friend request are connected as friends with each other. In a specific implementation, the information of the friend connection is stored in applicable datastore, such as datastore in the media, social, market delivery system 108 and/or datastores in each of the media platform systems 106 that have communicated for friend connection.

In some embodiments, the social interface engine 220 is configured to generate a graphical user interface for searching friends to be displayed on the output subsystem 226, and perform friend search based on user input of search keys and registered information of users. For example, the search keys may include one or more of name (real user name), user name on the system, user ID, phone number, email address, mail address, affiliated organization (e.g., school, company, local community clubs, etc.), user photo, and so on. In some embodiments, registered information of users used for the friend search may be limited to authorized information by each user. For example, when a user does not allow the user's email address to be used for friend search, the social interface engine 220 does not use the user's email address for the friend search.

The purchasing engine 222 may function to receive, process, and/or provide user input and related data regarding purchases (e.g., media purchases, physical goods purchases). The purchasing engine 222 may coordinate with one or more other engines (e.g., interactive programming guide engine 206, playback engine 208) to receive and/or provide user input regarding purchases (or, "purchase information") without leaving a currently displayed screen. For example, a user viewing a basketball game may purchase a physical good (e.g., shoes) without leaving the screen displaying the basketball game. This may, for example, improve engagement with the platform.

The communication engine 224 may function to send requests, transmit and, receive communications, and/or otherwise provide communication with one or a plurality of systems (e.g., systems 102-108). In some embodiments, the communication engine 334 functions to encrypt and decrypt communications. The communication engine 334 may function to send requests to and receive data from one or more systems through a network or a portion of a network. Depending upon implementation-specified considerations, the communication engine 334 may send requests and receive data through a connection, all or a portion of which may be a wireless connection. The communication engine 334 may request and receive messages, and/or other communications from associated systems. Communications may be stored at least temporarily (e.g., cached and/or persistently) in the media platform system datastore 228.

Figure 3:
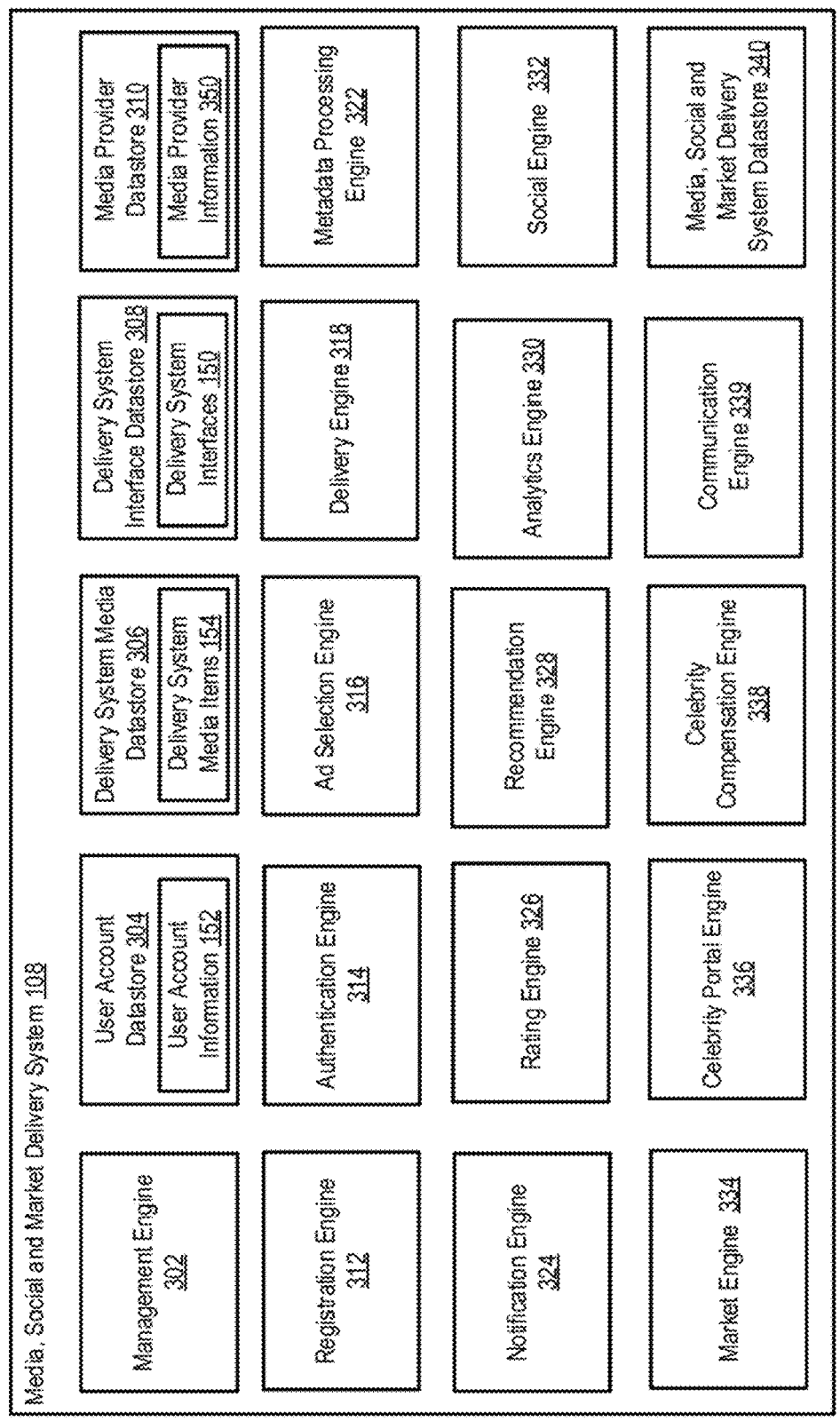
FIG. 3 illustrates a diagram of an example of a media, social and market delivery system according to some embodiments.

FIG. 3 illustrates a diagram 300 of an example of a media, social and market delivery system 108 according to some embodiments. In the example of FIG. 3, the media, social and market delivery system 108 includes a user account datastore 304, a delivery system datastore 306, a delivery system interface datastore 308, an media provider datastore 310, a registration engine 312, an authentication engine 314, an advertisement selection engine 316, a delivery engine 318, a metadata processing engine 322, a notification engine 324, a rating engine 326, a recommendation engine 328, an analytics engine 330, a social engine 332, a market engine 334, a celebrity portal engine 336, a celebrity compensation engine 338, and a media, social and market delivery system datastore 340.

The management engine 302 may function to manage (e.g., create, read, update, delete, or otherwise access) information. For example, the management engine 202 may function to manage user account information 152 stored in the user account datastore 304, delivery system media items 154 stored in the delivery system media datastore 306, delivery system interfaces 150 stored in the delivery system interface datastore 308, media provider information 350 stored in the media provider datastore 310, and/or other information stored temporarily (e.g., cached) and/or persistently by the media, social and market delivery system 108 (e.g., by the media, social and market delivery system datastore 340). The management engine 302 may perform any of these operations manually (e.g., by a user interacting with a GUI) and/or automatically (e.g., triggered by one or more of the engines 312-338, discussed herein). In some embodiments, the management engine 302 comprises a library of executable instructions, which are executable by one or more processors for performing any of the aforementioned management operations.

The user account information 152 may include a variety of data related to user accounts. For example, user account information 152 may include authentication credentials for logging a user into a media platform system 106, and/or other user account information. In some embodiments, the user account information 152 may include some or all of the following:
 User Account Identifier: identifies the user account.
 User Account Authentication Credentials: Username, password, and/or other authentication credentials (e.g., for multi-factor authentication).
 Name: name of user (e.g., Jason Smith).
 Mailing Address: mailing address of user.
 Email address: email address of user.
 Screenname: displayed screenname of user.
 Subscriptions: subscriptions to media services (e.g., Netflix, HBO), celebrities, etc.
 Media Purchases: purchased movies, television shows, music, games, and/or other media.
 Favorites: favorite movies, television shows, music, games, and/or other media.
 Friends: list and/or other structure of connections. Friends may comprise a tiered or other hierarchy of connections. For example, friends may be limited to only close connection (e.g., family member, close friend, etc.).
 Product Purchases: products (e.g., media items, physical goods) purchased through the platform.
 Linked Accounts: linked third-party accounts, such as social media accounts (e.g., Twitter).
 Communications: communication history with friends, celebrities, social media, etc.
 Ratings: ratings associated with media (e.g., a thumbs up/thumbs down).
 Recommendations: current and/or historical media recommendations. For example, movies that are currently recommended (e.g., based on ratings) and/or movies that have previously been recommended.
 Notifications: notification and/or other messages. For example, messages received from friends, notifications regarding subscriptions, notification of events (e.g., upcoming live events).

The media provider information 350 may include a variety of data related to media providers (e.g., Netflix, HBO). For example, the media provider information 350 may be used to authenticate access and/or register for subscriptions, purchase media, and/or the like. In some embodiments, the media provider information 350 may include some or all of the following:
 Media Provider: identifies the media provider.
 Location: identifies a URI or other electronic location of the media provider and/or associated systems.
 Services: services (e.g., subscriptions) provided by the media provider.
 Subscribed users: user accounts of the of the media, social and market delivery system 108 associated with the service(s).

The registration engine 312 may function to register user accounts and media providers. For example, registration engine 312 may receive user account information 152 and create and/or update records in the user account datastore 304, receive media provider information 350 and crate and/or update records in the media provider datastore 310, and so forth.

The authentication engine 314 may function to authenticate user account login requests, subscriptions, and/or other requests. For example, the authentication engine 314 may authenticate a user login request received from a media platform system 106, authenticate a request to view a subscription service to Netflix in response to a user attempting to access Netflix on the media platform system 106.

The advertisement selection engine 316 may function to select advertisements, and/or facilitate selection of advertisements, for presentation by remote systems (e.g., media platform system 106). In some embodiments, the advertisement selection engine 316 may select advertisements based on user account information 152, and/or coordinate with a third-party service to select advertisements. Selected advertisements may be used for generating billboard screens, presenting banner advertisements during stadium mode, and/or the like.

The delivery engine 318 may function to provide media to remote systems (e.g., media platform systems 106). For example, the delivery system 318 may deliver media items 120 and/or advertisements 130 received from remote systems (e.g., media provider systems 102, advertisement provider systems 104). In some embodiments, the delivery system 318 may provide delivery system media items 154 and/or other media (e.g., during stadium mode viewing). For example, the delivery system 318 may detect a flag or other indicator during a media stream, provide the delivery system media items 154 and/or other media for a period of time, and return the media stream after conclusion of the delivery system media items 154 and/or other media.

The metadata processing engine 322 may function to process metadata received from third-party systems. For example, the metadata processing engine 322 may receive channel guide listing metadata from HBO or other remote system in a format native to the origin system (e.g., an HBO format). The metadata processing engine 322 may translate the metadata into a playlist or other format capable of being processed by media platform systems 106. The processed metadata may be provided with a media streams in order for the media streams to be properly formatted and presented by the media platform systems 106.

The notification engine 324 may function to generate and/or store alerts and/or other notifications in one or more datastores (e.g., media, social and market delivery system datastore 340). Notifications may include communications with friends, administrators; communications related to subscriptions and/or purchases; and/or the like. The notification engine 324 may provide notifications to one or more remote systems (e.g., media platform systems 106).

The rating engine 326 may function to rate media automatically and/or in response to user input. For example, the rating engine 326 may rate movies according to a thumbs up/thumbs down rating system, star rating system, and/or the like. In another example, the rating engine 326 may rate media automatically based on user activity (e.g., the movies watched, tv watched, duration of time spent watching particular movies and/or types of movies, and/or the like).

The recommendation engine 328 may function to suggest media that may be of interest to a user. For example, the recommendation engine 328 may suggest media based on historical activities performed by the user and/or other user account information 152. The recommendation engine 328 may provide suggestions in a recommendation graphical user interface and/or based on context. For example, if a user historically watches a type of media (e.g., live Warriors basketball games) above a predetermined threshold level (e.g., greater than 25% of the live games), the recommendation engine 328 may prompt the user (e.g., via a notification issued by the notification engine 324) regarding one or more Warriors basketball games that are available for viewing (e.g., within a predetermined amount time before start of the game).

The analytics engine 330 may function to analyze user activity based on user account information 152 and/or other information. The analysis may be used to provide targeted advertisements, help inform the recommendation engine 328 and/or rating engine 326, and/or the like.

The social engine 332 may function to provide server-side functionality to provide social functions described herein. For example, the social engine 332 may cooperate with the social interface engine 220 to provide, store, and/or manage communications between friends and/or other connections.

The market engine 334 may function to provide a marketplace for users to purchase media, physical goods, and/or other products. Functionality of the marketplace may be integrated into one or more other features described herein. For example, the market engine 334 may allow a user viewing on-demand media to purchase products without leaving the screen presenting the on-demand media.

The celebrity portal engine 336 may function to present a portal for celebrities and/or other types of specialized users. For example, celebrity portals may a allow an actor (e.g., Jamie Foxx) to advertise products, provide customized media streams (e.g., live and/or on-demand), share their viewing and/or other activity (e.g., communications with other celebrities) with subscribers.

The celebrity compensation engine 338 may function to automatically compensate celebrities for activities performed by users with respect to their celebrity portal. For example, the celebrity compensation engine 338 may provide a portion of revenue generated from the purchase of goods through their portal directly to an account associated with the celebrity. This may allow, for example, celebrities to be quickly and efficiently compensated for endorsed products.

The communication engine 339 may function to send requests, transmit and, receive communications, and/or otherwise provide communication with one or a plurality of systems (e.g., systems 102-108). In some embodiments, the communication engine 339 functions to encrypt and decrypt communications. The communication engine 339 may function to send requests to and receive data from one or more systems through a network or a portion of a network. Depending upon implementation-specified considerations, the communication engine 339 may send requests and receive data through a connection, all or a portion of which may be a wireless connection. The communication engine 339 may request and receive messages, and/or other communications from associated systems. Communications may be stored at least temporarily (e.g., cached and/or persistently) in the media, social and market delivery system datastore 340.

FIG. 4 illustrates a flowchart 400 of an example graphical user interface navigational flow of a media platform system (e.g., media platform system 106) according to some embodiments. An interactive programming guide engine (e.g., interactive programming guide engine 206) may control the navigation flow (e.g., in response to user input and/or automatically) and/or generate some or all of the associated graphical user interfaces. In this and other flowcharts, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. It will further be appreciated that singular terms (e.g., "graphical user interface") may include the singular and/or plural variants (e.g., "graphical user interfaces").

In step 402, a media platform system (e.g., media platform system 106) logs a user into a user account. The user account may be managed by a remote server system (e.g., a media, social and market delivery system 108). The login may occur automatically (e.g., a user logged in previously and the credentials were stored on the media platform system), and/or the login may occur manually (e.g., a login screen may be displayed and the user may be prompted to enter a username and password). The media platform system may provide the credentials to the remote server system for authentication.

In step 404, the media platform system presents a billboard screen. In some embodiments, the billboard screen is presented in response to user account authentication. In some embodiments, the billboard screen may be generated dynamically and/or in-real time.

In step 406, the media platform system presents a main menu screen. From the main menu screen, a user may navigate to various graphical user interfaces and/or features of the system, such as an application graphical user interface (4012), Internet access graphical user interface (4008), social graphical user interface (4020), TV media graphical user interface (4022), film media features graphical user interface (4024), live media graphical user interfaces (4026), favorite media graphical user interface (4028), game media graphical user interface (4030), music media graphical user interface (4032), and rewards graphical user interface (4034).

In the example of FIG. 4, the media platform system allows the user to navigate to a friends graphical user interface (4040) from the social graphical user interface. In the friends graphical user interface, for example, users may video conference and/or text and/or see what games friends are playing, what they are watching, what they are listening to, and/or other perform other activities. From the TV media graphical user interface, the system may provide functionality for previewing, purchasing, and/or playing TV media (4042). From the film media graphical user interface, the system may provide functionality for or previewing, purchasing, and/or playing film media (4044). From the live media graphical user interface, the system may provide functionality for presenting international channels, sports, and/or other live media (4048). From the favorites media graphical user interface, the system may provide functionality for viewing favorites (4048). From the games media graphical user interface, the system may provide functionality to demo, preview, purchase and/or play games (4044). From the music media graphical user interface, the system may provide functionality for previewing, purchasing, and/ or playing music media (4052). From the rewards graphical user interface, the system may provide functionality for using points to apply to online purchase.

In step 447, the media platform system may present a stadium mode. Although the stadium mode is shown here with respect to live media, it will be appreciated that various embodiments may provide stadium mode functionality for any type of media presentation.

In step 4070, the media platform system presents a celebrity portal graphical user interface, from which users may subscribe to favorite celebrities to gain access to exclusive content (4072).

In step 480, the media platform system provides functionality to purchase products (e.g., from some or all of other graphical user interfaces described herein). For example, a user viewing live basketball game stream in stadium mode may be able to purchase a product without leaving the stadium mode graphical user interface.

Figure 5:
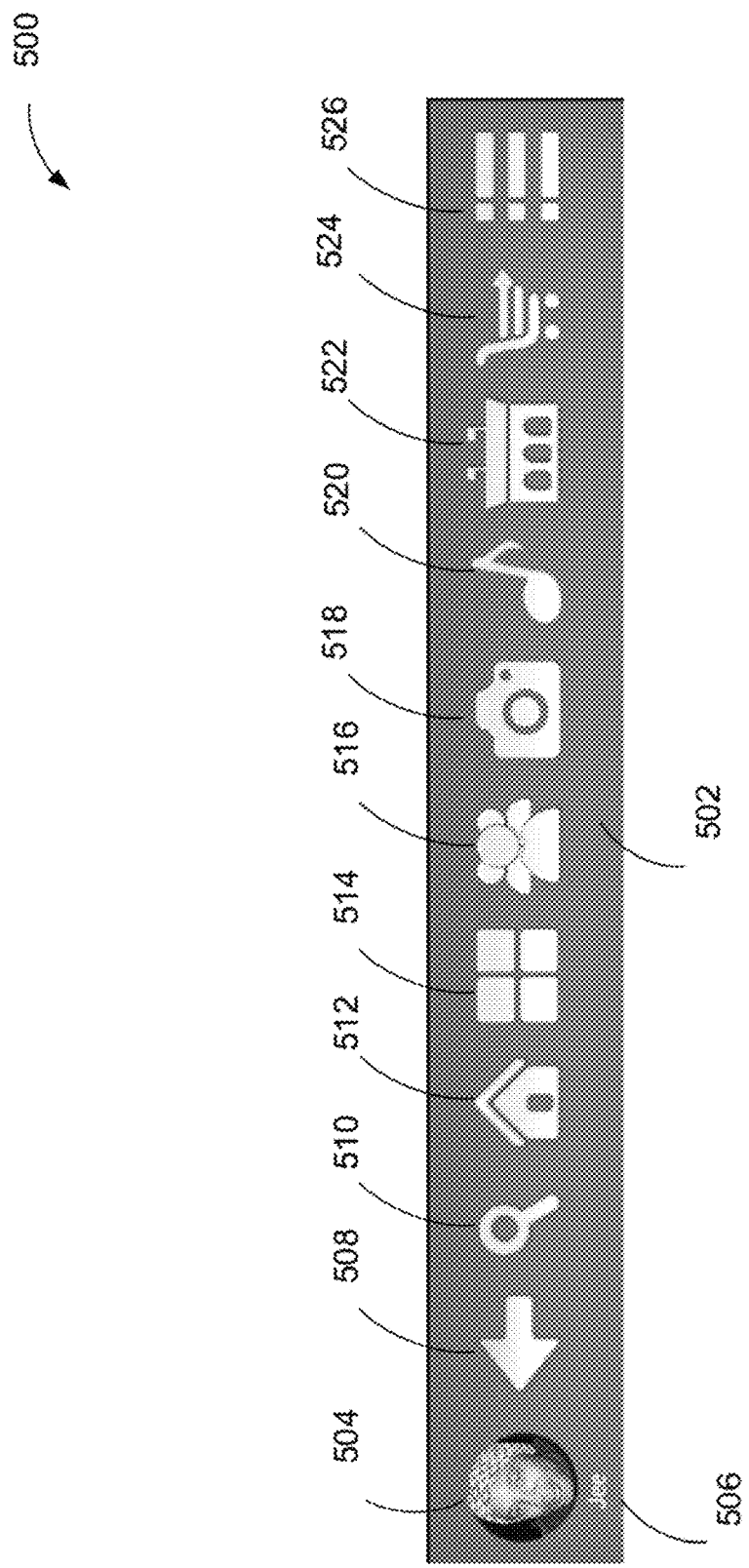
FIG. 5 illustrates a portion of an example of a display corresponding to a smart bar according to some embodiments.

FIG. 5 illustrates a portion 500 of an example of a display corresponding to a smart bar 502 according to some embodiments. In some embodiments, display media content of the smart bar 502 is generated by an applicable GUI engine, such as the smart bar engine (e.g., the smart bar engine 216 in FIG. 2) discussed in this paper. In some embodiments, the smart bar 502 is caused to be displayed on an applicable display device, such as the output subsystem (e.g., the output subsystem 226 in FIG. 2) discussed in this paper. For example, the applicable display device display may include a television, a monitor, a laptop computer, a tablet, a smartphone, a watch, a signage system, a projector screen, and so on.

In the example of FIG. 5, the portion 500 includes a smart bar 502, which is a content-specific GUI that dynamically changes display media content therein based on content presented to a user. The smart bar 502 is formed in an applicable direction depending on various criteria. For example, the smart bar 502 extends horizontally or vertically depending on an aspect ratio of a display device for displaying media content. In another example, the smart bar 502 extends horizontally or vertically depending on user setting. In still another example, the smart bar 502 is formed in a fixed direction. Further, the smart bar 502 is positioned at an applicable position depending on various criteria. For example, the smart bar 502 is positioned at a bottom edge or a top edge of the entire screen depending on media content to be displayed on the main screen. In another example, the smart bar 502 is positioned at a user-specified position. In still another example, the smart bar 502 is positioned at a fixed position. Moreover, the smart bar 502 is in an applicable size depending on various criteria. For example, the smart bar 502 is in an applicable size depending on various criteria. For example, the smart bar 502 is in a full screen size (e.g., extending the entire screen) or in a smaller screen size (than the full screen size) depending on media content displayed on the main screen. In another example, the smart bar 502 is in a user-specified size. In still another example, the smart bar 502 is in a fixed size.

In the example depicted in FIG. 5, the smart bar 502 includes a user-specific window 504, a user-specific label 506, a plurality of selectable objects 508-526 for selecting functions. The user-specific window 504 includes user-specific content, which is intended to indicate that the smart bar 502 is associated with a specific user. In a more specific implementation, the user-specific window 504 indicates a user-specific image, such as a user-specific picture, a user-specific illustration, a user-specific logo, and so on. For example, a face picture of a user is displayed in the user-specific window 504 as depicted in FIG. 5. Further, the user-specific window 504 is in an applicable shape. In an example, the user-specific window 504 is in a shape of a circle, oval, square, rectangular, and so on. Moreover, the shape of the user-specific window 504 may be fixed, or the shape of the user-specific window 504 may be modifiable in accordance with user preference. Furthermore, a background of the smart bar 502 is in an applicable format depending on various criteria. For example, depending on media content in a main screen, on which, in one embodiment, the smart bar 502 is overlaid, the smart bar 502 is switched between a transparent background and a non-transparent background.

In the example depicted in FIG. 5, the user-specific label 506 includes user-specific content similarly to the user-specific window 504. In a more specific implementation, the user-specific label 506 indicates user-specific text, such as user name and user ID. Further, the user-specific label 506 can be in an applicable format. In an example, the user-specific label 506 is a specific font, a specific size, a specific color, a specific background, and so on. Moreover, the format of the user-specific label 506 may be fixed, or the shape of the user-specific label 506 may be modifiable in accordance with user preference.

Figure 15:
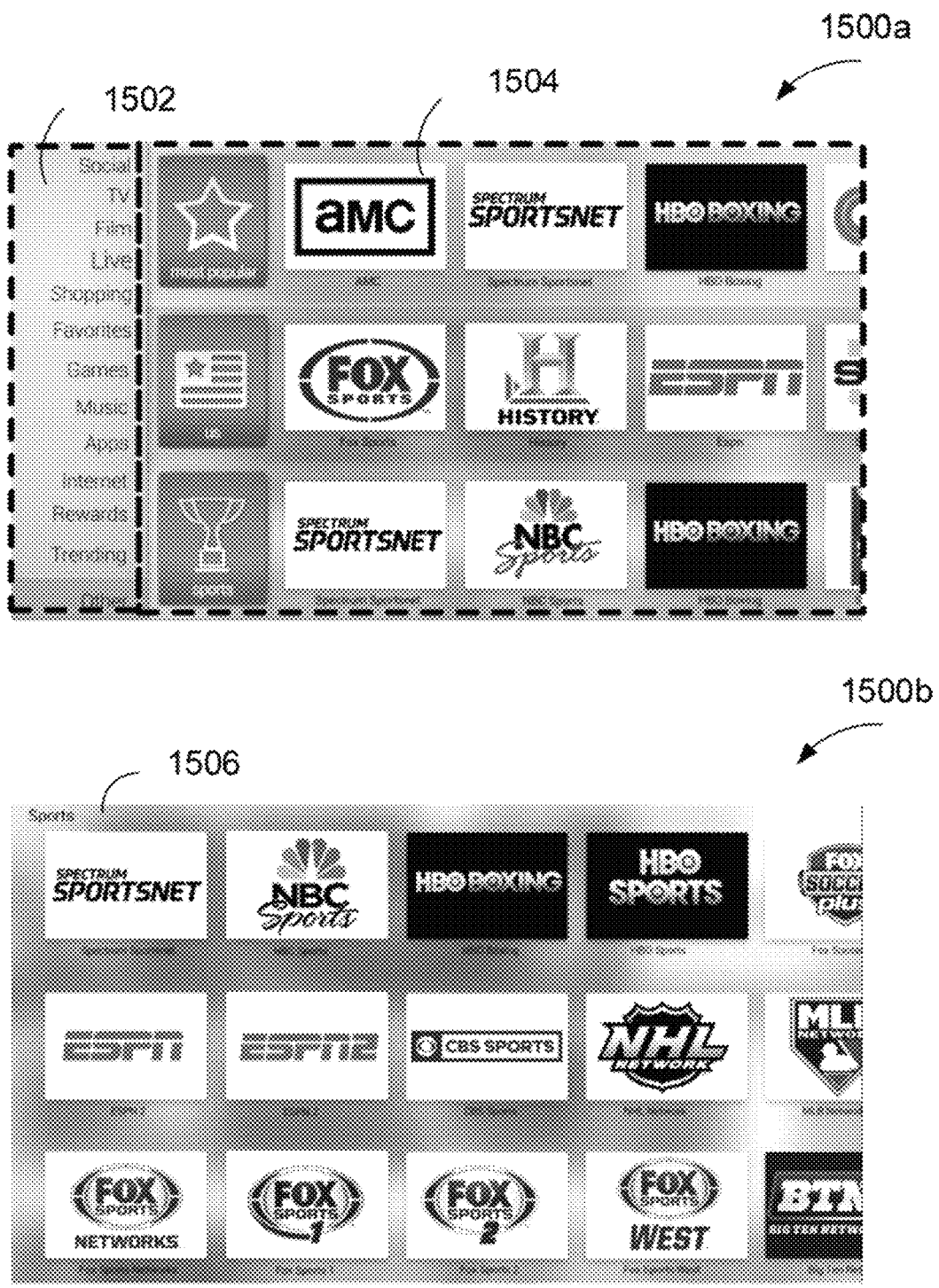
FIGS. 15-17 illustrate an example of screen transition to activate a stadium mode.
Figure 23:
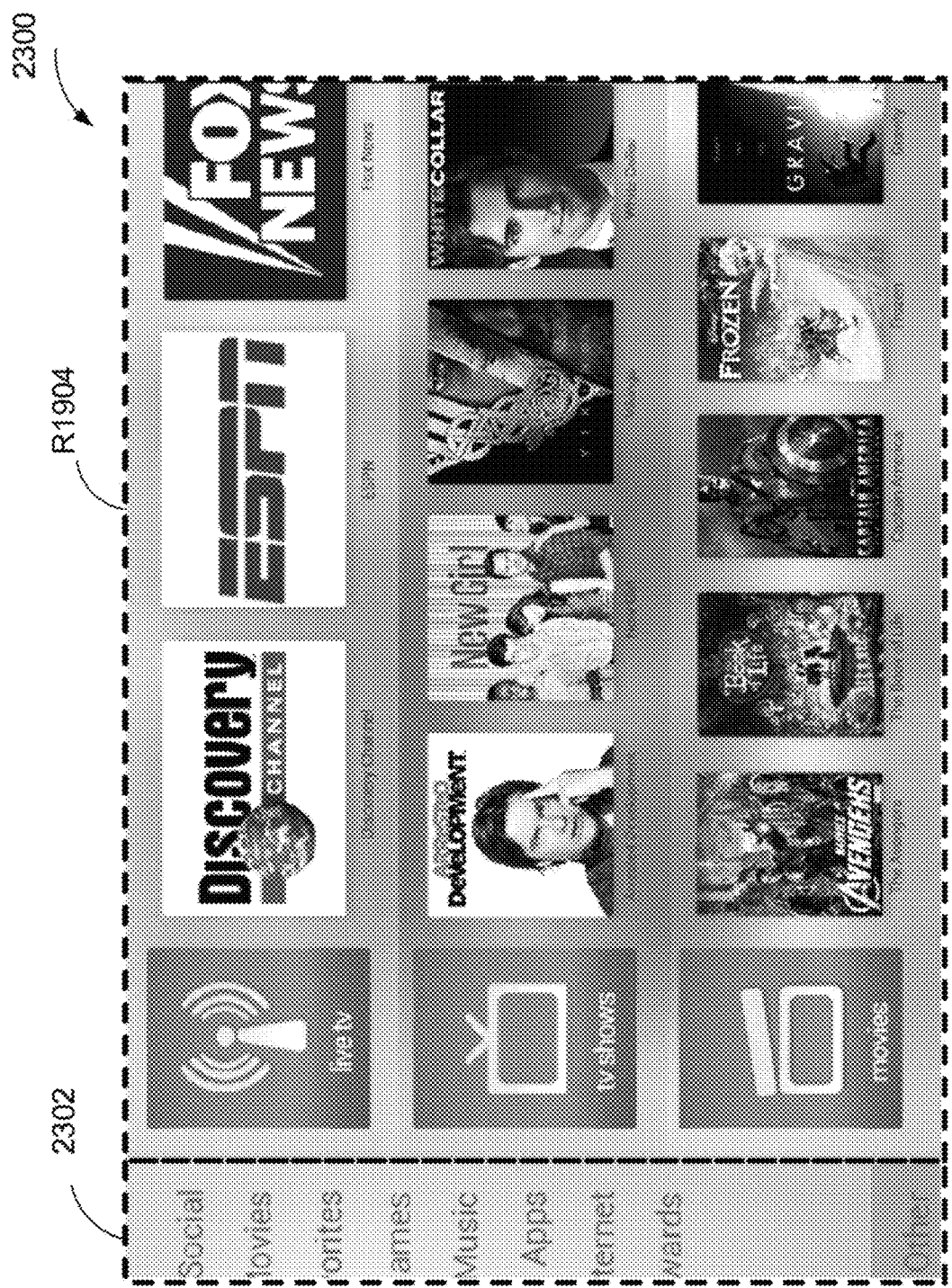

In the example depicted in FIG. 5, the plurality of selectable objects 508-526 include a selectable object 508 for exiting the smart bar 502, a selectable object 510 for searching, a selectable object 512 for going to a main menu (e.g., the main menu in FIG. 15 (specifically, 1500*a*), and FIG. 23), a selectable object 514 for splitting a main screen of the display, a selectable object 516 for interacting with friends, a selectable object 518 for using an imaging device (e.g., camera) coupled to a media platform system (e.g., the media platform system 106 in FIG. 1), a selectable object 520 for accessing audio content, a selectable object 522 for activating/deactivating a stadium mode, a selectable object 524 for activating/deactivating a purchasing mode, and a selectable object 526 for pulling up one or more additional functions. Further, each of the selectable objects 508-526 can be in an applicable format (shape, size, and color). In an example, a color of the selectable objects 508-526 are the same when an indicator (e.g., cursor) for selection is not placed in the selectable objects 508-526, and the color of one of the selectable objects 508-526 at which the indicator (e.g., cursor) for selection is placed is changed to a different color. Moreover, the format of the selectable objects 508-526 may be fixed, or the format of the selectable objects 508-526 may be modifiable in accordance with user preference. Specific functions corresponding to the selectable objects 514-526 are described elsewhere herein in more detail.

In some embodiments, among the plurality of selectable objects 508-526, one or more selectable objects corresponding to available functions are selectively displayed in the smart bar 502. That is, one or more selectable objects corresponding to unavailable functions are not displayed in the smart bar 502. In some embodiments, the available functions and the unavailable functions vary depending on media content presented to the user through the media platform system. For example, the available functions and the unavailable functions vary depending on display media content displayed on the main screen of the display. In another example, the available functions and the unavailable functions vary depending on audio content presented. It is noted that, in some embodiments, the user-specific window 504 and the user-specific label 506 are displayed in the smart bar 502 regardless of available functions.

In some embodiments, one or more of the plurality of selectable objects 508-526 corresponding to available functions are arranged in an applicable order depending on various criteria. For example, one or more of the selectable objects 508-526 corresponding to available functions are arranged in an ascending or descending order of use frequency of the selectable objects 508-526. In another example, one or more of the selectable objects 508-526 corresponding to available functions are arranged in a user-specified order. In still another example, one or more of the selectable objects 508-526 corresponding to available functions are arranged in a fixed order. In a more specific implementation, when the one or more of the selectable objects 508-526 corresponding to available functions are arranged in a fixed order, the one or more of the selectable objects 508-526 are aligned to be at a regular interval each other (e.g., the arrangement shown in FIG. 6).

Depending upon a specific implementation of the embodiment, a display manner of the smart bar 502 after one of the selectable objects corresponding to available functions is selected can employ various options. For example, the smart bar 502 disappears in response to selection of one of the selectable objects corresponding to available functions. In another example, the smart bar 502 disappears only upon selection of the selectable object 508 for exiting the smart bar function.

Figure 6:
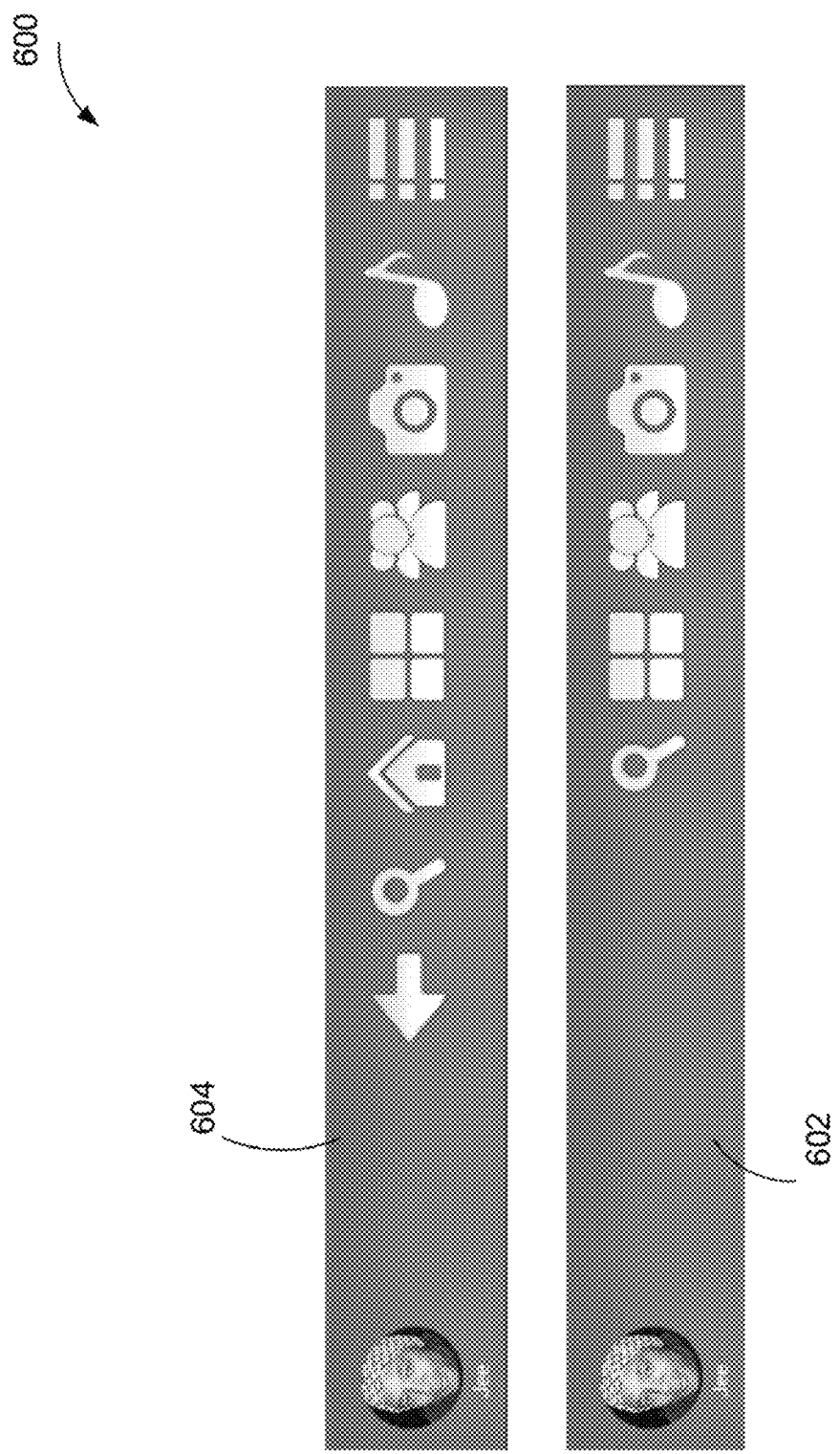
FIG. 6 illustrates an example of two smart bars in two different states according to some embodiments.

FIG. 6 illustrates an example of two smart bars 602 and 604 in two different states according to some embodiments. In the example of FIG. 2R, the smart bar 602 corresponds to a state where functions of exiting the smart bar, searching, going to the main menu, splitting screen, interacting with friends, using a imaging device, accessing audio content, and going to additional function(s) are available. In other words, the other functions (e.g., the stadium mode and the purchase mode) than these functions are not available. On the other hand, the smart bar 604 corresponds to a state where functions of searching, splitting screen, interacting with friends, using a imaging device, accessing audio content, and going to additional function(s) are available. In other words, the other functions (e.g., exiting the smart bar, going to the main menu, the stadium mode and the purchase mode) than these functions are not available.

Advantageously, since (non-selectable) objects corresponding to unavailable functions are not displayed in the smart bar, it is possible to provide a more user-friendly graphical user interface (GUI). Specifically, a user can more efficiently select one of selectable objects corresponding to available functions without being destructed to (non-selectable) objects corresponding to unavailable functions. In other words, it is possible to prevent user operation to select objects corresponding to unavailable functions repeatedly.

Figure 7:
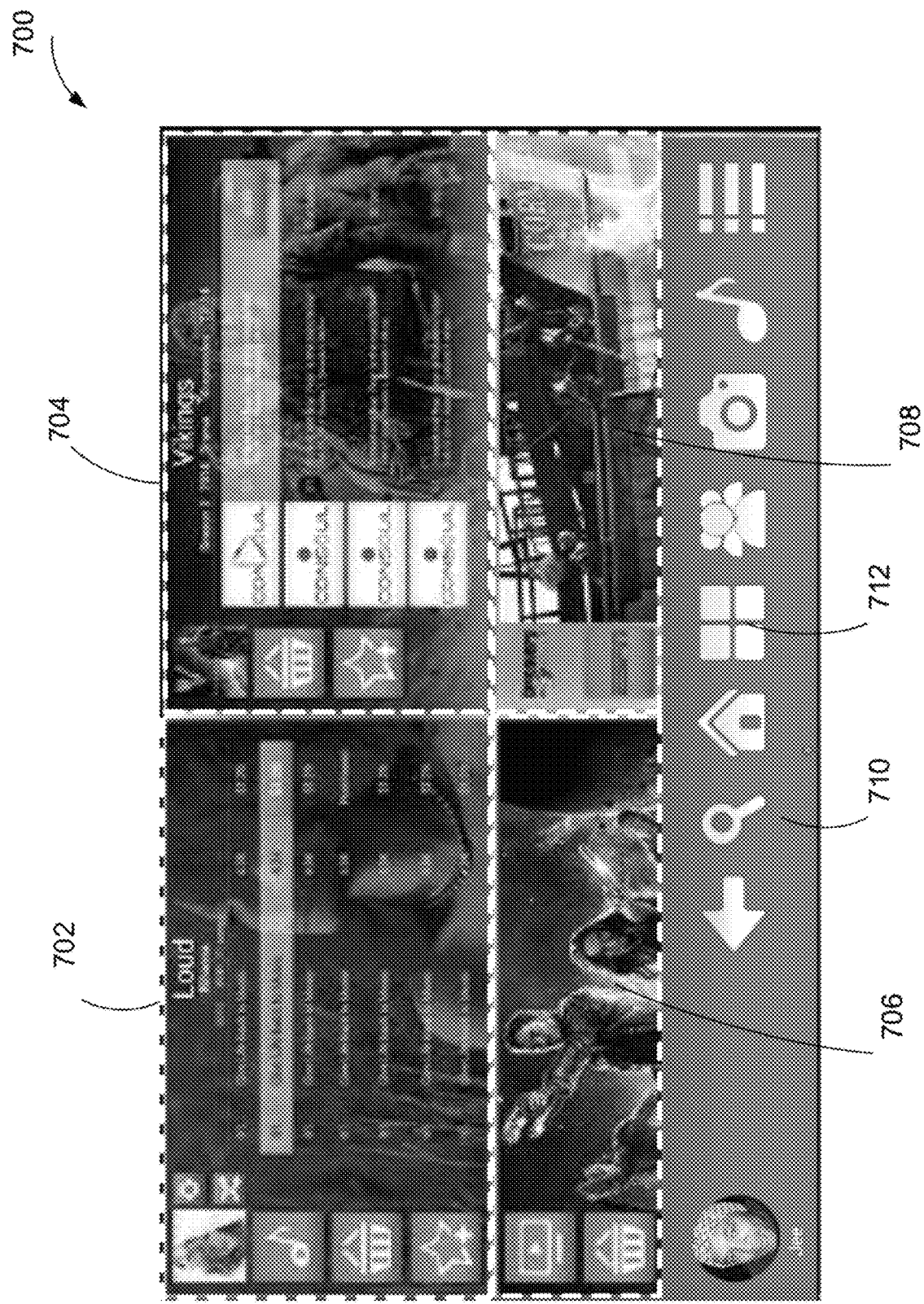
FIG. 7 illustrates an example of a screen 700 displayed on a display screen by a media platform system when a selectable object for splitting screen was selected according to some embodiments.

FIG. 7 illustrates an example of a screen 700 displayed on a display screen by a media platform system when a selectable object for splitting screen was selected according to some embodiments. In the example depicted in FIG. 7, the screen 700 includes a main screen that includes four split screens 702, 704, 706, and 708, and a smart bar 710 overlaid on the main screen at the bottom edge of the main screen. The smart bar 710 includes a non-transparent background and a selectable object 712 for splitting screen, and the main screen is at a state after the selectable object 712 has been selected.

When the selectable object 712 for splitting screen is selected in the smart bar 710, a user is capable of splitting the main screen into two sub-screens. For example, when a main screen includes a non-split single screen, by selecting the selectable object 712 in the smart bar 710, a user is capable of splitting the non-split single screen into two sub-screens. In another example, when a main screen includes the two sub-screens, a user is capable of splitting one or both of the two sub-screens into two mini screens, respectively (i.e., four mini screens). In a more specific implementation, when a main screen includes the two sub-screens and a user splits only one of the two sub-screens, four mini screens are displayed and one of the four mini screens may display a blank space or a main menu.

In some embodiments, the function of splitting screen is implemented by an applicable engine such as a split presentation engine (e.g., the split presentation engine 210 in FIG. 2). In some embodiments, the function of splitting screen is available unless the main screen has been already split into a maximum number. The maximum number is, in an implementation, an exponential number of two. For example, the maximum number is four. In some embodiments, a size of split screens (e.g., the sub-screens and mini screens) is in an applicable size. For example, the split screens have a size so as to fill the entire main screen. In another example, the split screens have a size so as to create some gaps between the split screens. An aspect ratio of the split screens is in an applicable ratio. For example, the split screens have an equal aspect ratio, which may be the same aspect ratio of the non-split screen.

Figure 8:
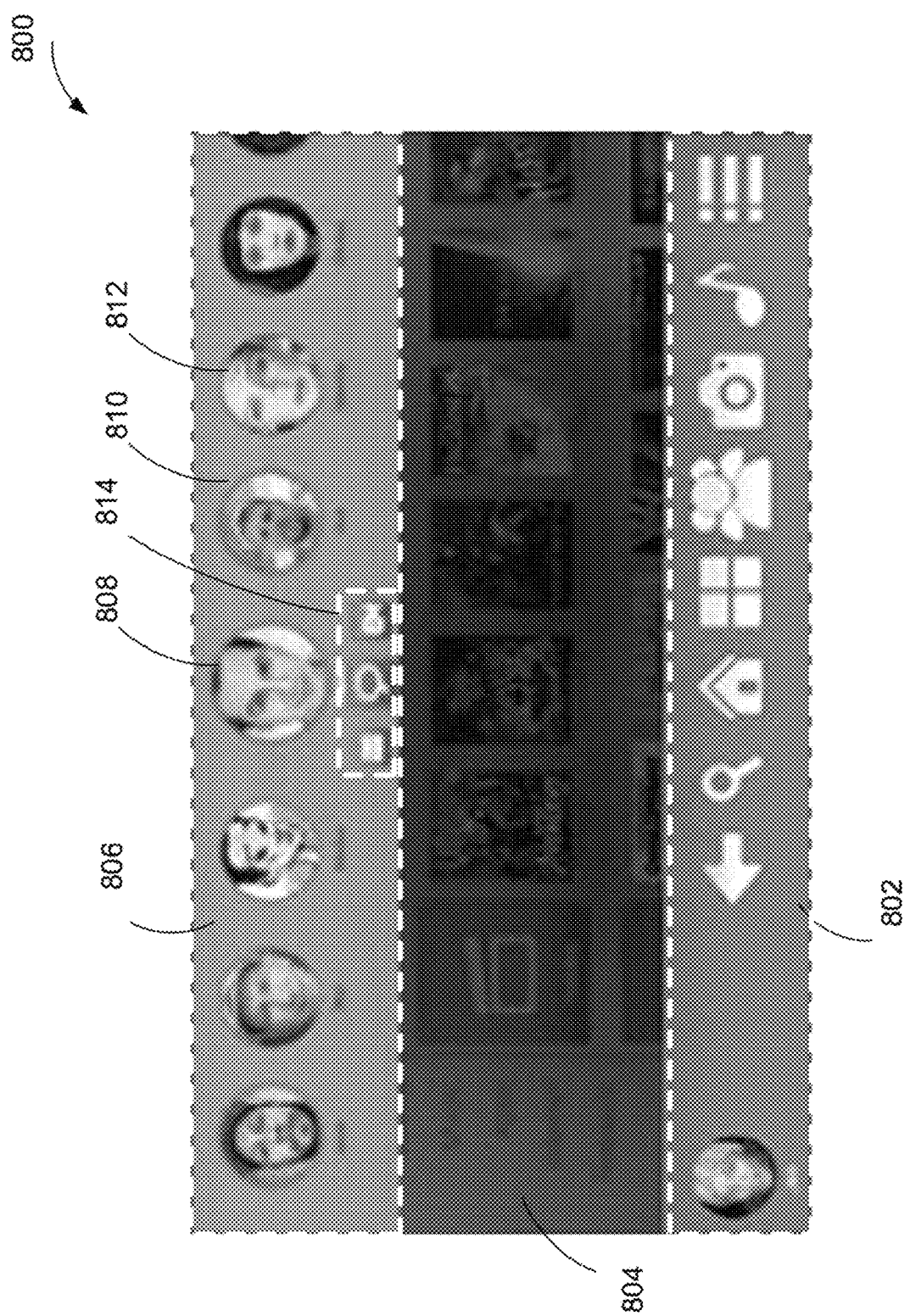
FIG. 8 illustrates another example of a screen displayed on a display screen by a media platform system when a selectable object for interacting with friends was selected according to some embodiments.

FIG. 8 illustrates another example of a screen 800 displayed on a display screen by a media platform system when a selectable object for interacting with friends was selected according to some embodiments. In the example depicted in FIG. 8, the screen 800 includes a main screen 802, a smart bar 804 overlaid on the main screen 802 at the bottom edge of the main screen 802, and a tool bar 806 for interaction with friends that is also overlaid on the main screen 802 at the top edge of the main screen 802. The smart bar 804 includes a selectable object 808 for interacting with friends, and the main screen 802 is at a state after the selectable object 808 has been selected.

When the selectable object 808 for interacting with friends is selected in the smart bar 804, a user is capable of interacting with friends who have accounts for a service of media, social, and market delivery provided by a media, social, market delivery system (e.g., the media, social, market delivery system 108 in FIG. 1), and also are online, i.e., currently using the service. In the example of FIG. 8, the tool bar 806 includes an on-target selectable object 808, which is positioned at a center of the tool bar 806, selectable objects 812 for online friends, selectable object 810 for offline friends, and communication tool objects 814 for the on-target selectable object 808. In some embodiments, the on-target selectable object 808, the selectable objects 812 for online friends, the selectable object 810 for offline friends includes an image specific to the friends, which are for example, pictures of the friends and illustration of the friends.

In some embodiments, the on-target selectable object 808 is for a friend user for whom communication can be started using the communication tool objects 814. In a specific implementation, the size of the on-target selectable object 808 is larger than the size of the selectable objects 812 for online friends and the size of the selectable object 810 for offline friends. In a specific implementation, the selectable objects 812 for online friends are indicated with a highlighted contour, and the selectable object 810 for offline friends are not indicated with the highlighted contour, such that the online friends and the offline friends can be efficiently distinguished. In a specific implementation, the communication tool objects 814 include one or more selectable objects corresponding to different communication tools, such as emails, instant messages (IM), voice conversation, and video conversation. Further, when a plurality of selectable objects are included in the communication tool objects 814, the selectable objects include an on-target selectable object for which communication can be instantly started by selection thereof, and off-target selectable object for which the off-target selectable object has to be selected first to switch the off-target selectable object to an on-target selectable object before starting communication.

In some embodiments, the function of interacting with friends is implemented by an applicable engine such as a social interface engine (e.g., the social interface engine 220 in FIG. 2). In some embodiments, the function of interacting with friends is available when a user has at least one friend user (either online or offline) and not available when the user has no friend user (either online or offline). In another embodiment, the function of interacting with friends is available when a user has at least one friend user who is online and not available when the user has no friend user who is online. In some embodiments, when the number of friends of a user is greater than a maximum number that fit in the tool bar 806, the selectable objects 810, 812, and 814 are scrollable. In still another embodiment, the function of interacting with friends is available when media content presented to a user (e.g., display media content displayed on a screen) is associated with interaction with friends. For example, the presented media content provides a chat space for interaction with friends.

Figure 9:
FIG. 9 illustrates another example of a screen displayed on a display screen by a media platform system when a selectable object for using an imaging device was selected according to some embodiments.

FIG. 9 illustrates another example of a screen 900 displayed on a display screen by a media platform system when a selectable object for using an imaging device was selected according to some embodiments. In the example depicted in FIG. 9, the screen 900 includes a main screen 902, a tool bar 904 for using imaging device that is separately provided from the main screen 902 at the right edge of the main screen 902, and a smart bar 906 overlaid on the main screen 902 and the tool bar 904 at the bottom edge of the main screen 902. The smart bar 906 includes a selectable object 908 for using imaging device, and the main screen 902 is at a state after the selectable object 908 has been selected.

When the selectable object 908 for using imaging device is selected in the smart bar 906, a user is capable of using an imaging device (e.g., camera) that is coupled to the media platform displaying the main screen 902. In the example of FIG. 9, the tool bar 904 includes an selectable object 910 for taking a picture and a selectable objects 912 for taking video. In a specific implementation, one of selectable objects included in the tool bar 904 is an on-target selectable object that is selectable for instantly starting the corresponding function by selecting the selectable object, and the other of the selectable objects included in the tool bar 904 are off-target selectable objects that needs selection of the selectable object to switch to an on-selectable object before starting the corresponding function.

In some embodiments, the function of using imaging device is available when an applicable imaging device is coupled to the media platform system that displays the main screen 902 and not available when no applicable imaging device is coupled to the media platform system. In another embodiment, the function of using imaging device is available when media content presented to a user (e.g., display media content displayed on a screen) is associated with user interaction using imaging device. For example, the presented media content provides an interactive event that user can participate in.

Figure 10:
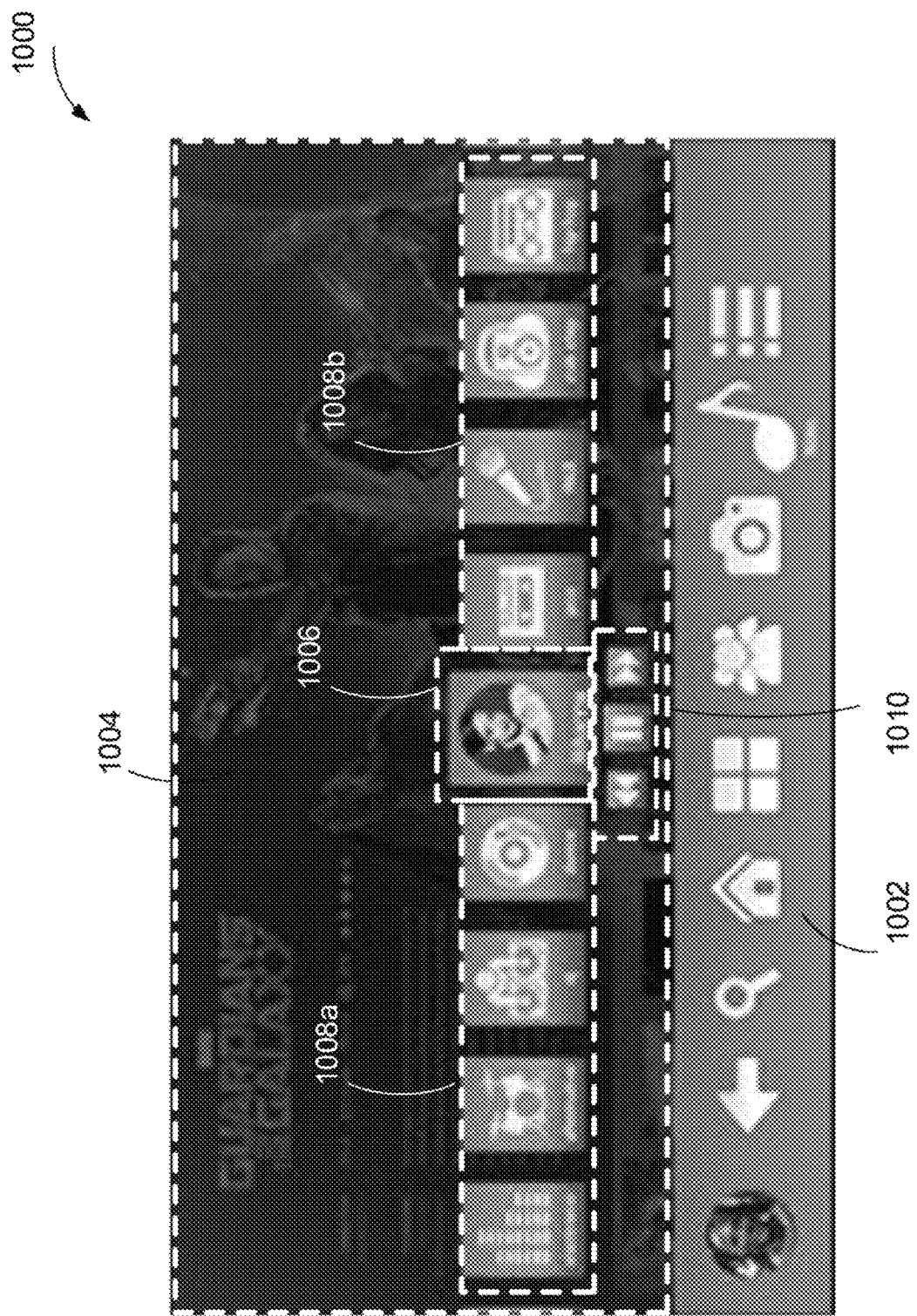
FIG. 10 illustrates another example of a screen displayed on a display screen by a media platform system when a selectable object for accessing audio content was selected according to some embodiments.

FIG. 10 illustrates another example of a screen 1000 displayed on a display screen by a media platform system when a selectable object for accessing audio content was selected according to some embodiments. In the example depicted in FIG. 10, the screen 600 includes a main screen 1002, a smart bar 1004 overlaid on the main screen 1002 at the bottom edge of the main screen 1002, and a tool bar 1006 for accessing audio content that is also overlaid on the main screen 1002 at the middle of the main screen 1002. The smart bar 1004 includes a selectable object 1008 for accessing audio content, and the main screen 1002 is at a state after the selectable object 1008 has been selected.

When the selectable object 1008 for accessing audio content is selected in the smart bar 1004, a user is capable of accessing audio content, which may include live streaming content (e.g., radio content), recorded streaming content (e.g., a music album), and local content stored locally in the media platform system. In the example of FIG. 10, the tool bar 1006 includes an on-target selectable object 1010, which is positioned at a center of the tool bar 1006, off-target selectable objects 1012, and communication tool objects 1014 for the on-target selectable object 1010. In some embodiments, the on-target selectable object 1010 and the off-target selectable objects 1012 include an image specific to audio content, which are for example, pictures of an artist and a genre of audio content.

In some embodiments, the on-target selectable object 1010 is for audio content for which content can be played back using the communication tool objects 1014. In a specific implementation, the size of the on-target selectable object 1010 is larger than the size of the off-target selectable objects 1012. In In a specific implementation, the communication tool objects 1014 include one or more selectable objects to manipulate playback of the audio content, such as a selectable object for pause, a selectable object for skipping content, a selectable object for returning to previous content, and so on.

In some embodiments, the function of accessing audio content is implemented by an applicable engine such as a playback engine (e.g., the playback engine 208 in FIG. 2). In some embodiments, the function of accessing audio content is available when a user has at least one accessible audio content and not available when the user has no accessible audio content.

Figure 11:
FIG. 11 illustrates another example of a screen displayed on a display screen by a media platform system when a selectable object for a purchasing mode was selected according to some embodiments.

FIG. 11 illustrates another example of a screen 1100 displayed on a display screen by a media platform system when a selectable object for a purchasing mode (e.g., the selectable object 524 in FIG. 5) was selected according to some embodiments. In the example depicted in FIG. 11, the screen 700 includes a main screen 1102 and a sub screen 1104 disposed separately from the main screen 1102 at the bottom edge of the main screen 1102. In a specific implementation, the sub screen 1104 includes an on-target selectable object 1106 associated with the main screen 1102 and one or more off-target selectable objects 1108. Further, in a specific implementation, each of the on-target selectable object 1106 and the one or more off-target selectable objects 1108 includes a thumbnail image of a corresponding product, a product name, a price, and so on. Moreover, in a specific implementation, the main screen 1102 includes an enlarged image of a corresponding product, an enlarged product name, an enlarged price, a brand logo, and so on.

In some embodiments, the function of the purchasing mode is implemented by an applicable engine such as a purchasing engine (e.g., the purchasing engine 222 in FIG. 2). In some embodiments, the function of the purchasing mode is available when at least an applicable product is associated with media content presented to a user in association with a main screen (before starting the purchasing mode), and not available when no applicable product is associated with the media content presented to the user. In a more specific implementation, when display media content includes an image of a product (e.g., a sunglasses worn by an actor) that is purchasable through the purchasing mode, the purchasing mode becomes available. The time period during which the purchasing mode is available is set depending on various criteria. For example, the purchasing mode is available only during a time period while the purchasable product is on a screen. In another example, the purchasing mode is available for a predetermined period of time (e.g., 3 mins) after the purchasable product has been shown on a screen. In still another example, the purchasing mode is available during a media content program after the purchasable product has been shown on a screen. In still another example, the purchasing mode is available during the entire media content program even before the purchasable product is shown on a screen.

Figure 12:
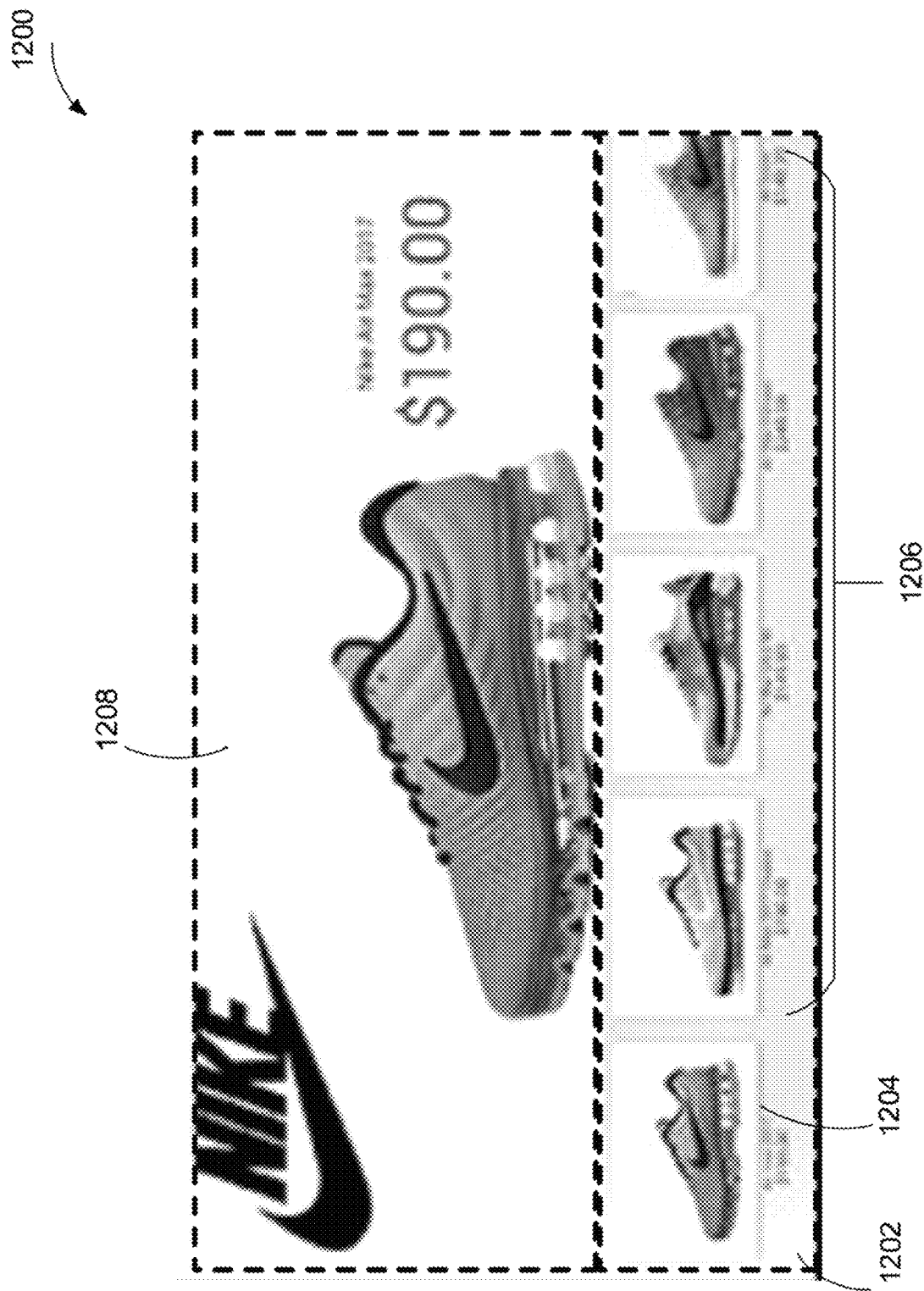
FIG. 12 illustrates another example of a screen displayed on a display screen by a media platform system when a selectable object for additional functions was selected according to some embodiments.

FIG. 12 illustrates another example of a screen 1200 displayed on a display screen by a media platform system when a selectable object for additional functions (e.g., the selectable object 526 in FIG. 5) was selected according to some embodiments. In the example depicted in FIG. 12, the screen 800 includes a main screen 1202 and an extended smart bar 1204 overlaid on the main screen 1202 at the bottom edge of the main screen 1202. In a specific implementation, the extended smart bar 804 includes a set of selectable objects different from selectable objects included a smart bar (e.g., the smart bar 502 in FIG. 1). For example, the set of selectable objects includes an on-target selectable object 1206 and one or more off-target selectable objects 1208. Further, in a specific implementation, each of the on-target selectable object 1206 and the one or more off-target selectable objects 1208 includes a representative image of a corresponding additional function, such as sending emails, reviewing invoices, weather, time, setting, and so on.

In some embodiments, the function of the additional functions is available when at least one applicable additional function is available, and not available when no applicable additional function is available. Further in some embodiments, availability of the additional function is determined based on media content presented to a user (e.g., a display media content displayed on a screen).

Figure 13:
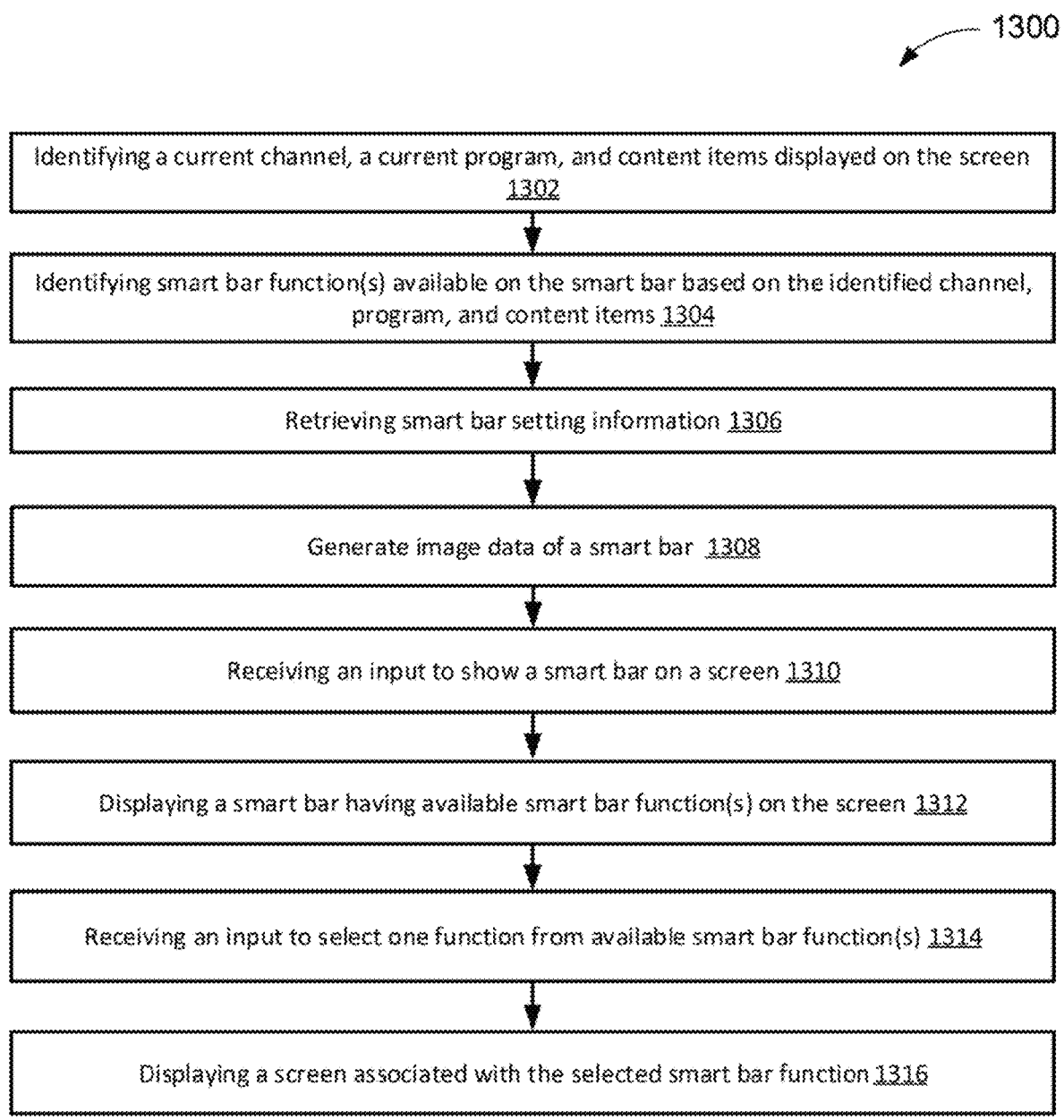
FIG. 13 illustrates a flowchart of an example method of operation for a smart bar function according to some embodiments.

FIG. 13 illustrates a flowchart 1300 of an example method of operation for a smart bar function according to some embodiments. This flowchart and other flowcharts described in this paper illustrate modules (and potentially decision points) organized in a fashion that is conducive to understanding. It should be recognized, however, that the modules can be reorganized for parallel execution, reordered, modified (changed, removed, or augmented), where circumstances permit.

In step 1302, content parameters of current media content presented to a user are identified. An applicable engine for identifying content parameters, such as the smart bar engine (e.g., the smart bar engine 216 in FIG. 2) described in this paper, can identify the content parameters. In some embodiments, the content parameters include one or more of a current media channel (e.g., NBC, CBA, FOX, ESPN, etc.), a current media program (e.g., evening news) presented in the media channel, and a current media content (e.g., a live report from a sport venue, an interview scene, etc.). In a specific example, the content parameters may include a genre of music as the current media channel, a title of a music album as the current media program, and a title of a song as the current media content.

In step 1304, one or more smart bar functions available on the smart bar are identified based on the identified content parameters. An applicable engine for identifying available smart bar functions, such as the smart bar engine (e.g., the smart bar engine 216 in FIG. 2) described in this paper, can identify the available smart bar functions. In some embodiments, the smart bar functions include one or more of exiting a smart bar, searching, going to a main menu (e.g., the main menu in FIG. 15 (specifically, 1500*a*), and FIG. 23), splitting a main screen, interacting with friends, using an imaging device, accessing audio content, activating/deactivating a stadium mode, activating/deactivating a purchasing mode, and pulling up one or more additional functions. Depending on a specific implementation of the embodiment, one or more of the smart bar functions may be available regardless of the presented media content (content parameters), and other one or more the smart bar functions are available or unavailable depending on the presented media content.

In step 1306, optionally, display setting of the smart bar and selectable objects corresponding to the available smart bar functions are obtained. An applicable engine for obtaining display setting, such as the smart bar engine (e.g., the smart bar engine 216 in FIG. 2) described in this paper, can obtain the display setting. In some embodiments, the display setting includes one or more of a display position of the smart bar, a display format (e.g., size, color) of the smart bar, a display format (e.g., size, color) of the selectable objects, and a display order of the selectable objects. In some embodiments, some of the display setting may vary depending on the presented media content (content parameters). In some embodiments, at least some of the display setting may be statically or dynamically stored in applicable datastore (e.g., the media platform system datastore 228 in FIG. 2).

In step 1308, smart bar data, including image data of a smart bar to be displayed on a screen, are generated based on the identified available smart bar functions, and the smart bar display setting, which is optionally obtained. An applicable engine for generating smart bar data, such as the smart bar engine (e.g., the smart bar engine 216 in FIG. 2) described in this paper, can generate the smart bar data. In some embodiments, at least some of the smart bar data may be statically or dynamically stored in applicable datastore (e.g., the media platform system datastore 228 in FIG. 2).

In step 1310, it is determined whether or not an input to show a smart bar on a screen is received. An applicable engine for determining an input (e.g., the smart bar engine 216 in FIG. 2) described in this paper, can determine the input. In some embodiments, the input is received from a dedicated remote control device coupled to the media platform system. In another embodiment, the input is received from a wireless mobile device (e.g., smartphone, tablet, laptop, etc.) coupled to the media platform system. In another embodiment, the input may be voice or gestures made by human agents, such as users or viewers. If a decision result of step 1310 is Yes (Y in FIG. 13), the flowchart 900 proceeds to step 1312; if the decision result is No (N in FIG. 13), the flowchart 900 returns to step 1302, and steps 1302-1310 are repeated. Therefore, as the media content presented to a user is updated, the smart bar data is updated so as to reflect the updated media content.

In another embodiment, step 1310 may be carried out before step 1302, and steps 1302-1308 may be carried out upon a determination result in step 1310 is Yes. Depending on a processing capability of the media platform system, applicable order of the step 1310 can be determined. For example, when the media platform system requires some noticeable amount of time to generate the smart bar data after receiving an input to show a smart bar, the recurring background process of steps 1302-1308 may be carried out. In another example, when the processing speed of the media platform system is sufficiently fast, steps 1302-1308 may be carried out upon an input to show a smart bar being received.

In step 1312, a smart bar having the identified available smart bar functions is displayed on a screen based on the generated smart bar data. An applicable system for displaying a smart bar (e.g., the output subsystem 216 in FIG. 2) described in this paper, can display the smart bar.

In step 1314, an input to select a selectable object corresponding to an available smart bar function is received. An applicable engine for receiving an input to select a selectable object input (e.g., the smart bar engine 216 in FIG. 2) described in this paper, can receive the input to select the selectable object corresponding to an available smart bar function. In some embodiments, the input to select the selectable object is received from a dedicated remote control device coupled to the media platform system or a wireless mobile device, similarly to the input to show the smart bar.

In step 1316, a screen associated with the selected smart bar function is displayed An applicable system for displaying an associated screen (e.g., the output subsystem 216 in FIG. 2) described in this paper, can display the screen associated with the selected smart bar function.

Advantageously, according to the smart bar discussed above, since the smart bar selectively presents available functions, it is possible to provide a more use-friendly GUI and navigate a user to an intended function of the user without being distracted to unavailable functions. Further, availability of at least some of the functions that can be indicated in the smart bar dynamically changes depending on a channel that is currently selected or media content of the channel displayed in a screen. For that reason, by simply pulling up the smart bar and selecting a content-specific function, a user can conveniently start the content-specific function without having to perform complicated operations.

Figure 14:
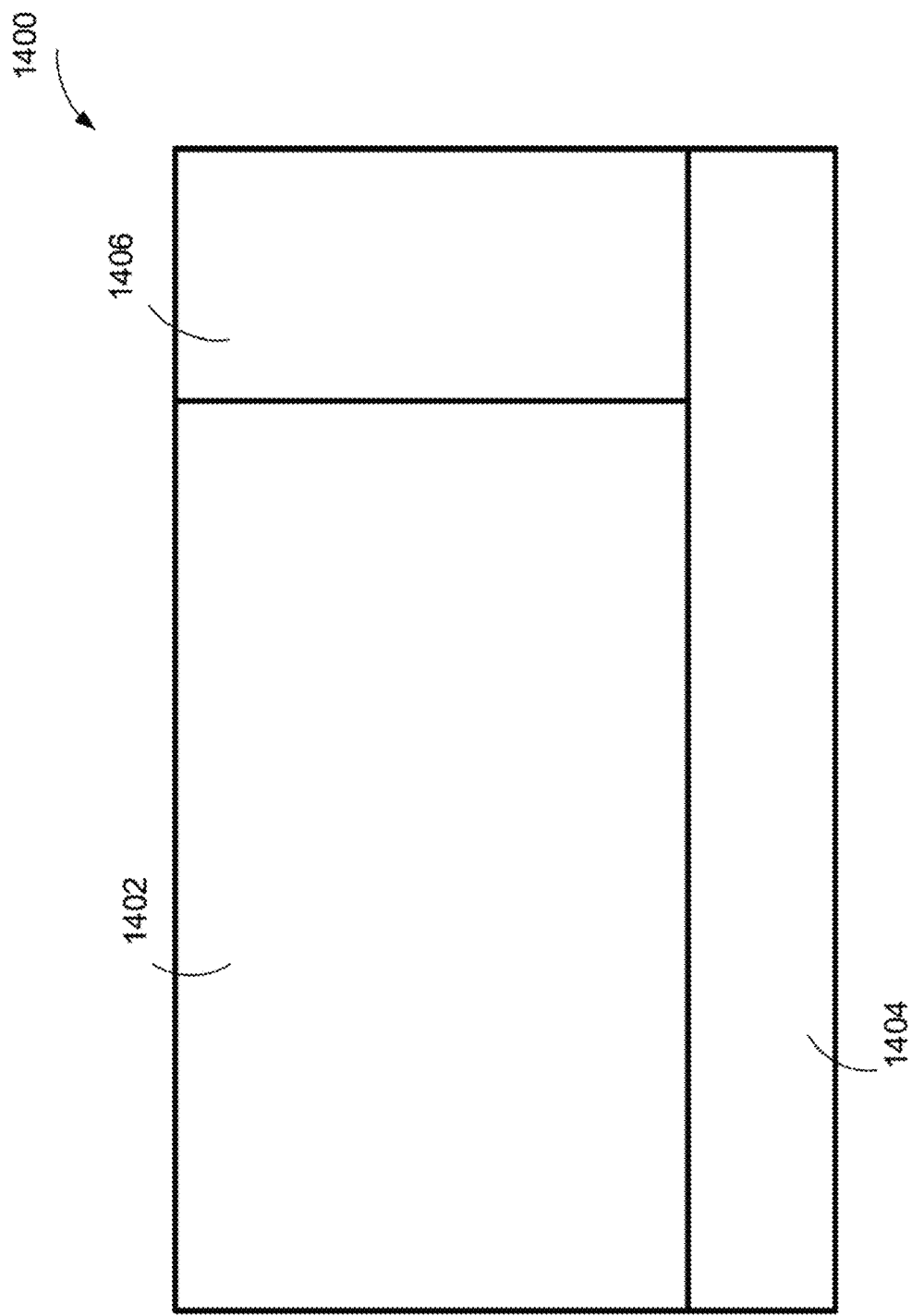
FIG. 14 illustrates an example of a screen that is displayed when a stadium mode is activated according to some embodiments.

FIG. 14 illustrates an example of a screen 1400 that is displayed when a stadium mode is activated according to some embodiments. The stadium mode enables a user to watch content without advertisement interruption in a main screen and instead occupies a portion of an entire screen for advertisement purpose. In some embodiments, the stadium mode can be activated by selecting a selectable object corresponding to the stadium mode (e.g., the selectable object 522 in FIG. 5) in a smart bar (e.g., the smart bar 502 in FIG. 1), when the selectable object is included in the smart bar. In the example in FIG. 14, the screen 1400 includes a main screen 1402, a vertical secondary screen 1404 at a right edge of the main screen 1402, and a horizontal secondary screen 1406 at a bottom edge of the main screen 1402 and the vertical secondary screen 1404.

In some embodiments, the main screen 1402 is provided to display media content of a channel or a program that is currently selected. In a more specific implementation, the media content displayed in the main screen 1402 during the stadium mode include live media content, such as live sports content, live performance content, live debate content, and so on. Further, in some embodiments, the media content displayed on the main screen 1402 are original media content that do not include advertisement interruption (e.g., original media content prepared separately from media content including advertisement interruption) or filtered media content from which advertisement content are filtered out. When the filtered media content are displayed on the main screen 1402, content (e.g., replay scene) relevant to the original media content (e.g., live sports scene) may be filled in place of the advertisement content.

An aspect ratio of the main screen 1402 is in an applicable ratio. For example, the main screen 1402 have the same aspect ratio as a full screen when the stadium mode is deactivated. Further, a size of the main screen 1402 is in an applicable size. For example, the size of the main screen 1402 is fixed to a predetermined size, which is for example, greater than 50% (e.g., 70-80%) of the entire screen. In another example, the size of the main screen 1402 dynamically changes in accordance with content displayed in the main screen 1402 and/or in one or both of the secondary screens 1404 and 1406.

In some embodiments, the media content displayed in the main screen 1402 are received from an applicable source such as a media provider system (e.g., the media provider system 102 in FIG. 1) and a media, social, market delivery system (e.g., the media, social, market delivery system 108 in FIG. 1).

In some embodiments, at least one of the vertical secondary screen 1404 and the horizontal secondary screen 1406 is provided to display advertisement content. The advertisement content may be a still image, a sequence of still images with limited movement (e.g., each containing different advertisement objects), or a video image. For example, the limited movement may be implemented by applicable animations, such as wiping out an advertisement image and wiping in another advertisement image, and fading out an advertisement image and fading in another advertisement image. Depending upon a specific implementation of the embodiment, the direction of the wiping in/out may be in an applicable direction such as a horizontal or vertical direction. Advantageously, no or limited movement of images in the advertisement content are less likely distract viewers from media content displayed in the main screen 1402. Further, advertisement content may be without audio content, for the similar advantage as the no or limited movement of images.

In some embodiments, the number and location of the secondary screen(s) (e.g., the vertical secondary screen 1404 and the horizontal secondary screen 1406) can be selected appropriately. For example, the secondary screen(s) are located at fixed position(s). In another example, the secondary screen(s) are located at user-specified position(s). Further, a size of the secondary screen(s) is in an applicable size. For example, the size of the secondary screen(s) is fixed to a predetermined size. In another example, the secondary screen(s) is in a user-specified size. In still another example, the size of the secondary screen(s) dynamically changes in accordance with content displayed in the secondary screen(s) and/or content displayed in the main screen 1402.

Depending upon a specific implementation of the embodiment, the advertisement content may be associated with various applicable parameters. In a specific implementation, the advertisement content may be associated with media content displayed in the main screen 1402, such that an efficient promoting effect can be provided to advertisers. For example, when the media content displayed in the main screen 1402 are a live sports scene, the advertisement content may contain one or more of athletic clothes, beverages, and food products. In a specific implementation, the advertisement content may be associated with a user profile of the media platform system. For example, the advertisement content are associated with a use history of the user, which may be stored in applicable datastore of the media platform system and provided to an applicable destination such as an advertisement provider system (e.g., the advertisement provider system 104 in FIG. 1) and a media, social, market delivery system (e.g., the media, social, market delivery system 108 in FIG. 1) at a predetermined timing (e.g., daily). The use history may include one or more of a channel selection history, a program view history, and a product purchase history through the purchase mode.

Depending upon a specific implementation of the embodiment, one or both of the vertical secondary screen 1404 and the horizontal secondary screen 1406 display advertisement content at applicable timing and duration. For example, one or both of the vertical secondary screen 1404 and the horizontal secondary screen 1406 may solely display advertisement content. In another example, one or both of the vertical secondary screen 1404 and the horizontal secondary screen 1406 may display advertisement content in an occasion and non-advertisement content in another occasion. In still another example, when one of the vertical secondary screen 1404 and the horizontal secondary screen 1406 displays advertisement content, the other of the vertical secondary screen 1404 and the horizontal secondary screen 1406 displays non-advertisement content. In still another example, one or both of the vertical secondary screen 1404 and the horizontal secondary screen 1406 displays advertisement content unless non-advertisement content are available, and switches display content from the advertisement content to the non-advertisement content upon the non-advertisement content being available. In still another example, advertisement content displayed in the vertical secondary screen 1404 and the horizontal secondary screen 1406 may be synchronized, such that a single advertisement scene can be displayed.

Depending upon a specific implementation of the embodiment, the non-advertisement content may include content associated with the media content displayed in the main screen 1402. For example, when the main screen 1402 displays a live sports scene, the non-advertisement content may include information relevant to the sports (e.g., player stats, game stats, fantasy stats, scoring details, information of other venues of the same sports, SNS feeds related to the sports event, news related to the sports event, etc.).

In some embodiments, the advertisement content displayed in one or both of the vertical secondary screen 1404 and the horizontal secondary screen 1406 are received from an applicable source such as an advertisement provider system (e.g., the advertisement provider system 104 in FIG. 1). In some embodiments, the non-advertisement content displayed in one or both of the vertical secondary screen 1404 and the horizontal secondary screen 1406 are received from an applicable source such as a media provider system (e.g., the media provider system 102 in FIG. 1) and a media, social, market delivery system (e.g., the media, social, market delivery system 108 in FIG. 1).

In some embodiments, the stadium mode is implemented by an applicable engine such as a stadium mode interface engine (e.g., the stadium mode interface engine 214 in FIG. 2). In some embodiments, the stadium mode is available when content metadata (e.g., channel, program, and the media content) of the media content, which are received from an applicable source (e.g., the media provider system 102 or the media, social, market delivery system 108 in FIG. 1), indicates that the media content are compatible with the stadium mode. In some embodiments, the stadium mode may require preapproval (e.g., user authentication) by an applicable system (e.g., the media, social, market delivery system 108 in FIG. 1) to use the function before activating the stadium mode, and the preapproval may also require fees.

Figure 16:
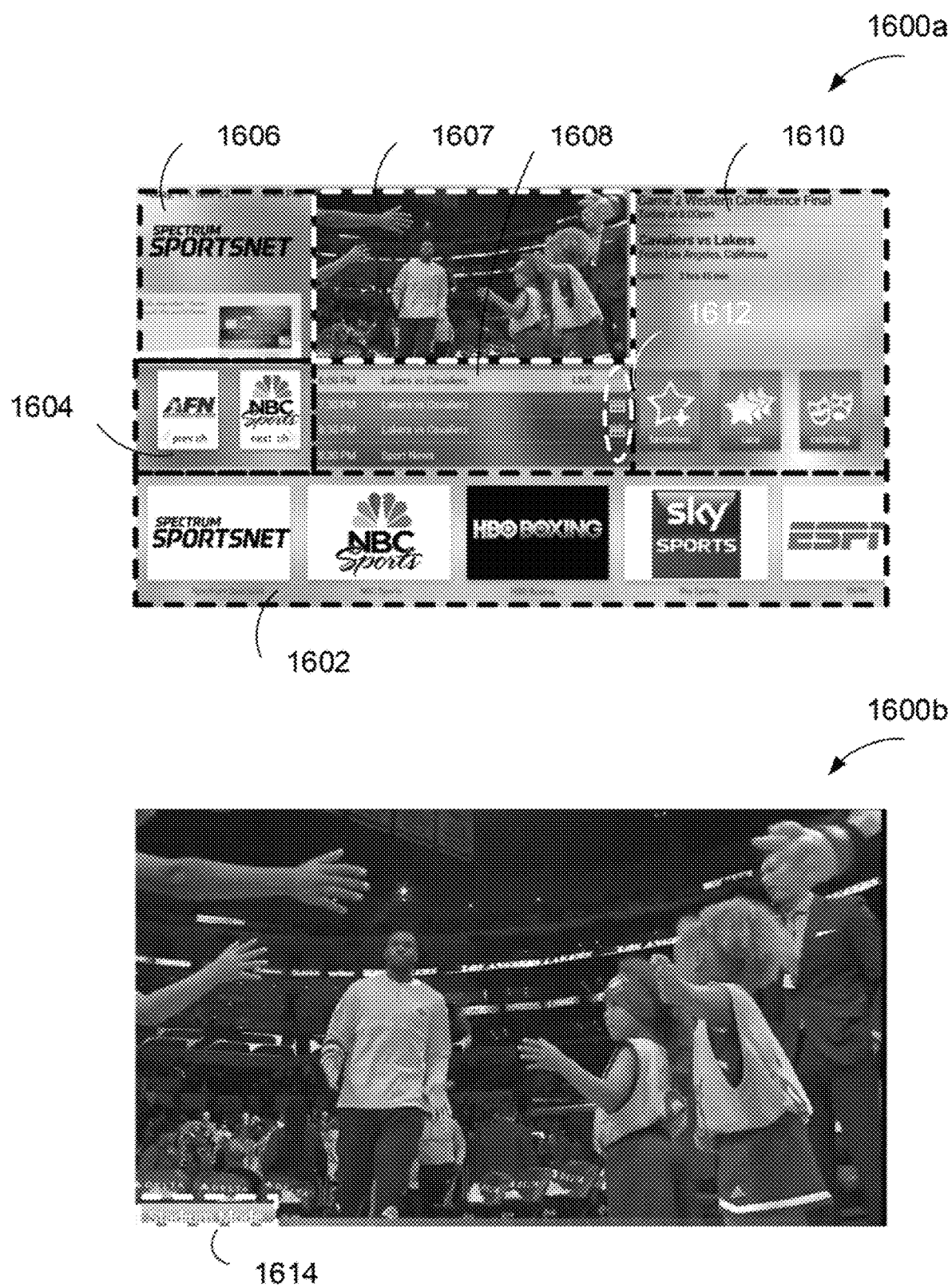
Figure 17:
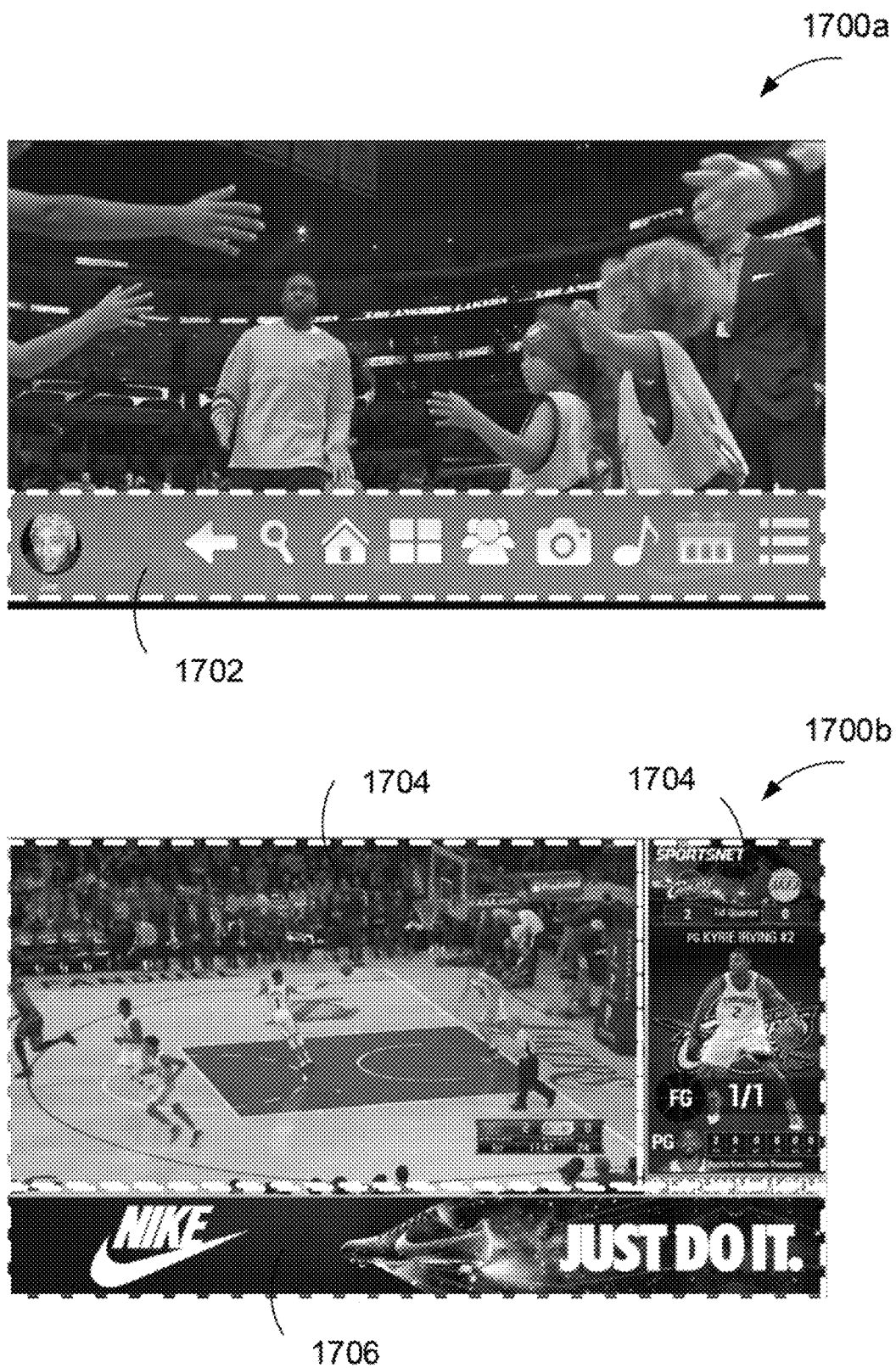

FIGS. 15-17 illustrate an example of screen transition to activate a stadium mode. FIGS. 15-17 illustrate screens 1500*a* and 1100*b*, 1200*a* and 1200*b*, and 1300*a* and 1300*b*, respectively, and the screen transition is assumed to occur in this order.

In the example of FIG. 15, the screen 1500*a* corresponds to a main menu, and includes a menu bar 1502 and a main navigation panel 1504. More particularly, the screen 1500*a* is at a state where a selectable object indicating "live" is selected in the menu bar 1502 and objects corresponding to live content are displayed in the main navigation panel 1504.

In the example of FIG. 15, the screen 1500*b* corresponds to a screen after a selectable object indicating "sports" is selected in the main navigation panel 1504 of the screen 1500*a*, and includes a group of selectable objects 1506 each of which corresponds to a channel that broadcasts unique media content.

In the example of FIG. 16, the screen 1600*a* corresponds to a screen after a selectable object indicating "sportsnet" on the left top corner is selected from the group of selectable objects 1506, and includes a channel selection bar 1602, a channel shift window 1604, a selected channel window 1606, a selected channel content screen 1608, a selected channel time table 1610, and a current program window 1612.

The channel selection bar 1602 includes one or more selectable objects corresponding to the group of selectable objects 1506 included in the screen 1500*b* in FIG. 15. In some embodiments, the channel selection bar 1602 indicates the selected object in the screen 1500*b* at a predetermined position (e.g., end of the displayed selectable objects). In some embodiments, when one of the selectable objects in the selection bar 1602 is selected, the screen 1600*a* is updated for the channel corresponding to the selectable object selected in the selection bar 1602.

The channel shift window 1604 includes selectable objects corresponding to a previous channel and a next channel of the channel corresponding to the selected object in the screen 1500b. In some embodiments, when one of the selectable objects in the channel shift window 1604 is selected, the screen 1600a is updated for the next channel or the previous channel. The selected channel window 1606 includes an applicable image (e.g., the title logo) of the channel selected in the screen 1500b.

The selected channel content screen 1608 includes media content that is currently played back in the channel selected in the screen 1500b. An aspect ratio of the selected channel content screen 1608 is in an applicable ratio. For example, the selected channel content screen 1608 have the same aspect ratio as a full screen of the media content.

The selected channel time table 1610 includes a time table of the channel selected in the screen 1500b. The time table includes one or more entries each of which corresponds to a unique time frame of a content program in the selected channel. Depending on a specific implementation, an entry including the current time is highlighted and selectable, which causes transition to full screen of the current media content in the selected channel. Further, one or more entries in the time table for which a stadium mode is available includes a mark 1614 indicating that the corresponding time frame is stadium-mode-compatible.

The current program window 1612 includes information of the current media content played back in the channel selected in the screen 1500b. In some embodiments, the current program window 1612 also includes one or more selectable objects to put tags the selected channel or the media content. For example, the tags include favorites bookmark, rating, and so on. In some embodiments, the current program window 1612 also includes one or more selectable objects to view information of celebrity associated with the media content. For example, when a sports game is on the media content, information of a famous player associated with the sports game is accessible from the one or more selectable objects in the current program window 1612.

In the example of FIG. 16, the screen 1600b corresponds to a full screen of the current media content of the selected channel. In some embodiments, the screen 1600b includes an indicator 1614 that the media content in the screen 1600b is compatible with the stadium mode.

In the example of FIG. 17, the screen 1700a corresponds to a screen when a smart bar 1702 is pulled up in a state where the full screen of the current media content is displayed. Since the stadium mode is available for the current media content, the smart bar 1702 includes a selectable object 1704 for the stadium mode. In some embodiments, the selectable object 1704 is highlighted to emphasize that the stadium mode is available.

In the example of FIG. 17, the screen 1700b corresponds to a screen after the selectable object 1704 for the stadium mode is selected in the screen 1700a, and includes a main screen 1702, a vertical secondary screen 1704, and a horizontal secondary screen 1706. In the example of FIG. 17, the main screen 1702 is a smaller version of the full-screen current media content, the vertical secondary screen 1704 includes game stats, and the horizontal secondary screen 1706 includes advertisement content associated with the media content.

In some embodiments, when the current media content end and the next media content in the same channel are not compatible with the stadium mode, the main screen 1702 automatically expands to a full-screen and the vertical secondary screen 1704 and the horizontal secondary screen 1706 disappear. In some embodiments, when the current media content end and the next media content in the same channel are not compatible with the stadium mode, the main screen 1702, the vertical secondary screen 1704, and the horizontal secondary screen 1706 are maintained, and media content including advertisement content are displayed in the main screen 1702.

Figure 18:
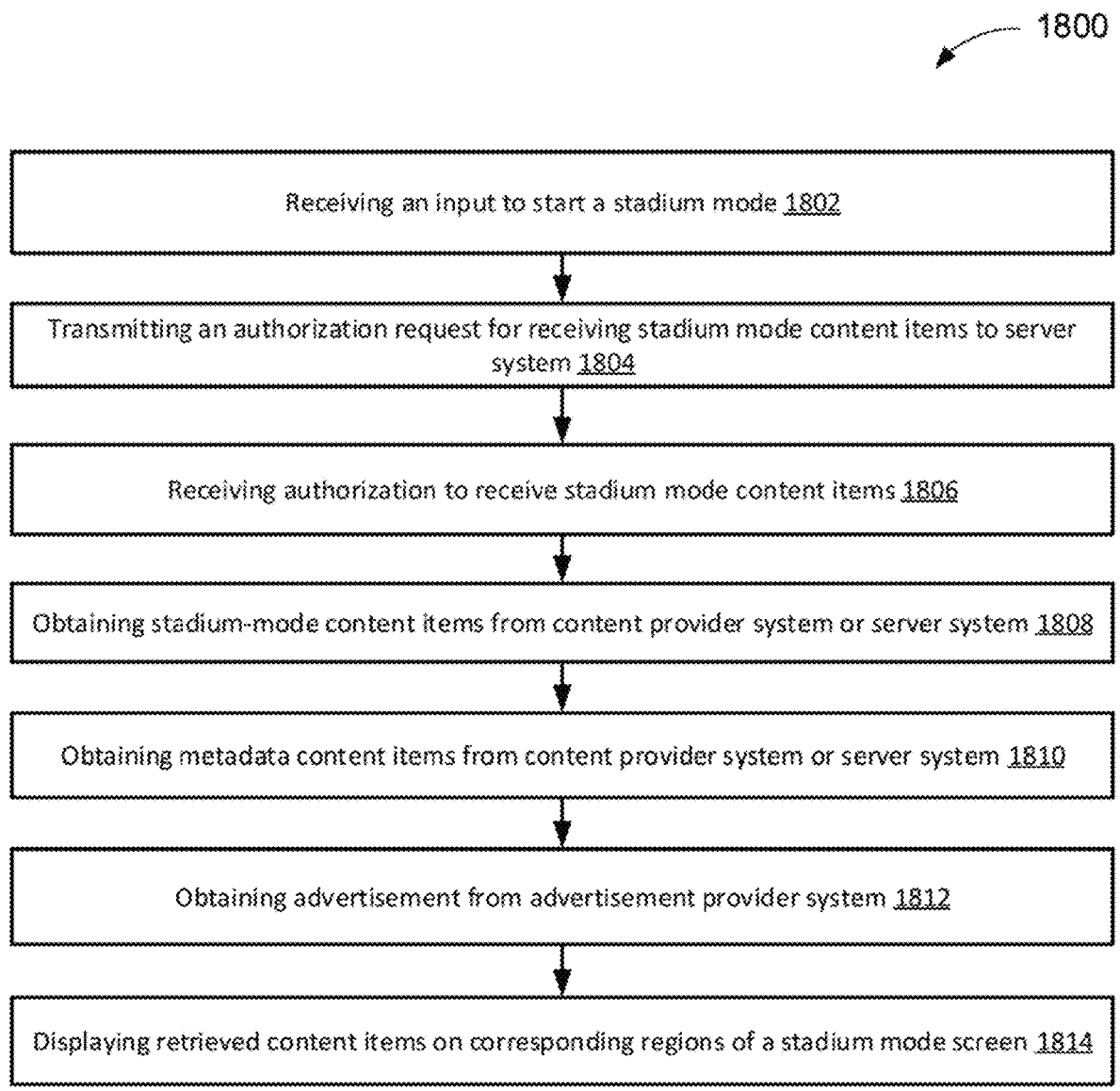
FIG. 18 illustrates a flowchart of an example method of operation of a stadium mode according to some embodiments.

FIG. 18 illustrates a flowchart 1800 of an example method of operation of a stadium mode according to some embodiments. In step 1802, an input to start (activate) a stadium mode is received. An applicable engine for receiving an input to start a stadium mode (e.g., the stadium mode interface engine 214 in FIG. 2) described in this paper, can receive the input to start the stadium mode. In some embodiments, the input to start the stadium mode is received from a dedicated remote control device coupled to the media platform system or a wireless mobile device, when the smart bar including the selectable object for the stadium mode is displayed on a screen. In another embodiment, the inputs may be voice or gestures made by human agents, such as users or viewers.

In step 1804, optionally, an authorization request for receiving stadium mode content is transmitted to an applicable system (e.g., the media, social and market delivery system 108 in FIG. 1). An applicable engine for transmitting an authorization request (e.g., the stadium mode interface engine 214 in FIG. 2) described in this paper, can transmit the authorization request through an applicable interface connected to a communication network (e.g., the communications network 112 in FIG. 1).

In step 1806, optionally when step 1804 is carried out, authorization to receive stadium mode content is received from an applicable system (e.g., the media, social and market delivery system 108 in FIG. 1). An applicable engine for receiving authorization (e.g., the stadium mode interface engine 214 in FIG. 2) described in this paper, can receive the authorization to receive stadium mode content.

In step 1808, stadium mode content are obtained. An applicable engine for obtaining stadium mode content (e.g., the stadium mode interface engine 214 in FIG. 2) described in this paper, can obtain stadium mode content from an applicable source (e.g., the media provider system 102 and/or the media, social and market delivery system 108 in FIG. 1). In some embodiments, the stadium mode content are original media content that do not include advertisement interruption or filtered media content from which advertisement content are filtered out.

In step 1810, optionally, non-advertisement content are obtained. An applicable engine for obtaining non-advertisement content (e.g., the stadium mode interface engine 214 in FIG. 2) described in this paper, can obtain non-advertisement content from an applicable source (e.g., the media provider system 102 and/or the media, social and market delivery system 108 in FIG. 1). In some embodiments, the non-advertisement content include content associated with the stadium mode content obtained in step 1808.

In step 1812, advertisement content are obtained. An applicable engine for obtaining advertisement content (e.g., the stadium mode interface engine 214 in FIG. 2) described in this paper, can obtain advertisement content from an applicable source (e.g., the advertisement provider system 104 in FIG. 1). In some embodiments, the advertisement content include content associated with the stadium mode content obtained in step 1808.

In step 1814, content obtained in steps 1808, (1810 optionally), and 1812 are presented on corresponding regions of a stadium mode screen. An applicable engine for presenting obtained content (e.g., the stadium mode interface engine 214 in FIG. 2) described in this paper, can present the obtained content on a stadium mode screen. In some embodiments, the stadium mode screen includes a main screen (e.g., the main screen 1402 in FIG. 14) for displaying the stadium mode content and one or more secondary screens (e.g., the secondary screens 1404 and 1406) for displaying the advertisement content and the non-advertisement content.

Advantageously, according to the stadium mode discussed above, a media platform system can provide viewers live media content without interruption or with limited interruption of the live media content by advertisement content, while providing advertisement space for media providers of the live media content. Further, according to the stadium mode discussed above, the stadium mode screen can also display non-advertisement content associated with the live media content. Since, viewers can access some useful information through the non-advertisement content while watching the live media content, use of the stadium mode can be further promoted.

Figure 19:
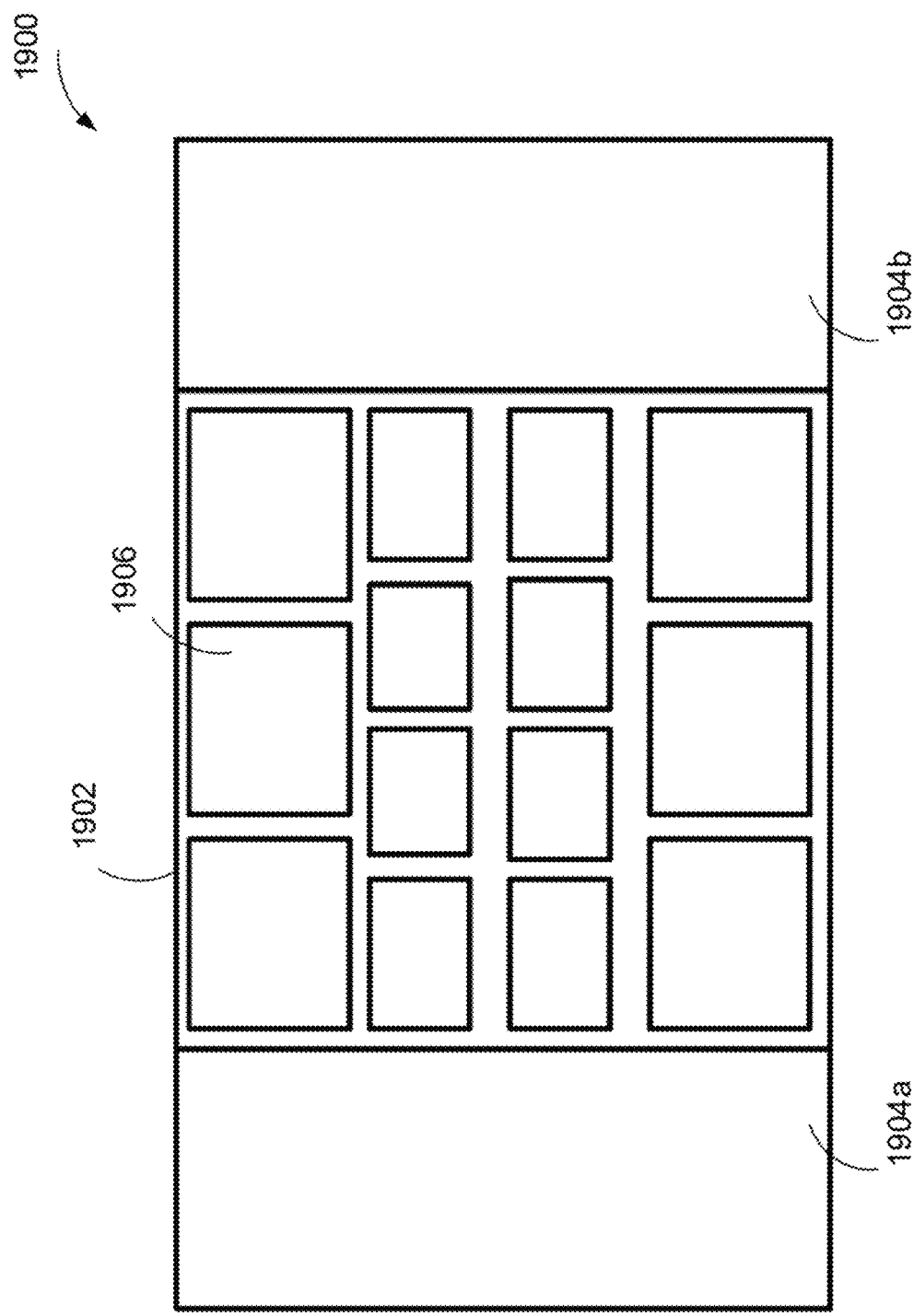
FIG. 19 illustrates an example of a billboard screen that is displayed when a media platform system is started according to some embodiments.

FIG. 19 illustrates an example of a billboard screen 1900 that is displayed when a media platform system is started according to some embodiments. The billboard screen 1900 is capable of providing a user with content options that are associated with the user and enables the user to more efficiently proceed to a media content that the user is interested in. In some embodiments, the billboard screen 1900 is displayed as an initial screen after user authentication or user login has been completed, and before a main menu screen (e.g., the screen 2300 shown in FIG. 23) is displayed. In the example in FIG. 19, the billboard screen 1900 includes a main billboard screen 1902, a left secondary screen 1904*a* at a left edge of the main billboard screen 1902, and a right secondary screen 1904*b* at a right edge of the main billboard screen 1902.

In some embodiments, the main billboard screen 1902 is provided to display a plurality of panels 1906 that represent media content such as channels or programs that are available or promoted to viewers. In a more specific implementation, the panels 1906 displayed in the main billboard screen 1902 include selectable panels corresponding to media content, such as movies, television programs, music, live sports content, and live performance content, and so on. In addition, the panels 1906 may also include selectable panels corresponding to news feeds, celebrity pages, shopping pages, user pages, games, internet pages, friends social pages, and applications (e.g., Netflix, HBO, Now, etc.) to name a few. Once a selectable panel is selected, a screen transitions to a screen associated with the content included in the selected panel.

The panels 1906 in the main billboard screen 1902 may be a still image, a sequence of still images with limited movement (e.g., each containing different advertisement objects), a video image, or combination thereof. For example, the limited movement may be implemented by applicable animations, such as flipping of the panels, sliding in/out of the panels and so on. Depending upon a specific implementation of the embodiment, the flipping direction of the panels may be in an applicable direction such as a horizontal or vertical direction. Advantageously, some movement of the panels 1906 in the main billboard screen 1902 are more likely to attract viewers to the panels 1906 in the main billboard screen 1902. Further, advertisement content may be with audio content associated with the movement of the panels 1906, for the similar advantage as the movement of the panels 1906.

Depending upon a specific implementation of the embodiment, when the panels 1906 are provided with animation, various applicable display techniques may be employed. For example, the content displayed on the flipped side of a panel may include different content from the content on the original side of the panel. That is, an original side of a panel may include a movie, and the opposite side of the panel may include a newsfeed. In another example, the timing to flip the panels 1906 may be appropriately determined. In some implementations, the timing to flip the panels 1906 are independent from each other, so as to attract more attention of viewers to the flipped panel. In alternative implementations, the timing to flip the panels 1906 are interrelated to each other, so as to provide more organized animation to viewers. Content on the flipped panels may recurrently displayed on the same panel or different panel according to an applicable algorithm.

Depending upon a specific implementation of the embodiment, the sizes of the panels 1906 may be associated with various applicable parameters. For example, a size of a panel that represents content of greater association (e.g., higher frequency to visit the content, inclusion in favorites, most recent visit to the content, and so on, with a user may be larger than a size of a panel that represents content of lesser association with the user. In another example, a size of a panel that represents content having more viewers to may be larger size of a panel that represents content having less viewers.

Depending upon a specific implementation of the embodiment, the arrangement of the panels 1906 may be associated with various applicable parameters. For example, a panel that represents content of greater association (e.g., higher frequency to visit the content, inclusion in favorites, most recent visit to the content, and so on, with a user may be located at a center (or top) in the main billboard screen 1902. In another example, a panel that represents content having more viewers to may be located at a position closer to the center (or top) in the main billboard screen 1902, than a panel that represents content having less viewers is. In some implementations, a larger panel may be located at a position closer to the center in the main billboard screen 1902, than a smaller panel.

Depending upon a specific implementation of the embodiment, a plurality of panels among the panels 1906 may correspond to a single media content. For example, each of the plurality of panels among the panels 1906 may represent a single movie content.

Depending upon a specific implementation of the embodiment, an aspect ratio of the main billboard screen 1902 is in an applicable ratio. For example, the main billboard screen 1902 has the same aspect ratio (e.g., 16:9) as a full screen during a normal display of media content. Further, a size of the main billboard screen 1902 is in an applicable size. For example, the size of the main billboard screen 1902 is fixed to a predetermined size, which is for example, greater than 50% (e.g., 70-80%) of the entire screen. In another example, the size of the main billboard screen 1902 dynamically changes in accordance with content displayed in the main billboard screen 1902 and/or in one or both of the left and right secondary screens 1904*a* and 1904*b*.

Depending upon a specific implementation of the embodiment, an aspect ratio of the main billboard screen 1902 is in an applicable ratio. For example, the main billboard screen 1902 has the same aspect ratio (e.g., 16:9) as a full screen during a normal display of media content. Further, a size of the main billboard screen 1902 is in an applicable size. For example, the size of the main billboard screen 1902 is fixed to a predetermined size, which is for example, greater than 50% (e.g., 70-80%) of the entire screen. In another example, the size of the main billboard screen 1902 dynamically changes in accordance with content displayed in the main billboard screen 1902 and/or in one or both of the left and right secondary screens 1904*a* and 1904*b*.

Depending upon a specific implementation of the embodiment, an aspect ratio of the panels 1906 is in an applicable ratio. For example, the panels 1906 has the same aspect ratio (e.g., 16:9) as each other. In another example, the panels 1906 has different aspect ratio depending on content to be displayed therein.

In some embodiments, the content displayed in the panels 1906 of the main billboard screen 1902 are associated with a user (e.g., user account). In a more specific implementation of the embodiment, the content displayed in the panels 1906 are associated with access frequency by the user. For example, a panel representing a content (e.g., channel) that has been accessed by the user above a predetermined threshold (e.g., at least once in the past week) is configured to be displayed in the main billboard screen 1902. In another specific implementation of the embodiment, the content displayed in the panels 1906 are associated with user's selection. For example, a panel representing a content (e.g., channel) that has been selected as a favorite is configured to be displayed in the main billboard screen 1902. In this case, the panel representing a content (e.g., channel) that has been selected as favorite may be fixed (pinned) at a user-selected or predetermined position in the main billboard screen 1902 along with an indicator (e.g., pin). In another specific implementation of the embodiment, the content displayed in the panels 1906 are displayed along with an indicator (e.g., icon, mark, emoji, etc.) indicating a type (e.g., TV, movie, music, sports, game, etc.) of media content accessible therethrough. For example, when media content corresponding to a panel is a game, a mark of a game controller may be overlaid on the panel. In another specific implementation of the embodiment, indicators overlaid on the panels 1906 are located at an applicable position that provides high contrast with respect to main images on the panels 1906. For example, when a white indicator is overlaid on a dark-color portion (e.g., black, gray, navy, etc.) of an main image, if any. In another example, a color of the indicator is selected depending on color of an main image.

In some embodiments, the content to be displayed in the panels 1506 of the main billboard screen 1902 are received from an applicable source such as a media provider system (e.g., the media provider system 102 in FIG. 1) and a media, social, market delivery system (e.g., the media, social, market delivery system 108 in FIG. 1). Further, for the media provider system and/or the media, social, market delivery system to generate the content to be displayed in the panels 1506, the media platform system provides user's interaction manner (e.g., use history) to the media provider system and/or the media, social, market delivery system.

In FIG. 19, at least one of the left secondary screen 1904*a* and the right secondary screen 1904*b* is provided to display advertisement content. The advertisement content may be a still image, a sequence of still images with limited movement (e.g., each containing different advertisement objects), or a video image. For example, the limited movement may be implemented by applicable animations, such as wiping out an advertisement image and wiping in another advertisement image, and fading out an advertisement image and fading in another advertisement image. Depending upon a specific implementation of the embodiment, the direction of the wiping in/out may be in an applicable direction such as a horizontal or vertical direction. Advantageously, no or limited movement of images in the advertisement content are less likely distract viewers from media content displayed in the main billboard screen 1902. Further, advertisement content may be without audio content, for the similar advantage as the no or limited movement of images.

In some embodiments, at least one of the left secondary screen 1904*a* and the right secondary screen 1904*b* includes a plurality of panels in which the advertisement content are displayed in a similar manner as the panels 1506 in the main billboard screen 1902. In this case, the manner of displaying the panels may employ the similar display manner as that of the panels 1506. For example, a plurality of panels in at least one of the left secondary screen 1904*a* and the right secondary screen 1904*b* may correspond to one advertisement object (e.g., advertised product). In another example, the panels in at least one of the left secondary screen 1904*a* and the right secondary screen 1904*b* flip to display different content (e.g., different advertisement object). In another example, the panels in at least one of the left secondary screen 1904*a* and the right secondary screen 1904*b* are selectable. Upon selection of one of the panels in the left secondary screen 1904*a* or the right secondary screen 1904*b*, a new screen (e.g., webpage) corresponding to advertisement object included in the selected panel may be displayed.

In some embodiments, the number and location of the secondary screen(s) (e.g., the left secondary screen 1904*a* and the right secondary screen 1904*b*) can be selected appropriately. For example, the secondary screen(s) are located at fixed position(s). In another example, the secondary screen(s) are located at user-specified position(s). Further, a size of the secondary screen(s) is in an applicable size. For example, the size of the secondary screen(s) is fixed to a predetermined size. In another example, the secondary screen(s) is in a user-specified size. In still another example, the size of the secondary screen(s) dynamically changes in accordance with content displayed in the secondary screen(s) and/or content displayed in the main billboard screen 1902. In another example, the size of a plurality of secondary screens is the same.

Depending upon a specific implementation of the embodiment, the advertisement content may be associated with various applicable parameters. In a specific implementation, the advertisement content may be associated with media content displayed in the main billboard screen 1902, such that an efficient promoting effect can be provided to advertisers. For example, when the media content displayed in the main billboard screen 1902 includes an emphasized panel representing a drama, the advertisement content may contain one or more of another drama started by a main actor of the drama in the panel. In another specific implementation, the advertisement content may be associated with a user profile of the media platform system. For example, the advertisement content are associated with a use history of the user, which may be stored in applicable datastore of the media platform system and provided to an applicable destination such as an advertisement provider system (e.g., the advertisement provider system 104 in FIG. 1) and a media, social, market delivery system (e.g., the media, social, market delivery system 108 in FIG. 1) at a predetermined timing (e.g., daily or weekly). The use history may include one or more of a channel selection history, a program view history, and a product purchase history through the purchase mode.

In another example, the advertisement content may be associated with a celebrity followed by a user (e.g., endorsed by the celebrity) in the media platform system, associated with a product that is liked or endorsed by the user's friends, and an entity that sponsors media content in a panel.

Depending upon a specific implementation of the embodiment, one or both of the left secondary screen 1904*a* and the right secondary screen 1904*b* display advertisement content at applicable timing and duration. For example, one or both of the left secondary screen 1904*a* and the right secondary screen 1904*b* may solely display advertisement content. In another example, one or both of the left secondary screen 1904*a* and the right secondary screen 1904*b* may display advertisement content in an occasion and non-advertisement content in another occasion. In still another example, when one of the left secondary screen 1904*a* and the right secondary screen 1904*b* displays advertisement content, the other of the left secondary screen 1904*a* and the right secondary screen 1904*b* displays non-advertisement content. In still another example, one or both of the left secondary screen 1904*a* and the right secondary screen 1904*b* displays advertisement content unless non-advertisement content are available, and switches display content from the advertisement content to the non-advertisement content upon the non-advertisement content being available. In still another example, advertisement content displayed in the left secondary screen 1904*a* and the right secondary screen 1904*b* may be synchronized, such that a single advertisement scene can be displayed.

In some embodiments, the advertisement content displayed in one or both of the left secondary screen 1904*a* and the right secondary screen 1904*b* are received from an applicable source such as an advertisement provider system (e.g., the advertisement provider system 104 in FIG. 1) on an applicable timing. In some embodiments, the non-advertisement content displayed in one or both of the left secondary screen 1904*a* and the right secondary screen 1904*b* are received from an applicable source such as a media provider system (e.g., the media provider system 102 in FIG. 1) and a media, social, market delivery system (e.g., the media, social, market delivery system 108 in FIG. 1) on a regular basis (e.g., daily or weekly).

In some embodiments, the stadium mode is implemented by an applicable engine such as an interactive programming guide engine (e.g., the interactive programming guide engine 206 in FIG. 2).

FIGS. 20-23 illustrate an example of screen transition including a billboard screen according to some embodiments. FIGS. 20-23 illustrate screens 2000, 2100, 2200, and 2300, respectively, and the screen transition is assumed to occur in this order.

Figure 20:
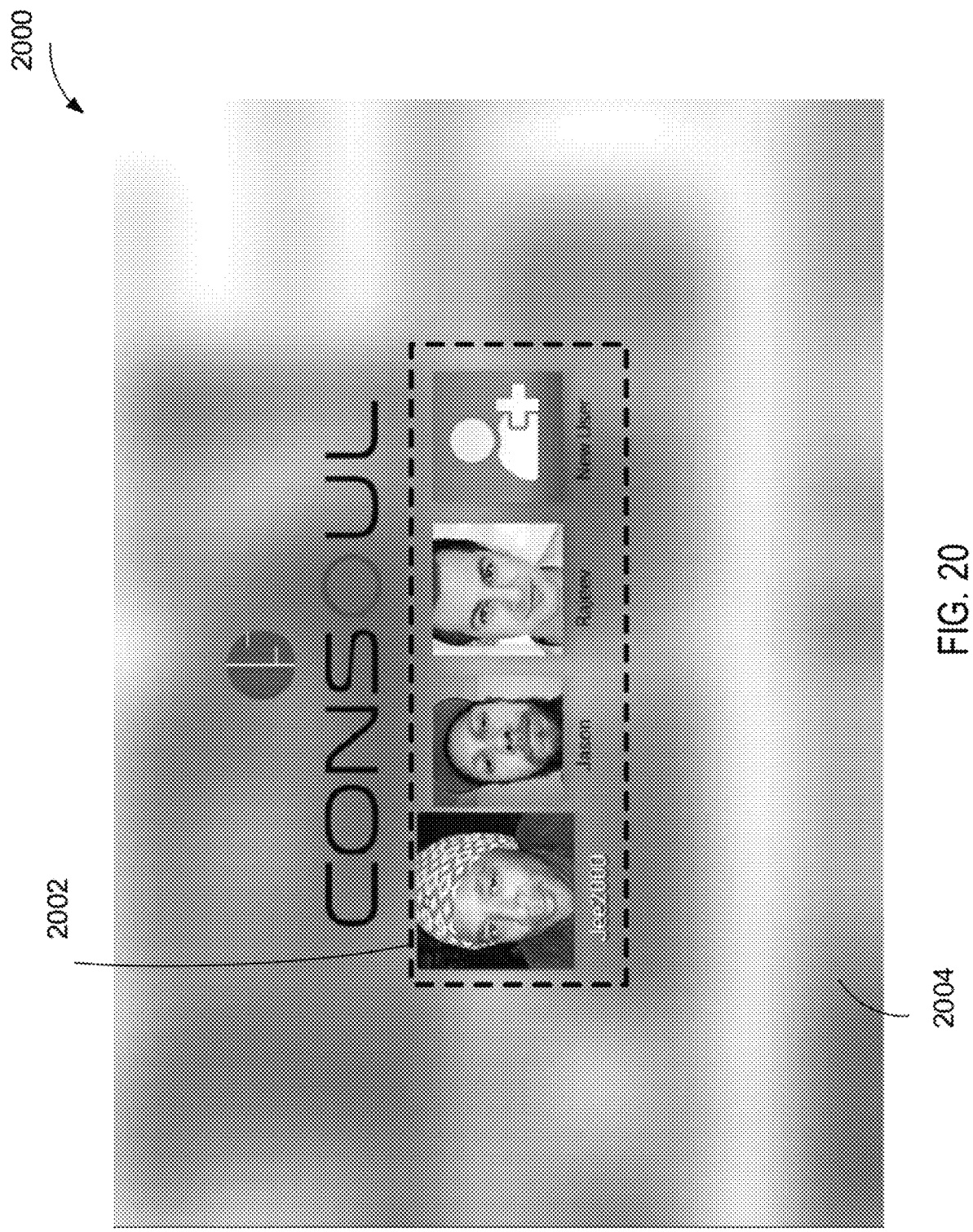
FIGS. 20-23 illustrate an example of screen transition including a billboard screen according to some embodiments.

In the example of FIG. 20, the screen 2000 corresponds to a login screen, and includes a user selection region 2002 overlaid on a background 2004. In some embodiments, the screen 2000 is displayed upon start (e.g., power on) of the media platform system. The user selection region 2002 is provided to select a user from one or more users associated with the media platform system. In a specific implementation, users that are registered with the media platform system are displayed in the user selection region 2002. When a new user is added, a selectable object to be registered as a new user is also provided in the user selection region 2002. The background 2004 may display applicable content. In some embodiments, as depicted in FIG. 20, blurred or scramble content (e.g., a billboard screen or a menu screen) may be displayed.

Figure 21:
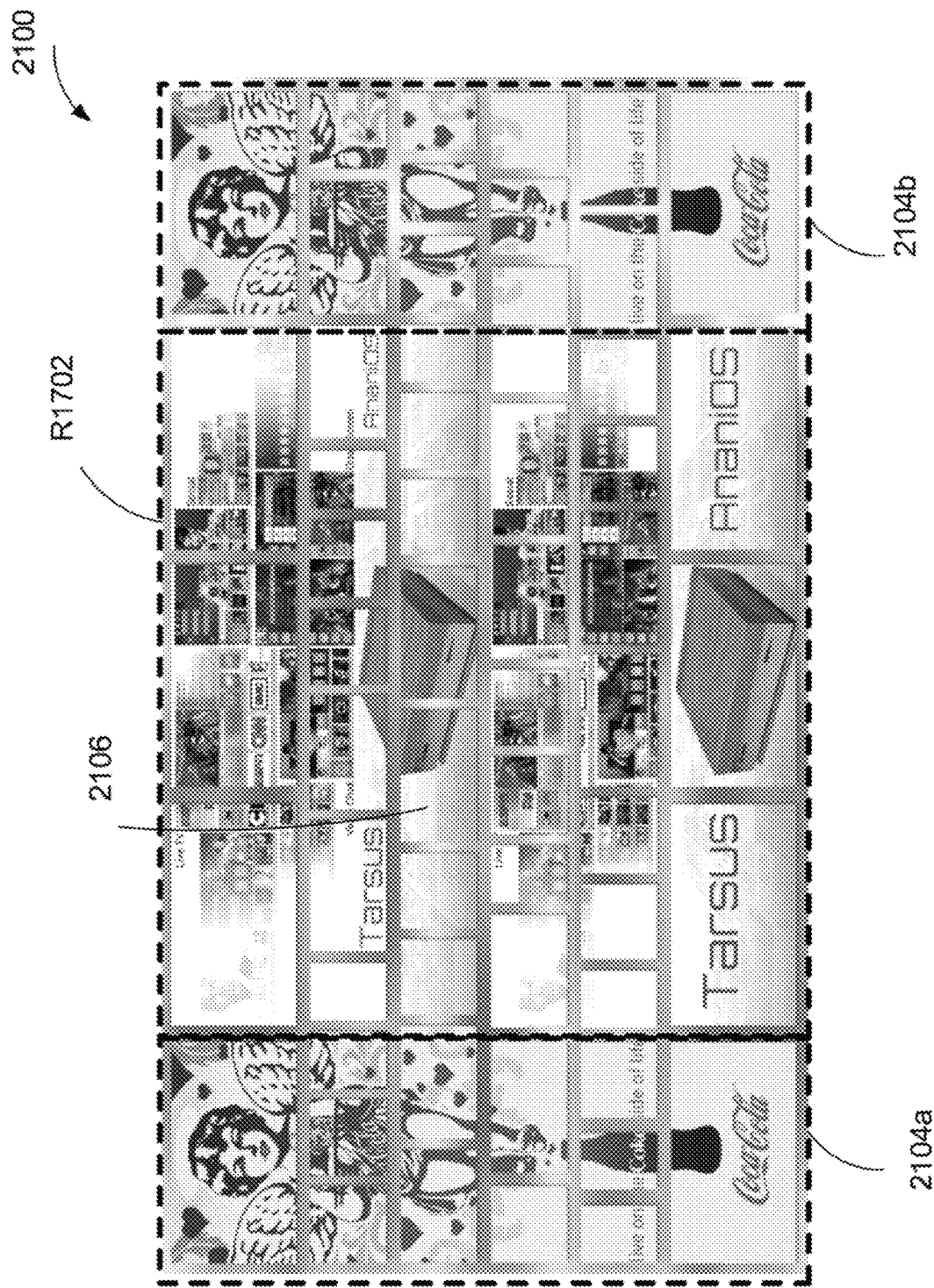

In the example of FIG. 21, the screen 2100 corresponds to an initial billboard screen after login through the screen 2000 in FIG. 20, and includes a main billboard screen 2102, a left secondary screen 2104*a*, and a right secondary screen 2104*b*. The main billboard screen 2102 includes a plurality of panels 2106 that indicate initial content, which may be unique to the user or predetermined content not associated with the user.

Figure 22:
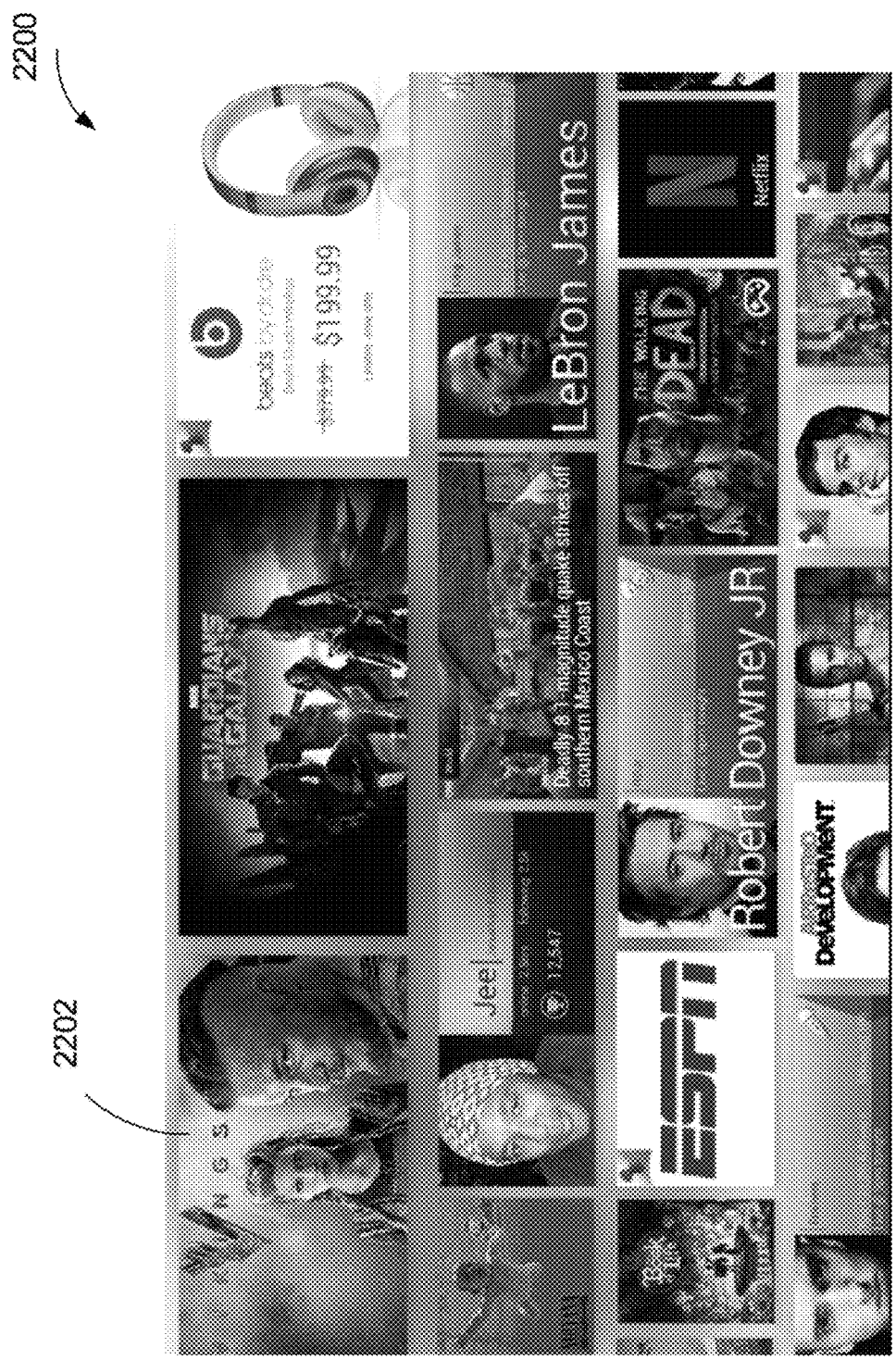

In the example of FIG. 22, the screen 2200 corresponds to a portion of a main billboard screen that transitions from the screen 2100, and includes a plurality of selectable panels 2202 at least part of which correspond to content available through the media platform system. By selecting one of the panels 2202, the user can proceed to a screen associated with the selected panel. For example, a user is able to proceed to an initial screen to playback a movie, by selecting a panel corresponding to the movie.

In the example of FIG. 23, the screen 2300 corresponds to a portion of a main menu, and includes a menu bar 2302 and a main navigation panel 2304. In some embodiments, the screen 2300 is displayed when none of selectable panels displayed in the main billboard screen 2200 is selected for a predetermined period of time and/or when a user input to proceed to the main menu is received, for example, through a remote controller. From the screen 2300, the user can proceed to user selected media content, such as the Internet, apps, social network content, TV, film (movie), live content, favorite content of the users, games, music, rewards, and so on.

Figure 24:
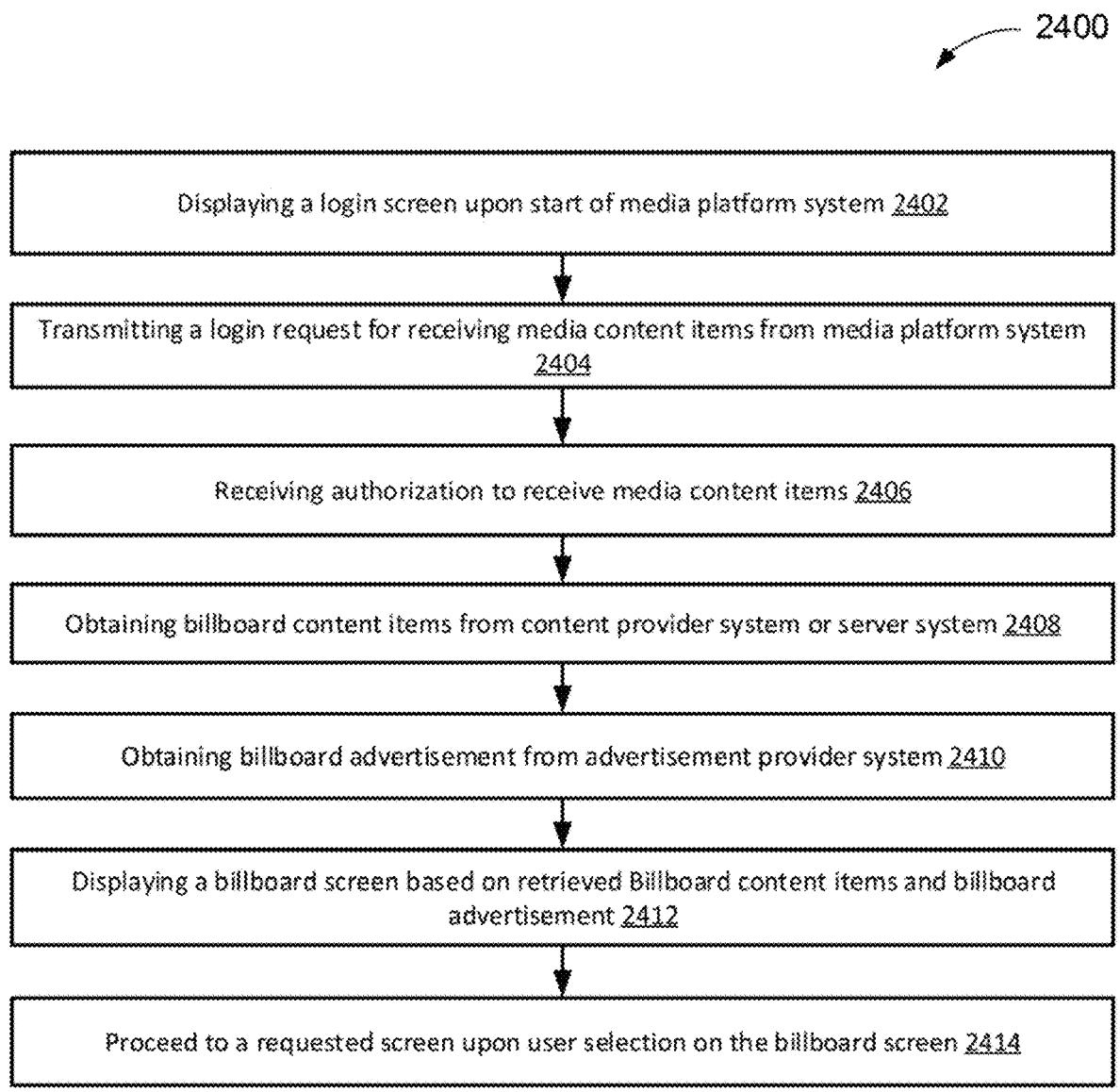
FIG. 24 illustrates a flowchart of an example method of displaying initial screens after start of a media platform system according to some embodiments.

FIG. 24 illustrates a flowchart 2400 of an example method of displaying initial screens after start of a media platform system according to some embodiments. In step 2402, a login screen is displayed upon start (e.g. power on) of a media platform system. An applicable engine for displaying a login screen (e.g., the interactive programming guide engine 206 in FIG. 2) described in this paper, can display the login screen on an applicable output device (e.g., the output subsystem 2206 in FIG. 2).

In step 2404, optionally, an authorization request for receiving media content items is transmitted to an applicable system (e.g., the media, social and market delivery system 108 in FIG. 1). An applicable engine for transmitting an authorization request (e.g., the stadium mode interface engine 214 in FIG. 2) described in this paper, can transmit the authorization request through an applicable interface connected to a communication network (e.g., the communications network 112 in FIG. 1).

In step 2406, optionally when step 2404 is carried out, authorization to receive media content items is received from an applicable system (e.g., the media, social and market delivery system 108 in FIG. 1). An applicable engine for receiving authorization (e.g., the stadium mode interface engine 214 in FIG. 2) described in this paper, can receive the authorization to receive media content items.

In step 2408, billboard content items are obtained. An applicable engine for obtaining billboard content items (e.g., the interactive programming guide engine 206 in FIG. 2) described in this paper, can obtain billboard content items from an applicable source (e.g., the media provider system 102 and/or the media, social and market delivery system 108 in FIG. 1). In some embodiments, the billboard content items are thumbnails of content available to the user and/or content promoted to the user based on a user profile (e.g., use history) of the user. In an alternative embodiment, step 2408 may be carried out regularly at predetermined timings, and therefore step 2408 may be carried out before step 2402, between steps 2402 and 2404, and between steps 2404 and 2406.

In step 2410, advertisement content are obtained. An applicable engine for obtaining advertisement content (e.g., the stadium mode interface engine 214 in FIG. 2) described in this paper, can obtain advertisement content from an applicable source (e.g., the advertisement provider system 104 in FIG. 1). In some embodiments, the advertisement content include content associated with the user profile (e.g., use history) of the user. In an alternative embodiment, step 2410 may be carried out regularly at predetermined timings, and therefore step 2410 may be carried out before step 2402, between steps 2402 and 2404, between steps 2404 and 2406, and between steps 2406 and 2408.

In step 2412, content obtained in steps 2408 and 2410 are presented on corresponding regions of a billboard screen. An applicable engine for presenting obtained content (e.g., the interactive programming guide engine 206 in FIG. 2) described in this paper, can present the obtained content on a billboard screen. In some embodiments, the billboard screen includes a main billboard screen (e.g., the main billboard screen 1902 in FIG. 19) for displaying panels corresponding to available or recommended media content and one or more secondary screens (e.g., the secondary screens 1904a and 1904b) for displaying the advertisement content and/or the non-advertisement content.

Advantageously, according to the billboard screen discussed above, a media platform system can provide a user with a user-specific initial screen (billboard) to efficiently access content without transitioning to a non-user-specific screen (e.g., main menu) after the user logs in on a media platform system. In other words, a user can access intended media content directly through the user-specific initial screen without accessing the non-user-specific screen. Since content options that the user is more likely to select can be shown in the billboard screen, it is possible to provide a more user-friendly GUI through which the user can be more efficiently navigated to the intended media content.

Figure 25:
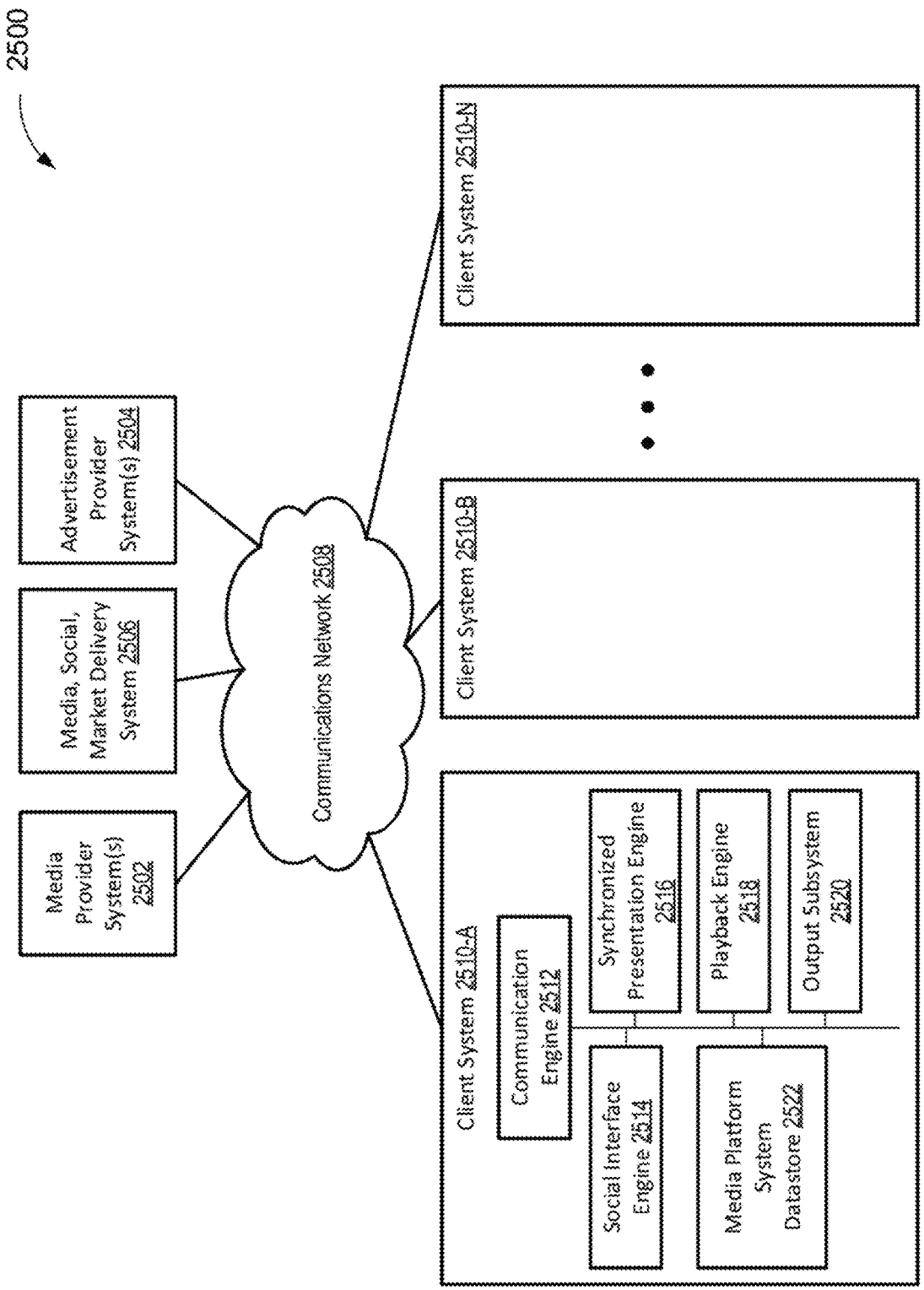
FIG. 25 illustrates an example of systems to carry out a synchronized presentation according to some embodiments.

FIG. 25 illustrates an example 2500 of systems to carry out a synchronized presentation according to some embodiments. The synchronized presentation discussed in this paper is intended to represent synchronized presentation of media content to multiple client systems simultaneously. The example 2500 of systems shown in FIG. 25 includes media provider system(s) 2502, advertisement provider system(s) 2504, a media, social, market delivery system 2506, a communication network 2508, and a plurality of client systems 2510-A, . . . 2511-N. In the example 2500 shown in FIG. 25, the media provider system(s) 2502, advertisement provider system(s) 2504, the media, social, market delivery system 2506, and the plurality of client systems 2510-A, . . . 2511-N are coupled to each other through the communication network 2508. In some embodiments, the content provider system(s) 2502, advertisement provider system(s) 2504, the media, social, market delivery system 2506, the communication network 2508, and the plurality of client systems 2510-A, . . . 2511-N correspond to the media provider system(s) 102, advertisement provider system(s) 104, the media, social, market delivery system 108, the communication network 112, and the media platform systems 106 in FIG. 1, respectively.

In the example 2500 of FIG. 25, one or more of the media provider system(s) 2502 includes a communication engine 2511, a social interface engine 2514, a synchronized presentation engine 2516, a playback engine 2518, an output subsystem 2520, and a media platform system datastore 2522. In some embodiments, the communication engine 2511, the social interface engine 2514, the synchronized presentation engine 2516, the playback engine 2518, the output subsystem 2520, and the media platform system datastore 2522 correspond to the communication engine 224, the social interface engine 220, the playback engine 208, the output subsystem 226, and the media platform system datastore 228 in FIG. 2, respectively.

In the example 2500 of FIG. 25, the communication engine 2511 is configured to communicate with external systems, such as the media provider system(s) 2502, the advertisement provider system(s) 2504, the media, social, market delivery system 2506, and other client systems 2510 through the communication network 2508. In a specific implementation, the communication engine 2511 sends a request for media content to the media provider system(s) 2502 and receives the requested media content from the media provider system(s) 2502. In another specific implementation, the communication engine 2511 sends a request for login authentication to the media provider system(s) 2502 and receives login authentication from the media provider system(s) 2502. In another specific implementation, the communication engine 2511 sends a request or permission for advertisement to the advertisement provider system(s) 2504, and receives advertisement content from the advertisement provider system(s) 2504.

In the example 2500 of FIG. 25, the social interface engine 2514 is configured to perform friend connection process for the synchronized presentation. In some embodiments, to carry out the synchronized presentation, a plurality of users who participate in the synchronized presentation have to be connected as friends with each other in the environment of the client systems. In some embodiments, the social interface engine 2514 is configured to generate a friend request based on a user interaction with the client system 2510 and cause the communication engine 2511 to transmit the generated friend request to one or more other client systems 2510. In some embodiments, the social interface engine 2514 is configured to receive friend request(s) transmitted from one or more other client systems 2510 through the communication engine 2511 and generate a notification of the friend request to a user on a GUI displayed on the output subsystem 2520. In some embodiments, the social interface engine 2514 is configured to generate an acceptance message upon user acceptance of the friend request on a GUI displayed on the output subsystem 2520 and cause the communication engine 2511 to transmit to the acceptance message to the one or more other client systems 2510 from which the friend request has been transmitted. Upon acceptance of a friend request, a user who sent the friend request and a user who accepted the friend request are connected as friends with each other. In a specific implementation, the information of the friend connection is stored in applicable datastore, such as datastore in the media, social, market delivery system 2506 and/or datastores in each of the client systems 2510 that have communicated for friend connection.

In some embodiments, the social interface engine 2514 is configured to generate a GUI for searching friends to be displayed on the output subsystem 2520, and perform friend search based on user input of search keys and registered information of users. For example, the search keys may include one or more of name (real user name), user name on the system, user ID, phone number, email address, mail address, affiliated organization (e.g., school, company, local community clubs, etc.), user photo, and so on. In some embodiments, registered information of users used for the friend search may be limited to authorized information by each user. For example, when a user does not allow the user's email address to be used for friend search, the social interface engine 2514 does not use the user's email address for the friend search.

In some embodiments, the social interface engine 2514 is configured to generate a GUI for performing instant communication between participants of a synchronized presentation during the synchronized presentation. For example, the social interface engine 2514 generates a GUI for instant text or video chat overlaid on or placed adjacent to a main screen for displaying content of the synchronized presentation, which enables the participants to share messages about the content of the synchronized presentation while accessing the content. The messages on the instant communication are transmitted and received through the communication engine 2511.

In the example 2500 of FIG. 25, the synchronized presentation engine 2516 is configured to establish a synchronized presentation session for the synchronized presentation. To establish the synchronized presentation session, the synchronized presentation engine 2516 generates a group of users who participate in the synchronized presentation session. In some embodiments, the synchronized presentation engine 2516 is configured to generate a GUI to start a synchronized presentation session and causes the output subsystem 2520 to display the generated GUI. In some embodiments, the generated GUI to establish the synchronized presentation session includes one or more selectable objects each of which corresponds to a friend of a user, and upon selection of one or more selectable objects, an invitation to participate in the synchronized presentation session is transmitted through the communication engine 2511 to one or more client systems 2510 associated with users corresponding to the one or more selectable objects. In some embodiments, the synchronized presentation engine 2516 is configured to receive invitations transmitted from one or more other client systems 2510 through the communication engine 2511 and generate a notification of the invitation to a user on a GUI displayed on the output subsystem 2520. In some embodiments, the synchronized presentation engine 2516 is configured to generate an acceptance message upon user acceptance of the invitation on a GUI displayed on the output subsystem 2520 and cause the communication engine 2511 to transmit the acceptance message to the one or more other client systems 2510 from which the invitation has been transmitted. Upon acceptance of an invitation, a user who sent the invitation and a user who accepted the invitation are included in a group of a synchronized presentation session. In a specific implementation, the information of the group of the synchronized presentation session is stored in applicable datastore, such as datastore in the media, social, market delivery system 2506 and/or datastores in each of the client systems 2510 that have communicated for friend connection. Depending on a specific implementation of embodiments, an applicable number (e.g., two, five, ten, etc.) of users can participate in a single synchronized presentation session.

Depending on a specific implementation of embodiments, the synchronized presentation session may be established for applicable time. For example, a synchronized presentation session is established for a current time, in which case content are synchronously presented to participants as soon as preparation for the synchronized presentation session is completed. In another example, a synchronized presentation session is established for a future time, in which case content are synchronously presented to participants upon the future time coms and preparation for the synchronized presentation session is completed before the future time.

In some embodiments, to establish a synchronized presentation session, the synchronized presentation engine 2516 also determines content to be presented during the synchronized presentation session. In determining the content to be presented during the synchronized presentation session, in some embodiments, the synchronized presentation engine 2516 generates a GUI to select content to be presented during the synchronized presentation session and causes the output subsystem 2520 to display the generated GUI. In a specific implementation, the generates GUI includes one or more selectable objects each of which correspond to media content that the user is authorized to access. For example, selectable objects correspond to free content and paid content that have been purchased by the user. In a specific implementation, the generates GUI also includes one or more selectable objects corresponding to paid content that have not been purchased by the user. In such a case, selection of a selectable object corresponding to paid content that has not been purchased by the user may guide the user to a GUI for purchasing the paid content, and further may guide the user to download the purchased paid content to a corresponding client system.

In some embodiments, the synchronized presentation engine 2516 also determines whether or not each participant is authorized to access the determined content, by communicating with a synchronized presentation engine of other client systems accessed by other participants. For example, when the determined content is paid content and at least one other participant has not paid for the determined content, the synchronized presentation engine 2516 determines that said one other participant is not authorized to access the determined content, and generate an applicable GUI, such as a notification that the determined content cannot be presented in the synchronized presentation session, for display by the output subsystem 2520. Further, the synchronized presentation engine 2516 may cause the client system of the non-authorized user to present a purchase prompt that prompts the non-authorized user to purchase the determined content. In another example, when the determined content is non-copyright-protected content or use of the determine content is within fair use of copyright-protected content, in terms of a copyright law of the jurisdiction, the synchronized presentation engine 2516 determines that each participant is authorized to access the determined content.

In some embodiments, to start an established synchronized presentation session, the synchronized presentation engine 2516 determines whether or not the established synchronized presentation session is ready to be started. In determining whether or not the established synchronized presentation session is ready to be started, in some embodiments, the synchronized presentation engine 2516 of one of the participating users (e.g., participant who initiated the synchronized presentation mode) determines whether or not each participant is ready to start the established synchronized presentation session. For example, the synchronized presentation engine 2516 causes a client system of each participant to generate a GUI to inquire whether or not the participant is ready. For example, the generated GUI may be displayed by the output subsystem 2520 and includes a selectable object to answer "ready" and a selectable object to answer "not ready." In a specific implementation, the established synchronized presentation session is started when an applicable number (e.g., all participants, majority, a predetermined number, etc.) of participants are determined to be ready. In another specific implementation, no answer to the inquiry is considered as "ready." Upon determining that the established synchronized presentation session is ready, the synchronized presentation engine 2516 causes the playback engine 208 of each participant to start presenting the determined content. Depending on a specific implementation of embodiments, the determined content may be obtained from applicable source (e.g., the media platform system datastore 2511, the media provider system 2502, etc.) individually on each client system, and applicable signals such as synchronization signals and command signals are communicated among client systems.

Depending on a specific implementation of embodiments, applicable participants has control of the started synchronized presentation session. For example, one or more participants that are set as master participants have control (e.g., start, stop, forward, reverse, etc.) of the started synchronized presentation session (if the content is user controllable), and one or more participants that are set as slave participants (or not determined as the master participants) have limited or no control of the started synchronized presentation session. In another example, each participant has equal control of the started synchronized presentation session. In still another example, no participant has control except for termination of the synchronized presentation session, when the presented content is live content.

Depending on a specific implementation of embodiments, content during a synchronized presentation session are presented synchronously in an applicable manner. For example, the presented content have complete synchronization, according to which each frame presented to participants are the same, with a minor data propagation delay among the client systems, if any. In another example, the presented content have non-complete synchronization, according to which each frame presented to participants involves a slight difference. In a more specific implementation, advertisement content included in the content presented during a synchronized presentation session is different depending on various applicable parameters, such as user profiles of the participants (e.g., user preference, user location, etc.). In another more specific implementation, displayed language (e.g., captions, subtitles, or scrolling tickers) and/or audio language may be different among the participants.

FIGS. 26-29 illustrate an example of screen transition for social communication according to some embodiments. FIGS. 26-29 illustrate screens 2600, 2700, 2800, and 2900, respectively.

Figure 26:
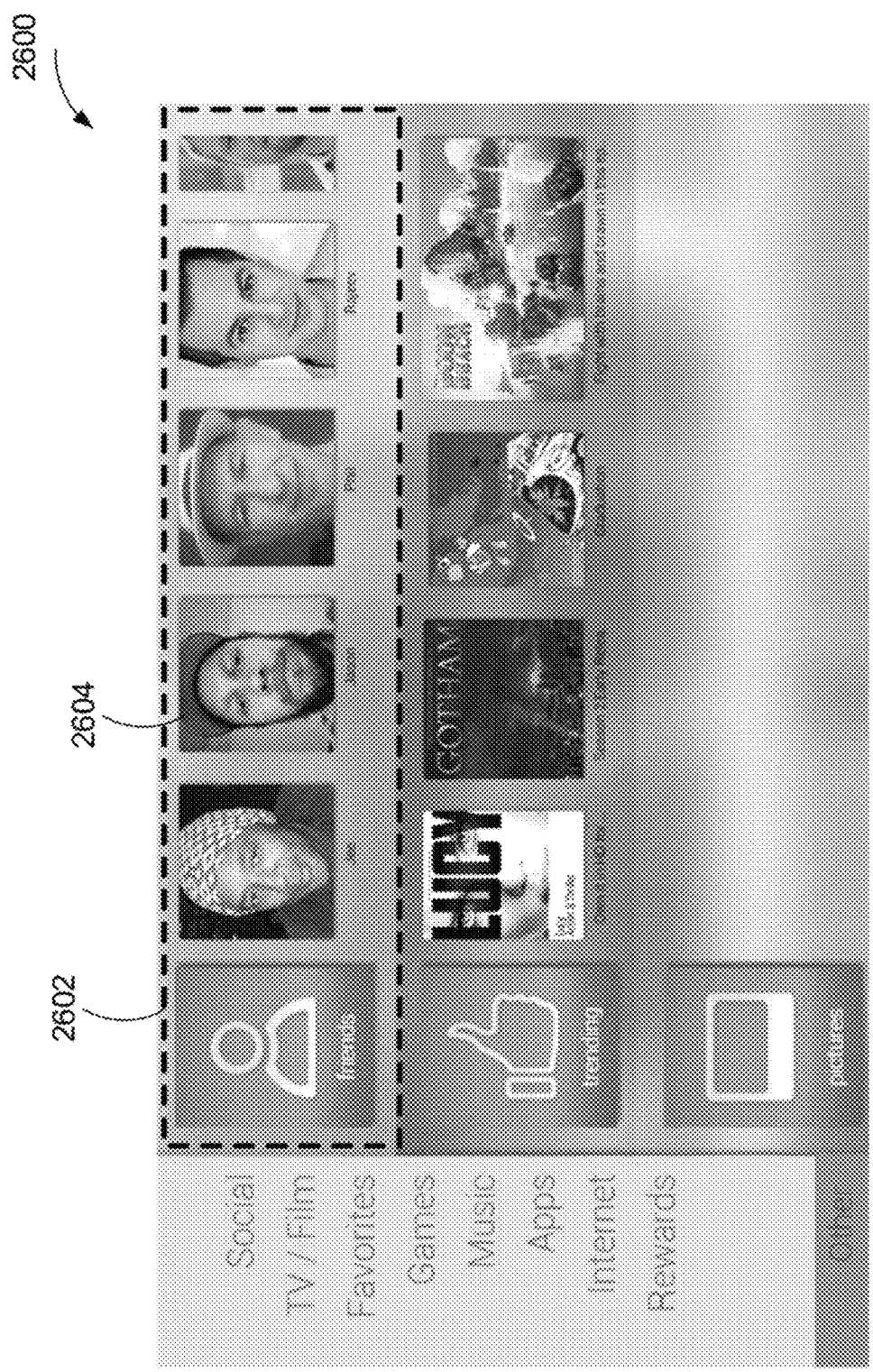
FIGS. 26-29 illustrate an example of screen transition for social communication according to some embodiments.

In the example of FIG. 26, the screen 2600 corresponds to a main menu screen, and includes a friend selection region 2602 including a plurality of selectable objects 2604 each of which represents a friend of a user. In some embodiments, the screen 2600 is displayed upon selection of a selectable object (e.g., social) on a menu region (e.g., menu bar on a left side) of a previous screen. The friend selection region 2602 is provided for the user to select a friend from one or more friends of the user. In a specific implementation, friends that accepted a friend request sent by the user and/or friends who sent friend requests to the user and have the friend requests accepted by the user are displayed in the friend selection region 2602.

Figure 27:
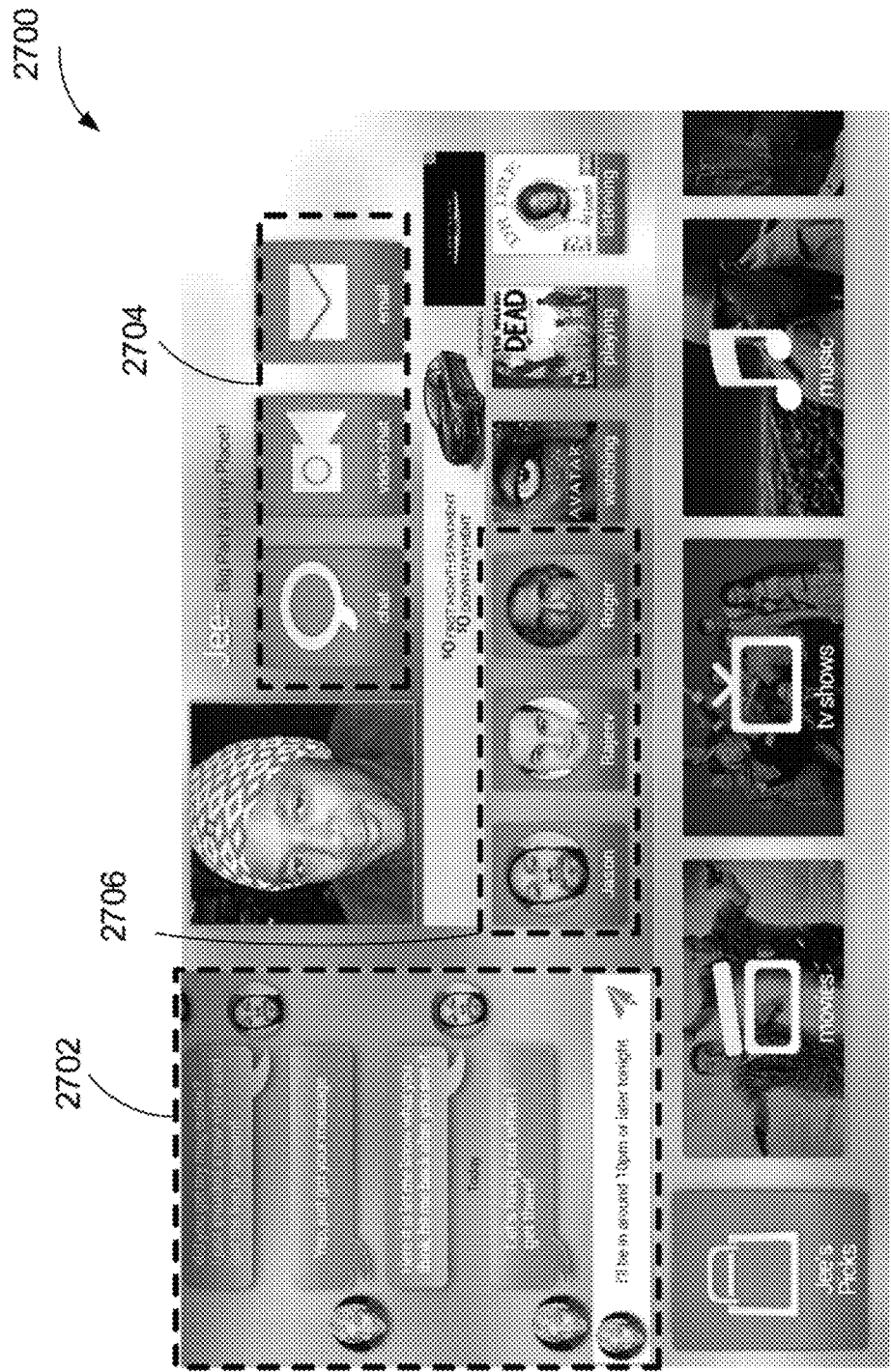

In the example of FIG. 27, the screen 2700 corresponds to a user home screen. The screen 2700 includes an instant communication region 2702, selectable objects 2704 to initiate communication with friends, and selectable objects 2706 each of which represents a friend of a user. In some embodiments, the screen 2700 is displayed upon a user input to go to a user home screen on applicable screens, such as a main menu and a smart bar, or on applicable user inputs, such as a user input on a remote controller.

The instant communication region 2702 is provided for the user to perform instant communication with one or more friends of the user. Depending on a type of instant communication, the instant communication region 2702 presents an applicable GUI for instant communication. For example, when a text chat is the type of the instant communication, input text and past-input texts are presented on the instant communication region 2702. In another example, when a video chat is the type of the instant communication, a live video stream of the user side and/or a live video stream of the friend side are displayed on the instant communication region 2702.

The selectable objects 2704 to initiate communication with friends are provided to select a type of communication to be communicated with one or more friends of the user. Depending on a type of instant communication, the selectable objects 2704 include selectable objects corresponding to applicable communication type. For example, the selectable objects 2704 include selectable objects for instant text chat, instant video chat, and mail messages.

The selectable objects 2706 to select friend are provided for the user to select to select a friend from one or more friends of the user. In a specific implementation, friends that accepted a friend request sent by the user and/or friends who sent friend requests to the user and have the friend requests accepted by the user are displayed in the selectable objects 2706.

Figure 28:
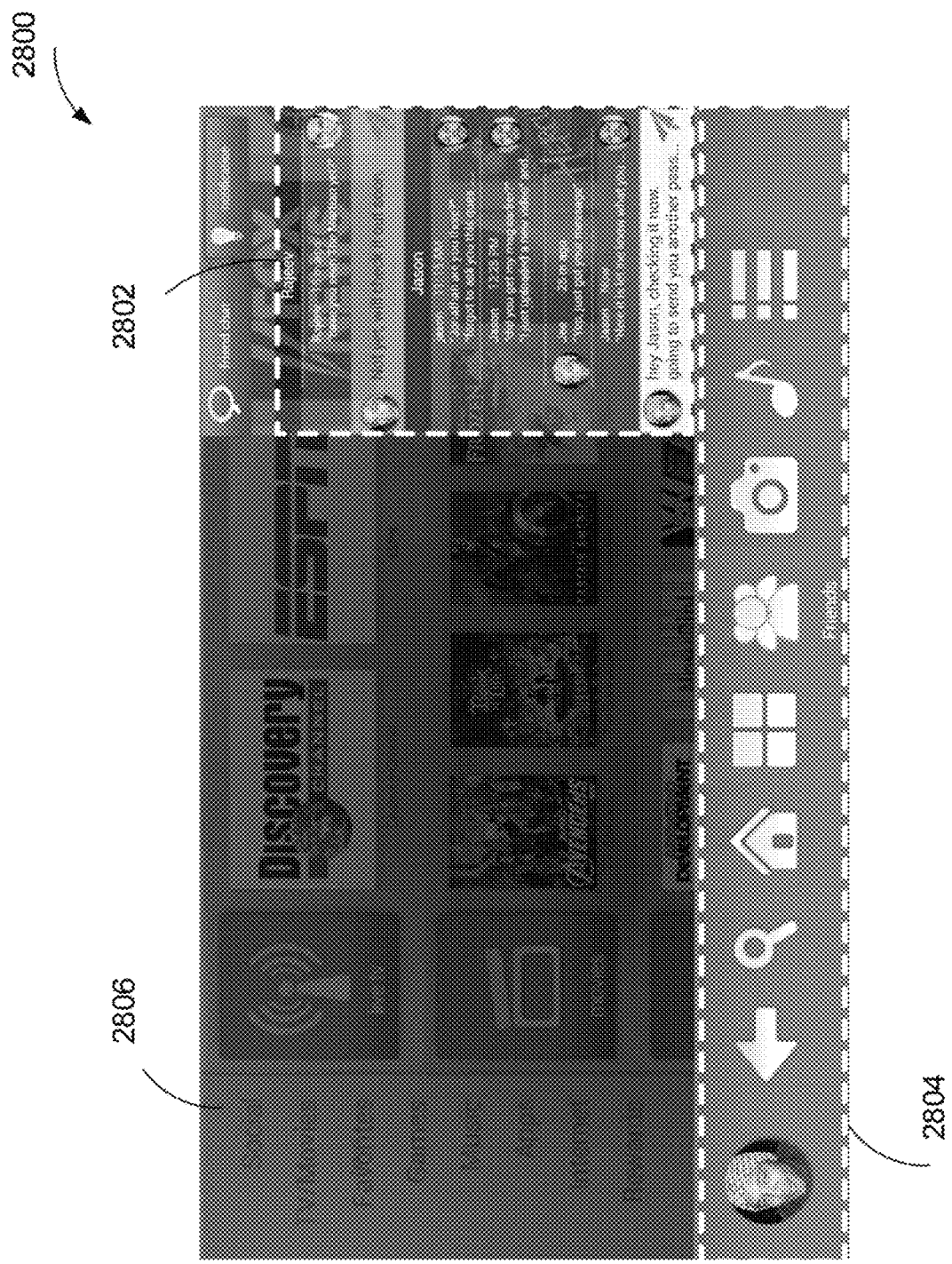

In the example of FIG. 28, the screen 2800 corresponds to a screen including when an instant communication is carried out. The screen 2800 includes the instant communication region 2802 and a smart bar 2804 that are overlaid on a main screen 2806. In some embodiments, the screen 2800 is displayed upon a user input to start instant communication with friends on the smart bar 2804 that is pulled up by another user input to pull up a smart bar. The instant communication region 2802 is provided for the user to perform instant communication with one or more friends of the user. In some embodiments, the instant communication region 2802 has the same or similar configuration as the instant communication region 2702 on the screen 2700. The smart bar 2804 can correspond to the smart bar 502 depicted in FIG. 5. The background 2806 may display applicable content. In some embodiments, as depicted in FIG. 28, blurred or scramble content (e.g., a billboard screen or a menu screen) may be displayed.

In some embodiments, applicable screens, such as the screens 2600, 2700, and 2800, are configured to initiate the synchronized presentation mode. For example, upon selection of one of the selectable objects 2604 to select friend on the screen 2600, an option to start a synchronized presentation mode with the selected friend may be presented. In another example, upon selection of one of the selectable objects 2706 to select friend on the screen 2700, an option to start a synchronized presentation mode with the selected friend may be presented. In still another example, a selectable object to start a synchronized presentation mode may be included in selectable objects in a smart bar, such as the smart bar 2800 on the screen 2800.

Figure 29:
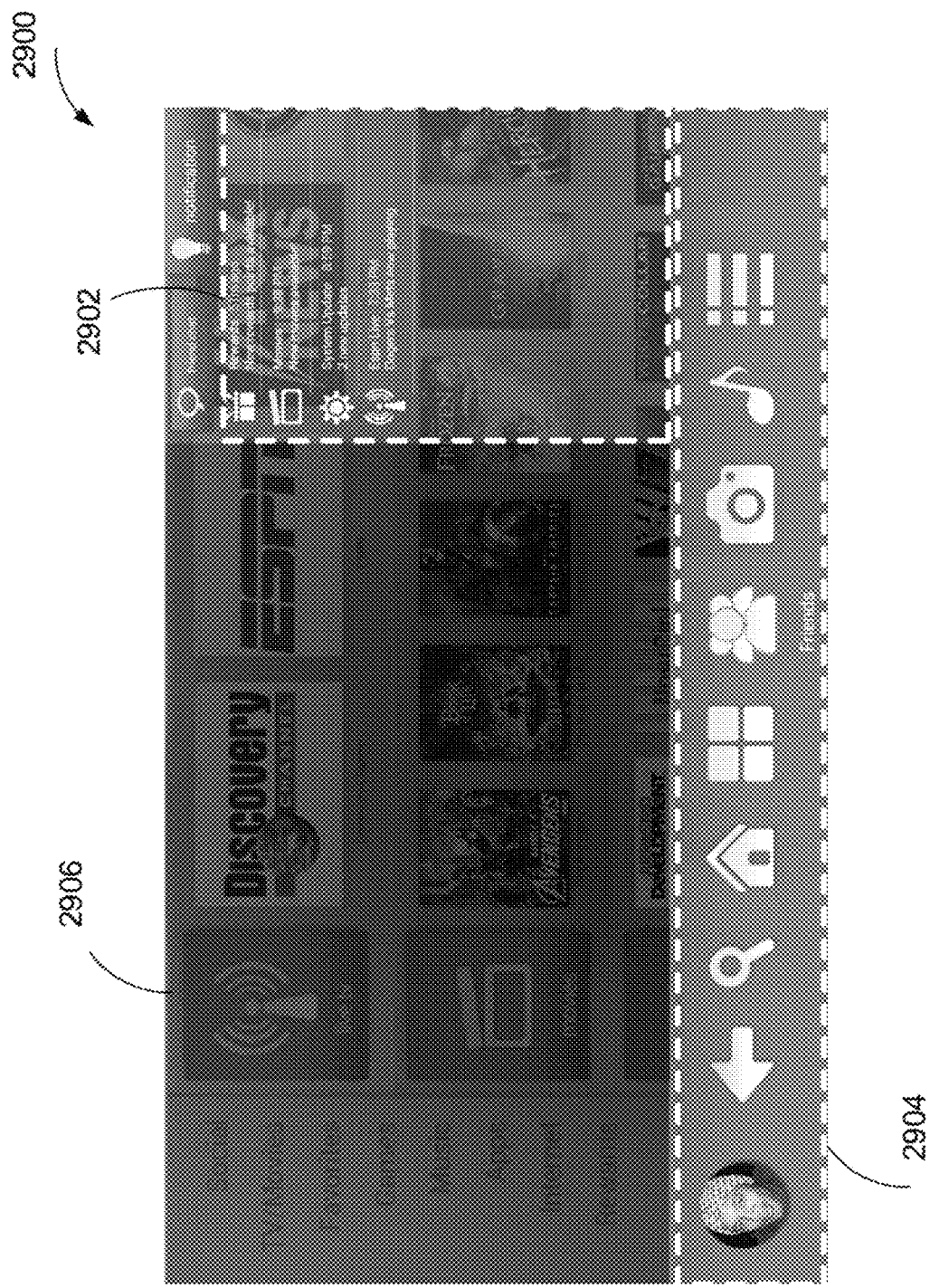

In the example of FIG. 29, the screen 2900 corresponds to a screen including when a notification is received. The screen 2900 includes a notification region 2902 and a smart bar 2904 that are overlaid on a main screen 2906. In some embodiments, the screen 2900 is displayed upon a user input to pull up the notification region 2902 on applicable screens, such as a main menu and a smart bar, or on applicable user inputs, such as a user input on a remote controller. The notification region 2902 includes applicable notifications that have been received. In some embodiments, the notification includes a request to start a synchronized presentation mode from a friend, an acceptance message that a friend accepted a request to start a synchronized presentation mode sent by the user, an inquiry whether the user is ready to start playback of media content in a synchronized presentation mode, and an acknowledgement that a friend is ready to start playback of media content in a synchronized presentation mode. The smart bar 2904 can correspond to the smart bar 502 depicted in FIG. 5. The background 2906 may display applicable content. In some embodiments, as depicted in FIG. 29, blurred or scramble content (e.g., a billboard screen or a menu screen) may be displayed.

Figure 30:
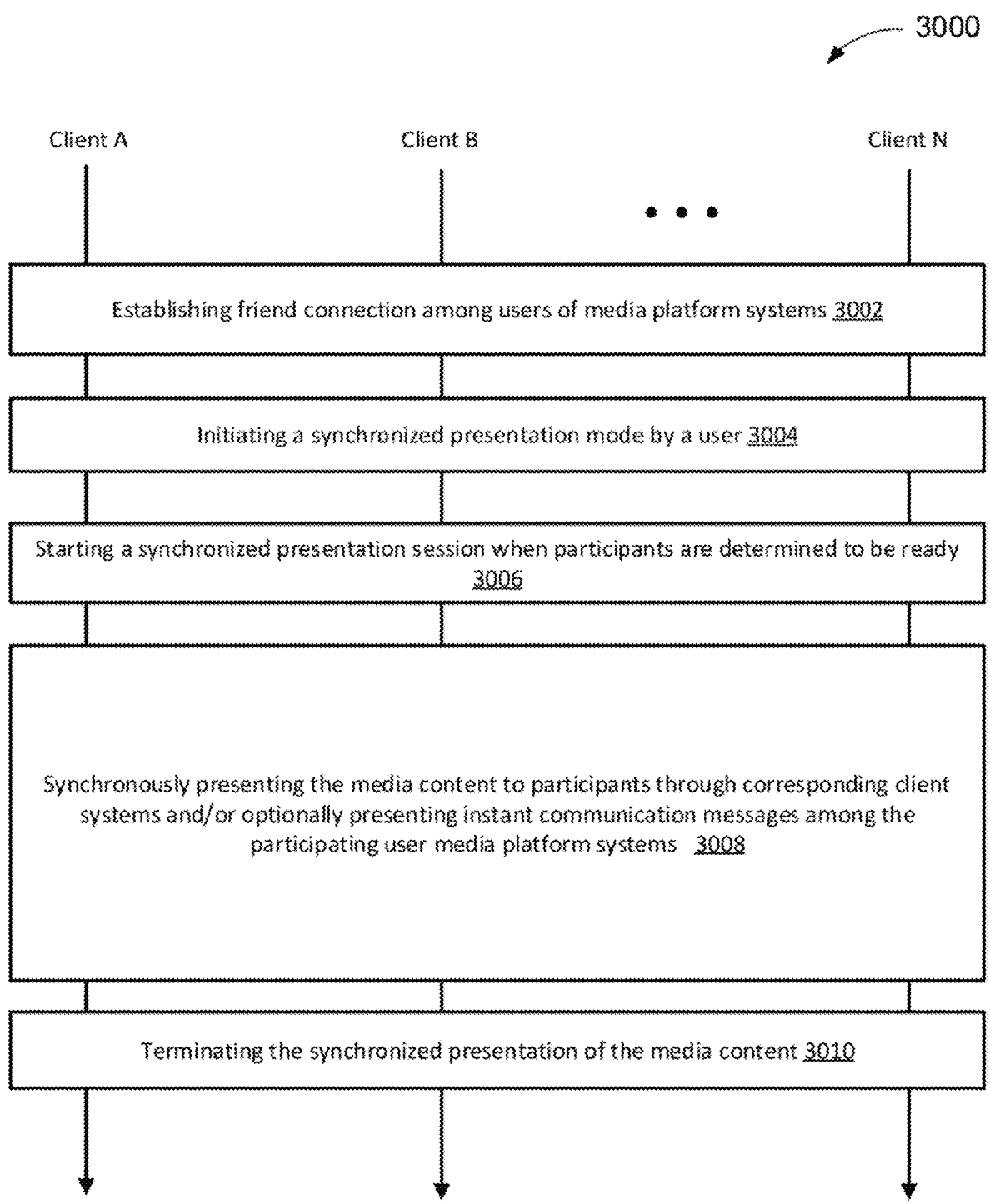
FIG. 30 illustrates a flowchart of an example method of carrying out synchronized presentation among a plurality of client systems according to some embodiments.

FIG. 30 illustrates a timing flowchart 3000 of an example method of carrying out synchronized presentation among a plurality of client systems (e.g., media platform systems 106 in FIG. 1) according to some embodiments. In step 3002, friend connection is established among a plurality of users. An applicable engine for establishing fiend connection (e.g., the social interface engine 2514 in FIG. 25) described in this paper can establish friend connection. In some embodiments, the users connected as friends with each other use different client systems and communicate with each other for establishing friend connection (e.g., by friend requests, acceptance, etc.).

In step 3004, a synchronized presentation mode is initiated. An applicable engine for initiating a synchronized presentation mode (e.g., the synchronized presentation engine 2516 in FIG. 25) described in this paper can initiate a synchronized presentation mode. In some embodiments, when a synchronized presentation mode is initiated, a group of participants is determined based on communication (e.g., invitation, acceptance, etc.) of a user who initiated the synchronized presentation mode with other users who are friends with the initiating user. In some embodiments, when a synchronized presentation mode is initiated, content to be presented during a synchronized presentation session is determined based on user authority to access content.

In step 3006, the synchronized presentation session is started when applicable number of participants are determined to be ready to start the synchronized presentation session. An applicable engine for starting a synchronized presentation session (e.g., the synchronized presentation engine 2516 in FIG. 25) described in this paper can start a synchronized presentation session. In some embodiments, to start a synchronized presentation session, whether or not applicable number of participants are ready is determined based on communication (e.g., inquiry, answer, etc.) among the participants.

In step 3008, media content determined to be presented are presented to participants through corresponding client systems. An applicable engine for presenting media content (e.g., playback engine 2518 in FIG. 25) described in this paper can present the determined media content. In some embodiments, in step 3008, optionally, instant communication is caused to be available among the participants. An applicable engine for making instant communication available (e.g., the social interface engine 2514 in FIG. 25) described in this paper can make instant communication available during the started synchronized presentation session.

In step 3010, the started synchronized presentation session is terminated. An applicable engine for terminating a synchronized presentation session (e.g., the synchronized presentation engine 2516 in FIG. 25) described in this paper can terminate a synchronized presentation session. In some embodiments, the synchronized presentation session is automatically terminated upon completion of the media content. In some embodiments the synchronized presentation session is terminated based on user inputs before and/or after completion of the media content.

Advantageously, according to the billboard screen discussed above, client systems can present participants of a synchronized presentation session synchronized content. Since regardless of location of client systems, participants who are geographically remote from each other can access the same content simultaneously. In addition, during a synchronized presentation session, participants thereof can share information with each other through instant communication GUI that is presented along with the synchronously presented content without departing from the presented content.

Figure 31:
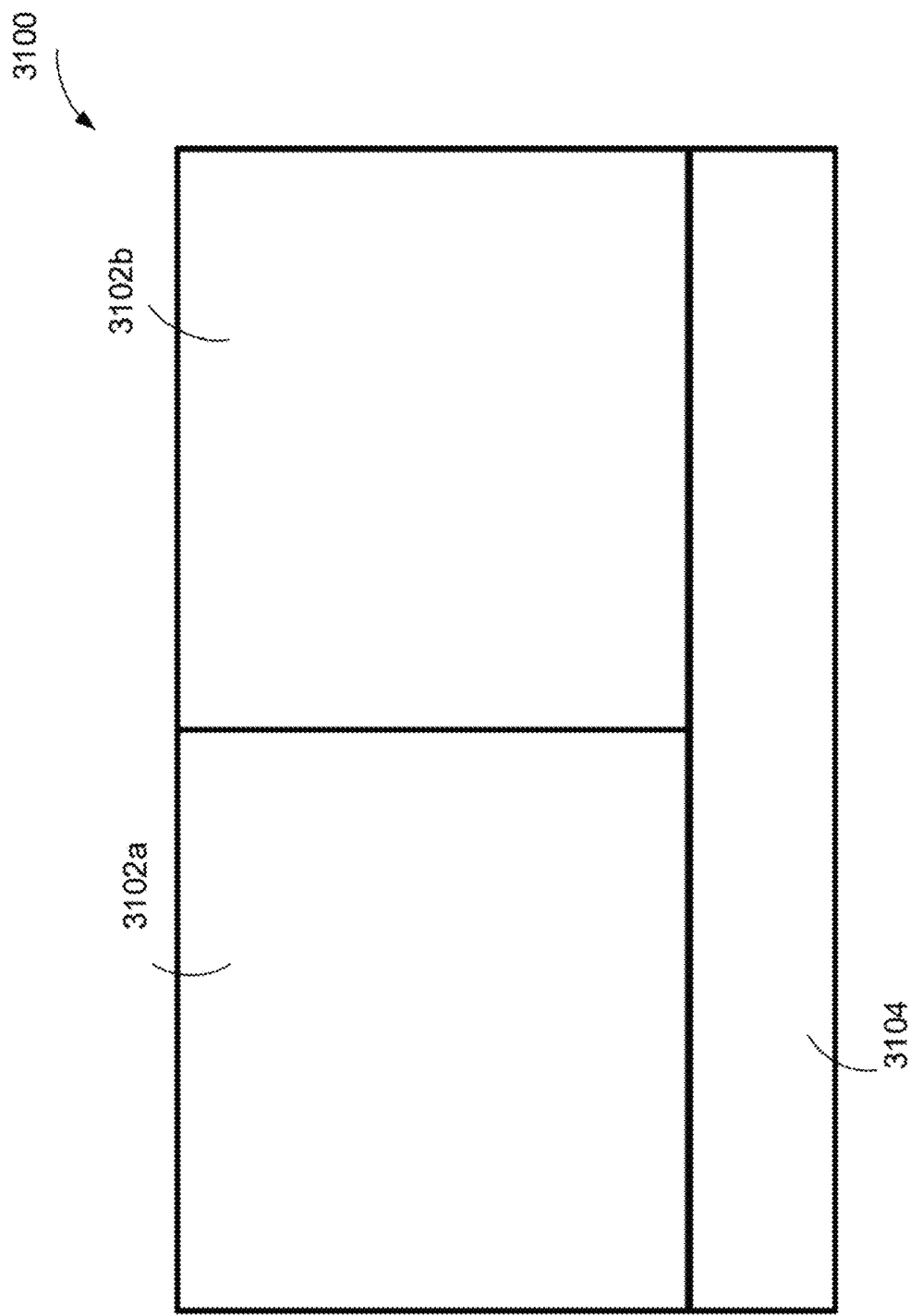
FIG. 31 illustrates an example of a screen that is displayed when a split screen mode is activated according to some embodiments.

FIG. 31 illustrates an example of a split screen 3100 that is displayed when a split screen mode is activated according to some embodiments. The split screen mode enables a user to simultaneously access multiple media content in a main screen. In the example in FIG. 31, the split screen 3100 includes a first sub-screen 3102a, a second sub-screen 3102b, and a bottom region 2705.

In some embodiments, each of the first sub-screen 3102a and a second sub-screen 3102b is configured to display media content independently from each other. For example, the first sub-screen 3102a may display a movie, and the second sub-screen 3102b may display a sports program. The bottom region 2705 is reserved for various purposes, such as for display of a smart bar and/or advertisement.

Depending upon a specific implementation of the embodiment, the sizes of the first sub-screen 3102a and the second sub-screen 3102b may be fixed to a predetermined size (e.g. the same size). In the alternative, the sizes of the first sub-screen 3102a and the second sub-screen 3102b may be variable in accordance with various applicable parameters. For example, the sizes of the first sub-screen 3102a and the second sub-screen 3102b may be determined based on resolution of the media content to be displayed thereon. In a more specific instance, a size of a sub-screen (one of the first sub-screen 3102a and the second sub-screen 3102b) that displays higher-resolution images is larger than a sub-screen (the other of the first sub-screen 3102a and the second sub-screen 3102b) that displays lower-resolution images. In another example, a size of the first sub-screen 3102a and the second sub-screen 3102 is set based on user inputs.

Depending upon a specific implementation of the embodiment, an aspect ratio of the first sub-screen 3102a and the second sub-screen 3102b is in an applicable ratio. For example, one or both of the first sub-screen 3102a and the second sub-screen 3102b has the same aspect ratio (e.g., 16:9) as a full screen during a normal display of media content.

In some embodiments, the content to be displayed on the first sub-screen 3102a and the second sub-screen 3102b are received from an applicable source such as a media provider system (e.g., the media provider system 102 in FIG. 1) and a media, social, market delivery system (e.g., the media, social, market delivery system 108 in FIG. 1).

Figure 32:
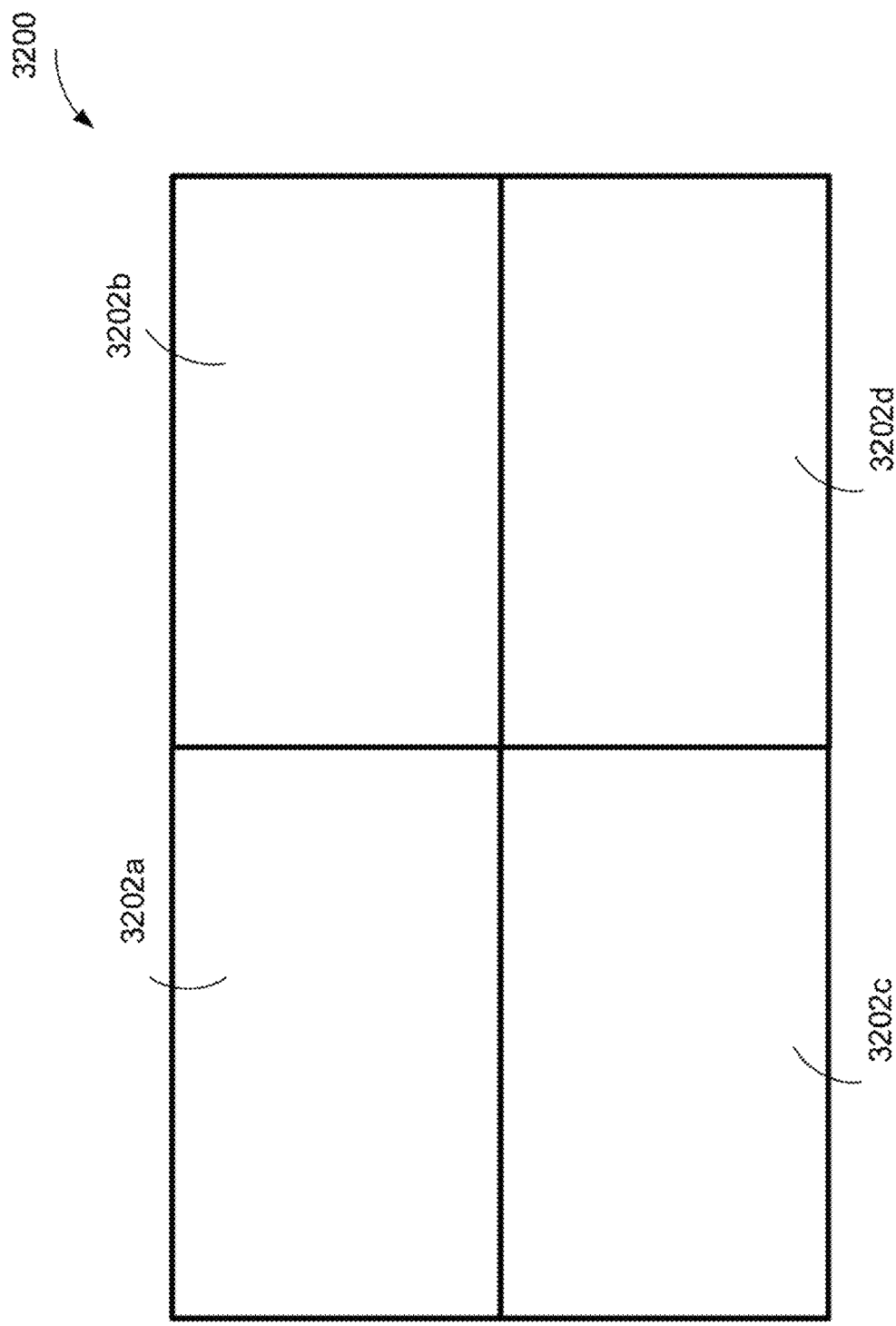
FIG. 32 illustrates another example of a screen that is displayed when a split screen mode is activated according to some embodiments.

FIG. 32 illustrates another example of a screen 3200 that is displayed when a split screen mode is activated according to some embodiments. In the example in FIG. 32, the split screen 3200 includes a first sub-screen 3202a, a second sub-screen 3202b, a third sub-screen 3202c, and a fourth sub-screen 3202d. In some embodiments, each of the first, second, third, and fourth sub-screens 3102a-d is configured to display media content independently from each other, in the same or similar manner as the first sub-screen 3102*a* and the second sub-screen 3102*b* in the screen 3100 in FIG. 31.

Depending upon a specific implementation of the embodiment, the number of the sub-screens on the entire screen is an applicable number. In an implementation, the maximum number of the sub-screens is determined based on a resolution of a display device on which the media content are displayed. For example, the maximum size is determined to be 9 when the resolution is 8K (8192×4320), the maximum size is determined to be 4 when the resolution is 4K (4096×2160) or less and above full HD (1920×1080), and the maximum size is determined to be 2 when the resolution is HD (1280×720) or less. The resolution may be pulled up from the display device or obtained based on user inputs. In another example, the maximum number of the sub-screens is determined based on a display size of the display device. For example, the maximum size is determined to be 9 when the display size is 60 inch or above, the maximum size is determined to be 4 when the display size is 40-59 inch, and the maximum size is determined to be 2 when the display side is 39 inch or less. The display size may be pulled up from the display device or obtained based on user inputs in the same or similar manner as the resolution.

Depending upon a specific implementation of the embodiment, an applicable process of splitting the screen can be employed. In a specific implementation, a non-split screen can be split into a plurality of split screens (e.g., sub-screens) through a single process. For example, a non-split screen (i.e., full screen) is split into a plurality of split screens of a maximum splittable number (e.g., 4 or 9). In another specific implementation, a non-split screen can be split into a plurality of split screens through multiple processes. For example, a non-split screen (i.e., full screen) is split into a plurality of split screens (e.g., sub-screens) of a number (e.g., 2) less than a maximum splittable number (e.g., 4 or 9) through a first process, and the split screens are further split into a plurality of split screens (e.g., mini-screens) through a second process. In this case, each of the split screen may be independently split or split together. For example, a first split screen (e.g., sub-screen) may be split into multiple screens (e.g., mini-screens), independently from split of a second screen (e.g., sub-screen) into multiple screens (e.g., mini-screens). In another example, a first split screen (e.g., sub-screen) may be split into multiple screens (e.g., mini-screens), together with split of a second screen (e.g., sub-screen) into multiple screens (e.g., mini-screens).

Depending upon a specific implementation of the embodiment, applicable visual content are displayed on split screens. In a specific implementation, one of the split screens displays original media content displayed on a screen before the split, and the other of the split screen display or do not display the original media content. For example, the original media content is displayed on a plurality of the split screens. That is, the same media content is displayed on the plurality of the split screens. In another example, a default content (e.g., a billboard and a main menu) is displayed on one of the split screens that do not display the original media content. In still another example, a still screen (e.g., black-out screen, logo, etc.) is displayed on one of the split screens that do not display the original media content. Further, when the original media content is not displayed on all of the split screens, the original media content may be displayed on split screen(s) at applicable position(s). For example, the original media content is displayed on a split screen at a predetermined position (e.g., left, right, top, or bottom, center, etc.). In another example, the original media content is displayed on a split screen at a user-designated position.

Depending upon a specific implementation of the embodiment, applicable audio content are presented in accordance with split screens. In a specific implementation, audio content corresponding to one of the split screens is selectively presented (with a normal volume), and audio content corresponding to the other of the split screens are muted or generated with a reduced volume. The selection of the split screen for which audio content is presented may be determined based on user input or a predetermined algorithm. For example, when only one of the split screens includes audio content, the audio content of the only one split screen may be presented. In another example, when a plurality of the split screens includes audio content, the audio content of the plurality of the split screens are sequentially presented for a predetermined time length (e.g., 5-20 sec), for example, in a repeated manner. In still another example, audio content of a new media content (e.g. channel) may be preferentially presented over pre-existing media content. In still another example, audio content of a media content that has the highest matching with a user profile of the user (e.g., most frequently visited channel, channel in user's favorites, celebrity in user's favorite) may be preferentially presented.

Figure 33:
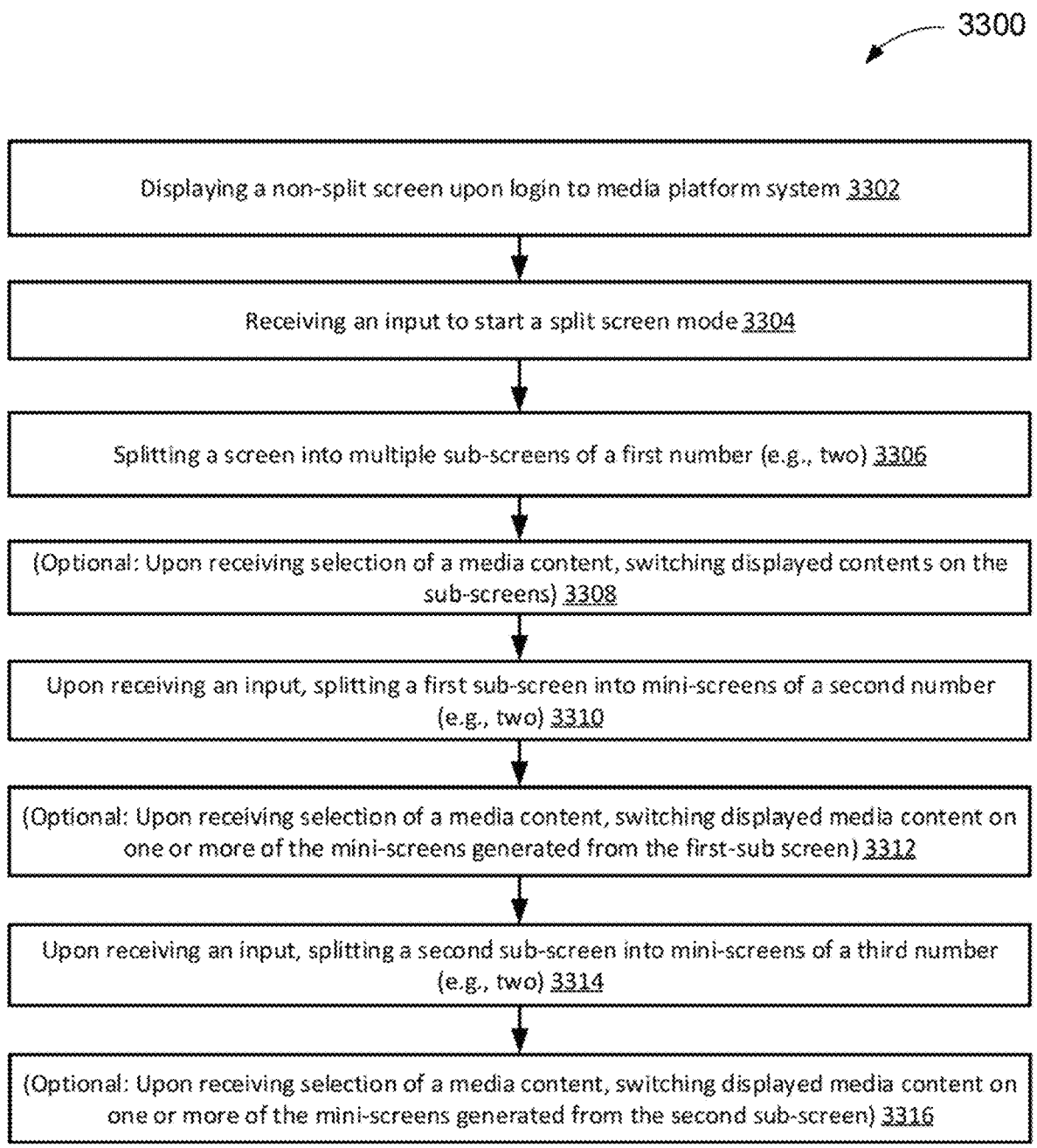
FIG. 33 illustrates a flowchart of an example method of carrying out a split screen mode according to some embodiments.

FIG. 33 illustrates a flowchart 3300 of an example method of operating in a split screen mode according to some embodiments. In step 3302, a non-split screen is displayed after login to a media platform system. An applicable engine for displaying a non-split screen (e.g., interactive programming guide engine 206, the playback engine 208, the social interface engine 220, etc. in FIG. 2) described in this paper, can display the non-split screen on an applicable output device (e.g., the output subsystem 2206 in FIG. 2). In some embodiments, the non-split screen includes a full-size screen displaying any content, such as a billboard, a main menu, and media content.

In step 3304, an input to start a split screen mode is received. An applicable engine for transmitting an input to start a split screen mode, such as a remote controller, a smart phone, a tablet, a laptop, a smart watch, and so on, can transmit the input to start the split screen mode. Also, an applicable engine for receiving the input to start the split screen mode (e.g., the split presentation engine 210 in FIG. 2) can receive the input to start the split screen mode. In some embodiments, the inputs may be voice or gestures made by human agents, such as users or viewers.

In step 3306, the non-split screen is split into multiple sub-screens of a first number (e.g. two). An applicable engine for splitting screen (e.g., the split presentation engine 210 in FIG. 2) can split the non-split screen. Depending on a specific implementation of some embodiments, the first number is less than a maximum splittable number.

In step 3308, optionally, upon receiving selection of content to be displayed on one or more of the sub-screens, the content on the sub-screens are switched. An applicable engine for making selection of content, such as a remote controller, a smart phone, a tablet, a laptop, a smart watch, and so on, can make the selection of content. In some embodiments, the selection may be made by voice or gestures of human agents, such as users or viewers. Also, an applicable engine for receiving selection of content (e.g., the split presentation engine 210 in FIG. 2) can receive the selection of content.

In step 3310, upon receiving an input to further split screen, at least one of the sub-screens are split into mini-screens of a second number (e.g., two). Similarly to step 3308, an applicable engine for splitting screen (e.g., the split presentation engine 210 in FIG. 2) can split the sub-screen(s). Depending on a specific implementation of some embodiments, the second number is less than the maximum splittable number.

In step 3312, optionally, upon receiving selection of content to be displayed on one or more of the mini-screens, the content on the mini-screens are switched. In some embodiments, step 3312 can be carried out in a similar manner as step 3310.

In step 3314, upon receiving an input to further split screen, at least one of the sub-screens that have not been split into mini-screens are split into mini-screens of a third number (e.g., two). Similarly to steps 3308 and 3310, an applicable engine for splitting screen (e.g., the split presentation engine 210 in FIG. 2) can split the sub-screen(s). Depending on a specific implementation of some embodiments, the third number is less than the maximum splittable number.

In step 3316, optionally, upon receiving selection of content to be displayed on one or more of the mini-screens generated in step 3314, the content on the mini-screens are switched. In some embodiments, step 3316 can be carried out in a similar manner as step 3310 and 3312. As a result, according to the split screens discussed above, a media platform system can provide viewers with a plurality of content (e.g., media content) simultaneously in a user-interactive manner.

Figure 34:
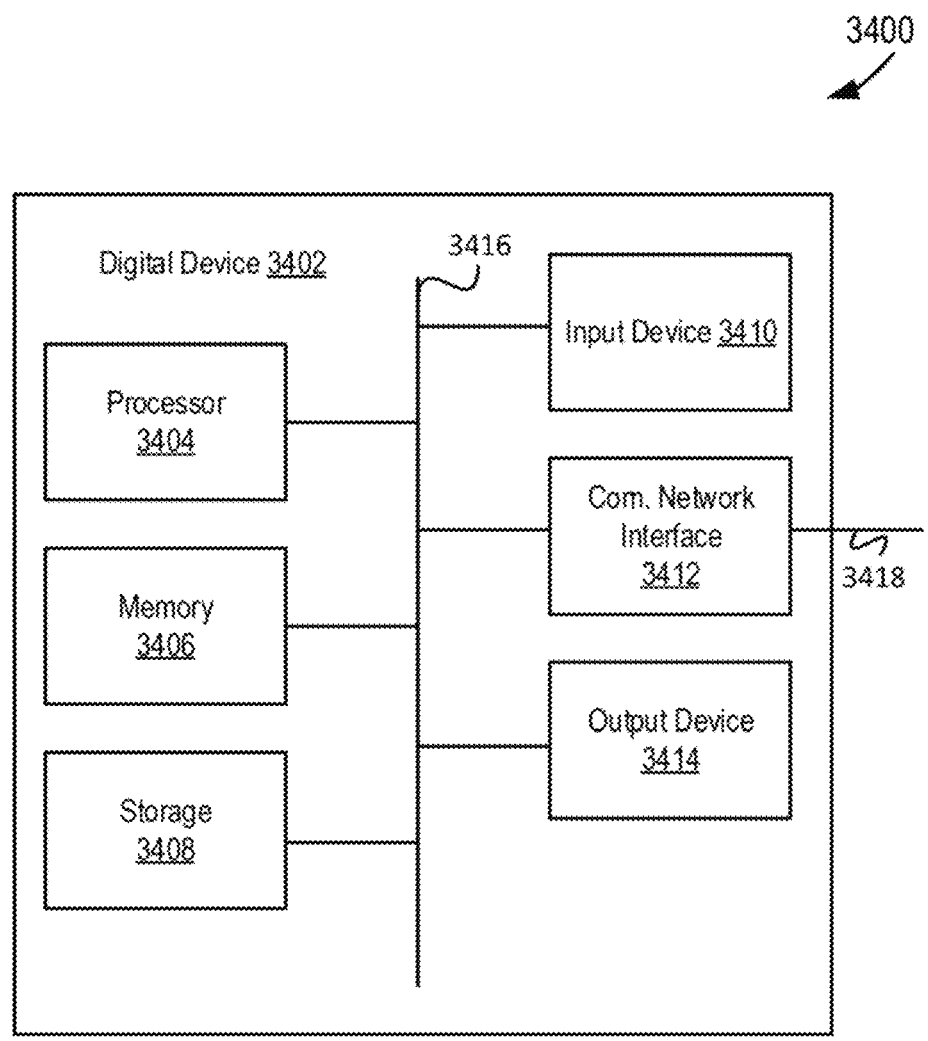
FIG. 34 is a diagram of an example computer system for implementing the features disclosed herein according to some embodiments.

FIG. 34 depicts a diagram 3400 of an example of a computing device 3402. Any of the systems 102-108 and the communication network 110 may comprise an instance of one or more computing devices 3402. The computing device 3402 comprises a processor 3404, memory 3406, storage 3408, an input device 3410, a communication network interface 3412, and an output device 3414 communicatively coupled to a communication channel 3416. The processor 3404 is configured to execute executable instructions (e.g., programs). In some embodiments, the processor 3404 comprises circuitry or any processor capable of processing the executable instructions.

The memory 3406 stores data. Some examples of memory 3406 include storage devices, such as RAM, ROM, RAM cache, virtual memory, etc. In various embodiments, working data is stored within the memory 3406. The data within the memory 3406 may be cleared or ultimately transferred to the storage 3408.

The storage 3408 includes any storage configured to retrieve and store data. Some examples of the storage 3408 include flash drives, hard drives, optical drives, cloud storage, and/or magnetic tape. Each of the memory system 3406 and the storage system 3408 comprises a computer-readable medium, which stores instructions or programs executable by processor 3404.

The input device 3410 is any device that inputs data (e.g., mouse and keyboard). The output device 3414 outputs data (e.g., a speaker or display). It will be appreciated that the storage 3408, input device 3410, and output device 3414 may be optional. For example, the routers/switchers may comprise the processor 3404 and memory 3406 as well as a device to receive and output data (e.g., the communication network interface 3412 and/or the output device 3414).

The communication network interface 3412 may be coupled to a network (e.g., network 110) via the link 3418. The communication network interface 3412 may support communication over an Ethernet connection, a serial connection, a parallel connection, and/or an ATA connection. The communication network interface 3412 may also support wireless communication (e.g., 802.11 a/b/g/n, WiMax, LTE, WiFi). It will be apparent that the communication network interface 3412 may support many wired and wireless standards.

It will be appreciated that the hardware elements of the computing device 3402 are not limited to those depicted in FIG. 34. A computing device 3402 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 3404 and/or a co-processor located on a GPU (i.e., NVidia).

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A client system comprising:
a processor; and
a memory storing instructions that, when executed by the processor, cause the processor to:
receive a first request to form one or more connections between a first user of a group of users and a first subgroup of users of the group of users;
receive a second request to form one or more connections between a second user of the group of users and a second subgroup of users of the group of users;
establish the one or more connections within the client system between the first user of the group of users and the first subgroup of users;
establish the one or more connections within the client system between the second user of the group of users and the second subgroup of users of the group of users;
set up a first group of users as participants of a first synchronized presentation session, the first synchronized presentation session being a first shared session to view an on-demand stream enabled broadcast among the first group of users, the first group of users not participating in creation of the on-demand stream enabled broadcast but participating in sharing viewing of the on-demand stream enable broadcast, the participants being determined based on the established one or more connections between the first user of the group of users and the one or more of the first subgroup of users of the group of users, the first user of the group of users having initiated the synchronized presentation session, the one or more connections between the first user of the group of users and each of one or more of the first subgroup of users being established prior to the initiation of the synchronized presentation session by the first user of the group of users, wherein one of the first group of users has control of the synchronized presentation session to stop, fast forward, or reverse the synchronized presentation session, while others of the first group of users have limited or no control of the synchronized presentation session;
set up a second group of users as participants of a second synchronized presentation session, the second synchronized presentation session being a second shared session to view the on-demand stream enabled broadcast among the second group of users, the second group of users not participating in creation of the on-demand stream enabled broadcast but participating in sharing viewing of the on-demand stream enabled broadcast, the participants being determined based on the established one or more connections between the second user of the group of users and the second subgroup of the group of users, the second user of the group of users having initiated the synchronized presentation session, the one or more connections between the second user of the group of users and each of the second subgroup of the group of users being established prior to the initiation of the synchronized presentation by the second user of the group of users, wherein one of the second group of users has control of the synchronized presentation session to stop, fast forward, or reverse the synchronized presentation session, while others users of the second group of users have limited or no control of the synchronized presentation session;
present first media content to a display device of at least one of the first group of users upon start of the first synchronized presentation session;
present the first media content to a display device of at least one of the second group of users upon start of the second synchronized presentation session;
transmit a first signal to external systems associated with one or more of the participants of the first synchronized presentation session upon the start of the first synchronized presentation session, such that the external systems associated with the one or more of the participants of the first synchronized presentation session present second media content synchronized with the first media content;
transmit a second signal to the external systems associated with one or more of the participants of the second synchronized presentation session upon the start of the second synchronized presentation session, such that the external systems associated with the one or more of the participants of the second synchronized presentation session present second media content synchronized with the first media content, the second media content including a first plurality of instant messages among participants of the first synchronized presentation and a second plurality of instant messages among participants of the second synchronized presentation;
provide the first plurality of instant messages to be displayed on the display device of at least one of the first group of users during the first synchronized presentation session; and
provide the second plurality of instant messages to be displayed on the display device of at least one of the second group of users during the second synchronized presentation session.

2. The client system of claim 1, wherein the instructions further cause the processor to:
receive a user input to select the first media content as selected media content to be presented during the first synchronized presentation session;
determine whether or not a user of the system is authorized to access the selected media content, wherein upon determining that the first user of the system is authorized to access the selected media content; and
present first media content on the display device of at least one of the first group of users.

3. The client of claim 2, wherein upon determining that the first user of the system is authorized to access the selected media content, a prompt for the first user to perform transaction to acquire access to the selected media content.

4. The client system of claim 2, wherein the instructions further cause the processor to:
determine whether or not one or more of the participants of the first synchronized presentation session associated with the external systems are authorized to access the selected media content, wherein upon determining that the one or more of the participants of the first synchronized presentation session associated with the external systems are authorized to access the selected media content, transmit the signal to the external systems.

5. The client system of claim 4, wherein upon determining that the one or more of the participants of the first synchronized presentation session associated with the external systems are not authorized to access the selected media content, a prompt to be generated on one or more of the external systems, such that the one or more of the participants of the first synchronized presentation session associated with said one or more of the external systems are prompted to perform transaction to acquire access to the selected media content.

6. The client system of claim 1, wherein the instructions further cause the processor to establish a friend connection with one or more of the first and the second users, wherein the group of users is determined based on the one or more of the first and the second users having the friend connection.

7. The client system of claim 1, wherein the instructions further cause the processor to limit control of playback during the first synchronized presentation session by the external systems.

8. The client system of claim 1, wherein the first media content and the second media content include the same content in a first time period during the first synchronized presentation session and different content in a second time period during the first synchronized presentation session.

9. The client system of claim 1, wherein the first media content includes first content overlaid on synchronized content, and the second media content includes second content overlaid on the synchronized content.

10. A method comprising:
receiving a first request to form one or more connections between a first user of a group of users and a first subgroup of the group of users;
receiving a second request to form one or more connections between a second user of the group of users and a second subgroup of the group of users;
establishing the one or more connections within a client system between the first user of the group of users and the first subgroup of users of the group of users;
establishing the one or more connections within the client system between the second user of the group of users and the second subgroup of users of the group of users;
setting up a first group of users as participants of a first synchronized presentation session, the first synchronized presentation session being a first shared session to view an on-demand stream enabled broadcast among the first group of users, the first group of users not participating in creation of the on-demand stream enabled broadcast but participating in sharing viewing of the on-demand stream enabled broadcast, the participants being determined based on the established one or more connections between the first user of the group of users and the first subgroup of users of the group of users, the one or more connections between the first user of the group of users and each of the one or more of the first subgroup of users being established prior to the initiation of the synchronized presentation session by the first user of the group of users, wherein one of the first group of users has control of the synchronized presentation session to stop, fast forward, or reverse the synchronized presentation session, while others of the first group of users have limited or no control of the synchronized presentation session;
setting up a second group of users as participants of a second synchronized presentation session, the second synchronized presentation session being a second shared session to view the on-demand stream enabled broadcast among the second group of users, the second group of users not participating in creation of the on-demand stream enabled broadcast but participating in sharing viewing of the on-demand stream enabled broadcast, the participants being determined based on the established one or more connections between the second user of the group of users and the second subgroup of users of the group of users, the one or more connections between the second user of the group of users and each of the second subgroup of users being established prior to the initiation of the synchronized presentation session by the second user of the group of users, wherein one of the second group of users has control of the synchronized presentation session to stop, fast forward, or reverse the synchronized presentation session, while others of the second group of users have limited or no control of the synchronized presentation session;
presenting first media content to a display device of at least one of the first group of users, the display device being connected to the client system upon start of the first synchronized presentation session;
presenting the first media content to a display device of at least one of the second group of users, the display device being connected to the client system upon start of the second synchronized presentation session;
transmitting a first signal to external systems that are associated with one or more of the participants of the first synchronized presentation session and connected to the client system through a network, upon start of the first synchronized presentation session, such that the external systems associated with the one or more of the participants present second media content synchronized with the first media content;
transmitting a second signal to external systems that are associated with one or more of the participants of the second synchronized presentation session and connected to the client system through a network, upon start of the second synchronized presentation session, such that the external systems associated with the one or more of the participants present second media content synchronized with the first media content, the second media content including a first plurality of instant messages among participants of the first synchronized presentation and a second plurality of instant messages among participants of the second synchronized presentation;
providing a graphical user interface (GUI) for the first plurality of instant messages among participants of the first synchronized presentation session during the first synchronized presentation session; and
providing the GUI for the second plurality of instant messages among the participants of the second synchronized presentation session during the second synchronized presentation session.

11. The method of claim 10, further comprising:
receiving a user input to select the first media content as selected media content to be presented during the first synchronized presentation session; and
determining whether or not a user of the client system is authorized to access the selected media content, wherein upon determining that the first user of the client system is authorized to access the selected media content, the first media content is presented on the display device of at least one of the first group of users.

12. The method of claim 11, further comprising, upon determining that the user of the client system is authorized to access the selected media content, generating a prompt for the first user to perform transaction to acquire access to the selected media content.

13. The method of claim 11, further comprising determining whether or not one or more of the participants of the first synchronized presentation session associated with the external systems are authorized to access the selected media content, wherein upon determining that the one or more of the participants of the first synchronized presentation session associated with the external systems are authorized to access the selected media content, the signal is transmitted to the external systems.

14. The method of claim 13, further comprising, upon determining that the one or more of the participants of the first synchronized presentation session associated with the external systems are not authorized to access the selected media content, causing a prompt to be generated on one or more of the external systems, such that the one or more of the participants of the first synchronized presentation session associated with said one or more of the external systems are prompted to perform transaction to acquire access to the selected media content.

15. The method of claim 10, further comprising establishing a friend connection with one or more users, wherein the first group of users is determined based on the one or more users having the friend connection.

16. The method of claim 10, further comprising limiting control of playback during the first synchronized presentation session by the external systems.

17. The method of claim 10, wherein the first media content and the second media content include the same content in a first time period during the first synchronized presentation session and different content in a second time period during the first synchronized presentation session.

18. The method of claim 10, wherein the first media content includes first content overlaid on synchronized content, and the second media content includes second content overlaid on the synchronized content.

19. The client system of claim 1, wherein the first synchronized presentation and the second synchronized presentation start at substantially a same time.

20. The client system of claim 1, wherein the first synchronized presentation and the second synchronized presentation start at different times.

\* \* \* \* \*